United States Patent [19]

Inoue et al.

[11] Patent Number: 5,315,397
[45] Date of Patent: May 24, 1994

[54] APPARATUS AND METHOD FOR RECEIVING AND TRANSMITTED RECORDING DATA

[75] Inventors: Naoshi Inoue, Tokyo; Shigeo Yoshida, Yokohama; Toshio Sugino, Tokyo, all of Japan

[73] Assignee: Canon Kabushiki Kaisha, Tokyo, Japan

[21] Appl. No.: 621,065

[22] Filed: Dec. 3, 1990

[30] Foreign Application Priority Data

Feb. 13, 1990 [JP] Japan .................. 2-031712

[51] Int. Cl.$^5$ .............. H04N 1/21; H04N 1/32; G01D 15/18
[52] U.S. Cl. .................... 358/296; 358/404; 358/434; 346/140 R
[58] Field of Search ........... 358/296, 403, 404, 434, 358/437; 346/140 R

[56] References Cited

U.S. PATENT DOCUMENTS

| | | | |
|---|---|---|---|
| 4,009,332 | 2/1977 | Van Hook | 358/434 X |
| 4,313,124 | 1/1982 | Hara | 346/140 |
| 4,345,262 | 8/1982 | Shinato et al. | 346/140 |
| 4,459,600 | 7/1984 | Sato et al. | 346/140 |
| 4,463,359 | 7/1984 | Ayata et al. | 346/1.1 |
| 4,468,755 | 8/1984 | Iida | 358/403 X |
| 4,494,149 | 1/1985 | Furukawa | 358/404 |
| 4,498,107 | 2/1985 | Yoshimaru et al. | 358/403 |
| 4,558,333 | 12/1985 | Sugitani et al. | 346/140 |
| 4,597,018 | 6/1986 | Sonobe et al. | 358/296 |
| 4,723,129 | 2/1988 | Endo et al. | 346/1.1 |
| 4,740,796 | 4/1988 | Endo et al. | 346/1.1 |
| 4,751,583 | 6/1988 | Levine | 358/403 |
| 4,796,091 | 1/1989 | Nohtomi | 358/256 |
| 4,907,094 | 3/1990 | Mishima et al. | 358/404 X |

FOREIGN PATENT DOCUMENTS 54-139422 10/1979 Japan.
59-123670 7/1984 Japan.
59-138461 8/1984 Japan.
59-158172 9/1984 Japan.
59-178868 10/1984 Japan.
60-183664 9/1985 Japan.
1-077277 3/1989 Japan.
1-297976 12/1989 Japan.
1-316861 12/1989 Japan.
2-014668 1/1990 Japan.
2-021769 1/1990 Japan.
2-039671 2/1990 Japan.

OTHER PUBLICATIONS

Ejiri, Masayoshi et al., "Facsimile Communication in Digital Network" Japan Telecommunication Review, vol. 26, No. 1, Jan. 1984.

Primary Examiner—Benjamin R. Fuller
Assistant Examiner—Eric Frahm
Attorney, Agent, or Firm—Fitzpatrick, Cella, Harper & Scinto

[57] ABSTRACT

An image communication apparatus for receiving and recording transmitted recording data, includes a reception unit for receiving the transmitted recording data, a storage unit for storing the recording data received by the reception unit in a nonvolatile manner, a recording unit for reading out and recording the recording data stored in the storage unit after the recording data is received by the reception unit, and a deletion unit for deleting the recording data stored in the storage unit by a manual operation after the recording data is recorded by the recording unit.

30 Claims, 57 Drawing Sheets

TOUCH PANEL

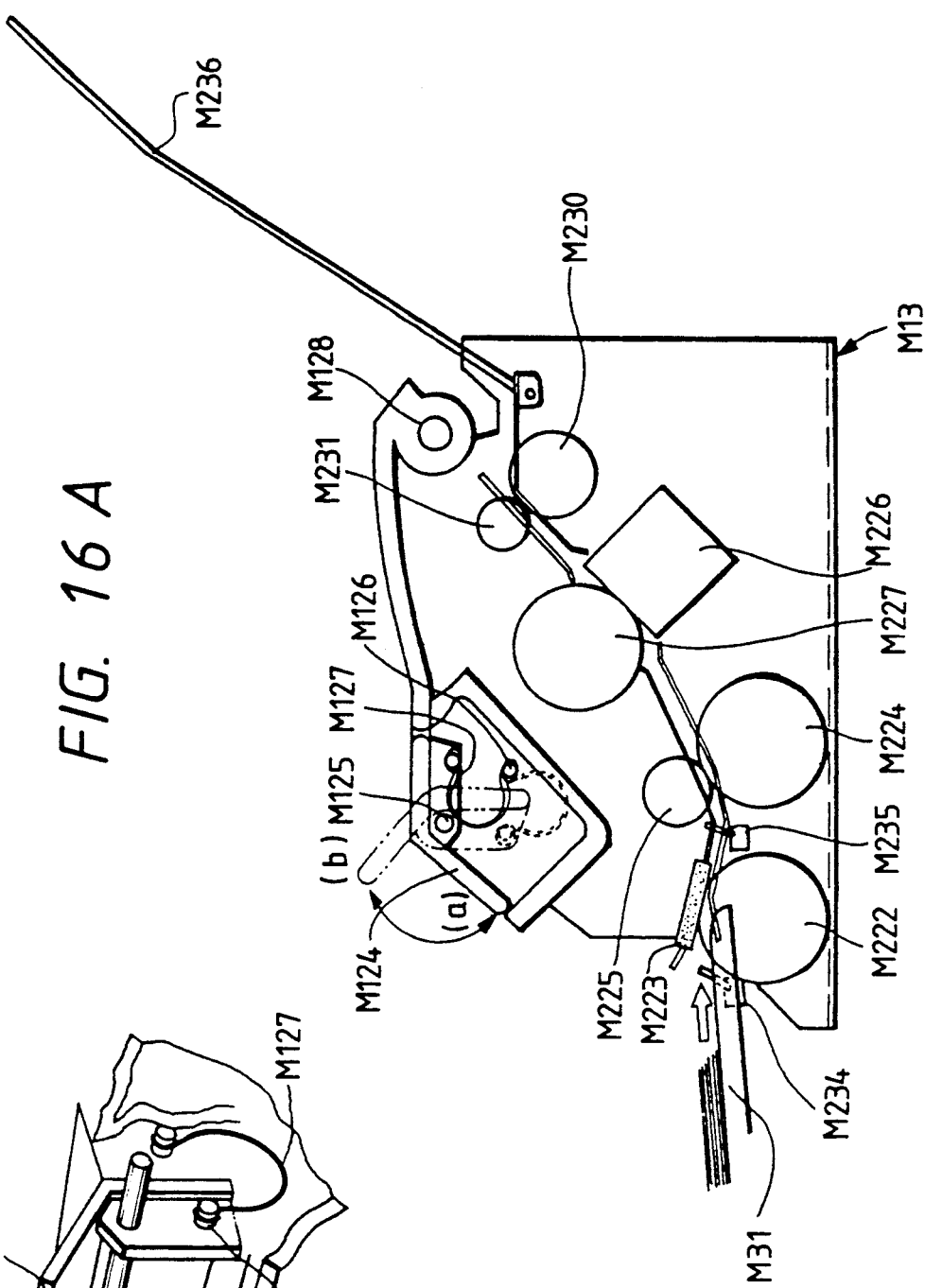
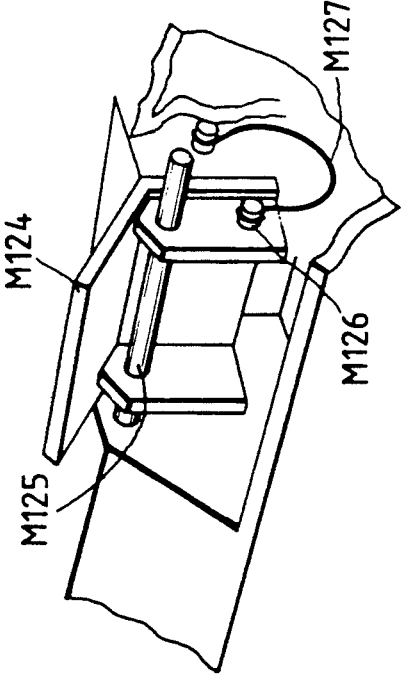
FIG. 16A
FIG. 16B

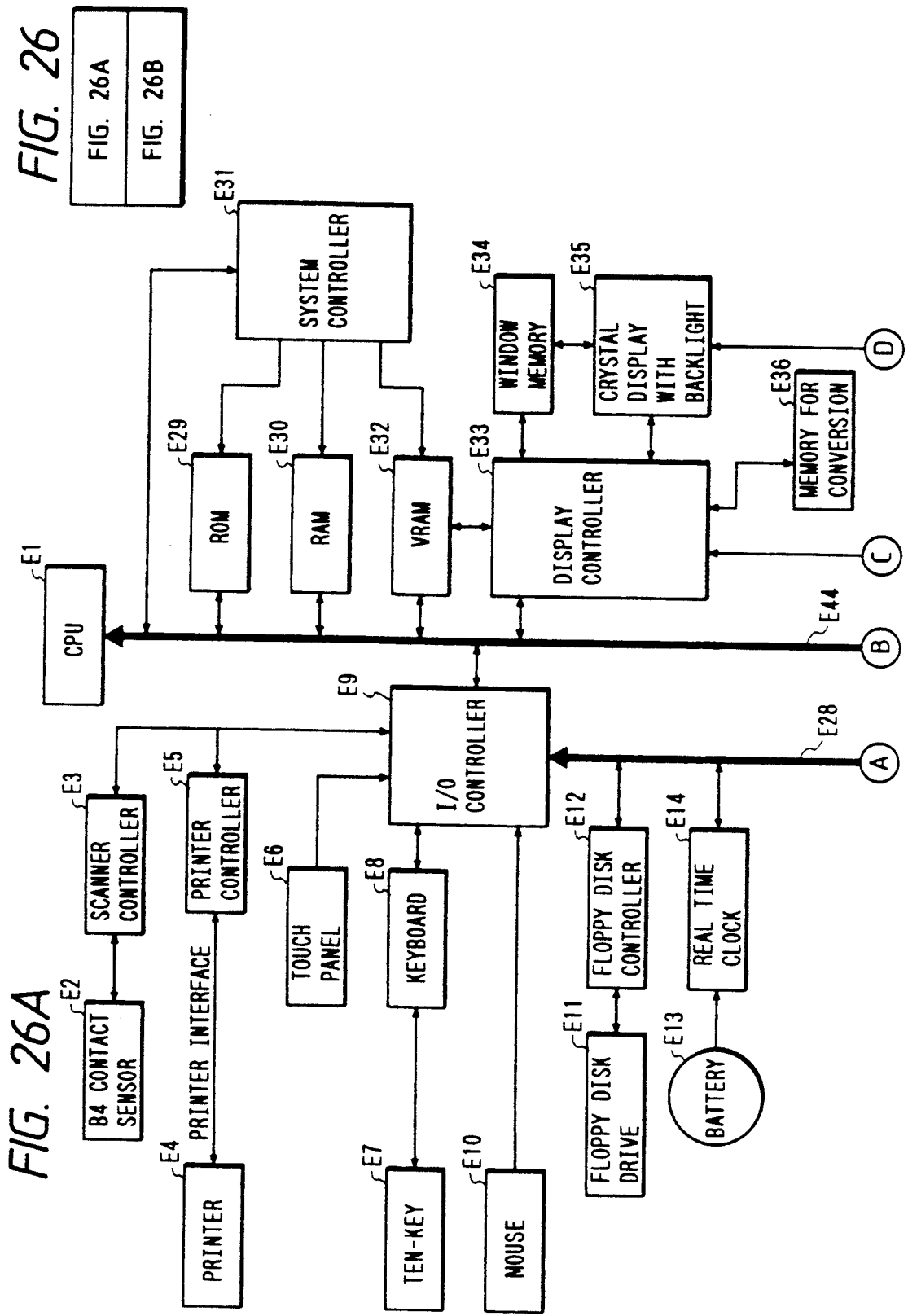

| TEL NO. | 03-123-4567 | | | | |
|---|---|---|---|---|---|
| PICTURE MODE TIMER (M) | 3 ■ | 30 ▨ | 60 ■ | 120 ■ | 180 ■ |
| REPEAT KEY INTERVAL | ▪▪ ■ | ■ | ▨ | ■ | ▪▪ ■ |
| SPEAKER VOLUME | ◀ ■ ■ ■ ■ ■ ▨ ■ ■ ◀ | | | | |
| FIXING MODE | ABSENT ▨ | | PRESENT ■ | | |

FIG. 31

[MID.] [EQUAL] [NORMAL] [JAPANESE] [em] [ROMAN] [AUTO]
PAGE 1 ROW 1 PIGIT 14

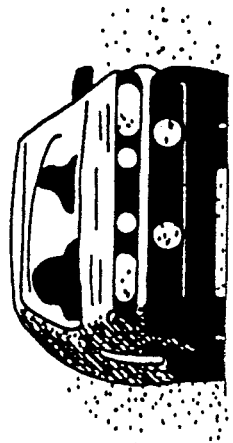

日本でも有名なパリ・ダカール・ラリーの一種である。ラリーに参加するためには、タフなエンジンや車体、それを操る優れたドライバー、車を点検して修理するメカニックチームが必要だ。そして、勝負に勝つためにはさらに、ドライバーの隣りで的確にコースの指示をあたえるナビゲータが、絶対に欠くことのできない存在なのである。彼の正確なコース案内がなければ、砂漠の中を1連れかかる荒涼とした砂漠の中を、全速力で自動車が駆け抜けていく。ガードレールなど、どこにもない。センターラインもない。もちろん、道標など何もない。岩と砂と風だけの世界を何台もの自動車が、凍ったように正確にカーブを切って疾駆する。

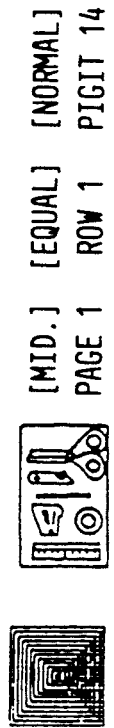

CHARACTER ASSORTMENT SET | CHARACTER ASSORTMENT MODIFICATION | EDITING | TABLE AND PICTURE | PRESERVATION CALL | FORMAT AND PRINT

FIG. 37

ALL PAGE 1 △ ▽ FIRST PAGE

日本でも有名なパリ・ダカール・ラリーの一種である。ラリーに参加するためには、タフなエンジンや車体、それを誤る腕を誤れたドライバー、車を点検して修理するメカニックチームが必要だ。そして、勝負に勝つためにはさらに、ドライバーの耳りがけ的確にコースの指示をあたえるナビゲータが、絶対に欠くことのできない存在なのである。彼の正確なコース案内がなければ、砂漠の中を1キロだって走ることはできないのだ。

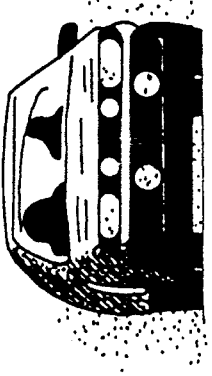

4年に一度開催される世界最大の外洋ヨットレース、アメリカに勝利を取り戻したのも、ナビゲータの活躍によるものも、オーストラリアから陸世界一周航行をなし遂げた○○の記録も、ぴったりと同様に寄り沿ってビゲーター役を務めた、プロペラ機による同機によるものだった。プロペラ機が飛ばなかったら実現できなかったもう一機のセスナに違いない。

| | America's CUP | | |
|---|---|---|---|
| | オーストラリア | アメリカ | |
| | フランスIF | デニスコナー | |
| | オーストラリアFF | | スタースアンドストライプス |

DELETION/ REGENERATION   DISPLAY CHANGE OVER   CALL/ PRESERVATION   PRINT — S10-1

S10-2

PREVIOUS PICTURE   NEXT PICTURE

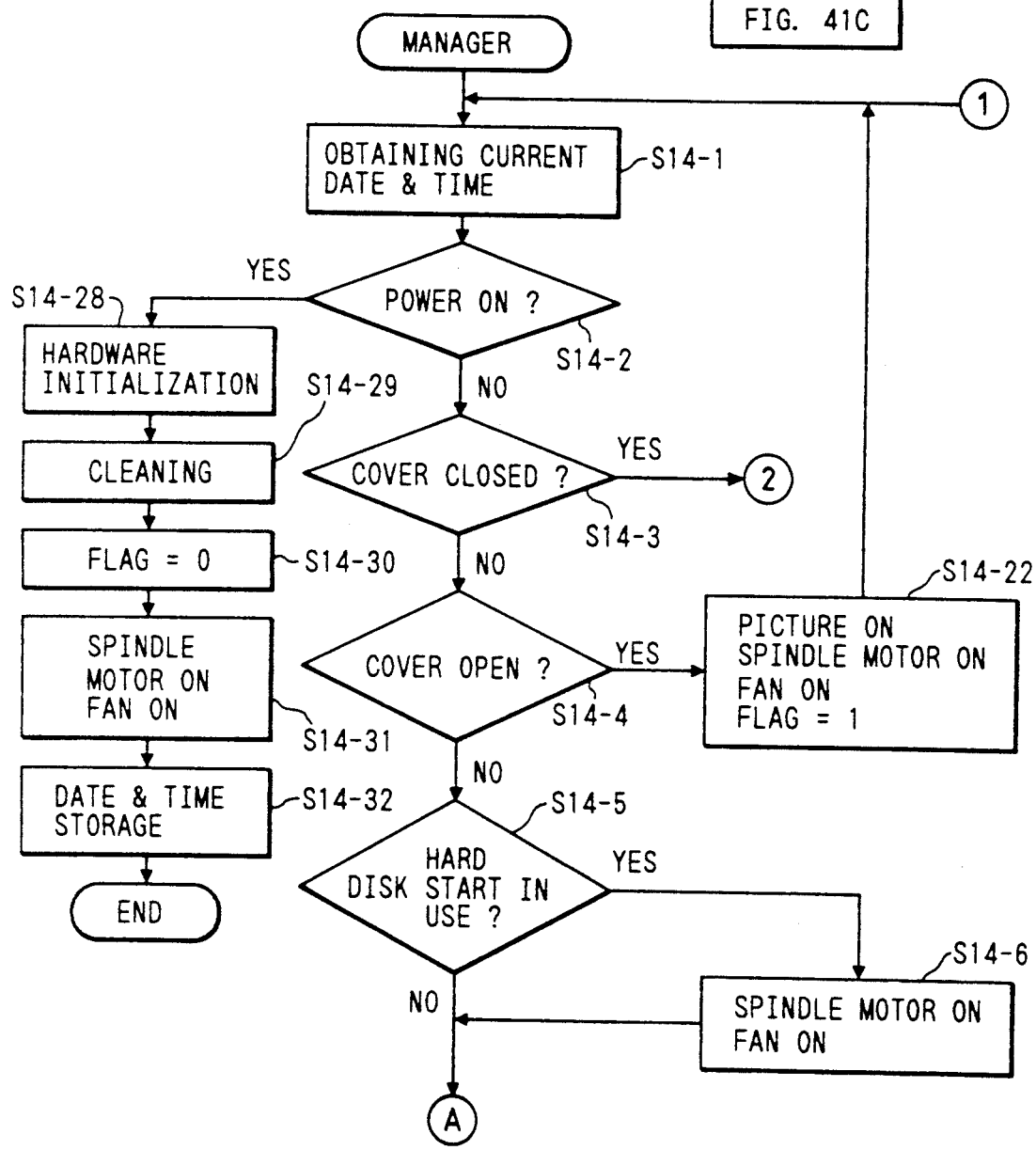

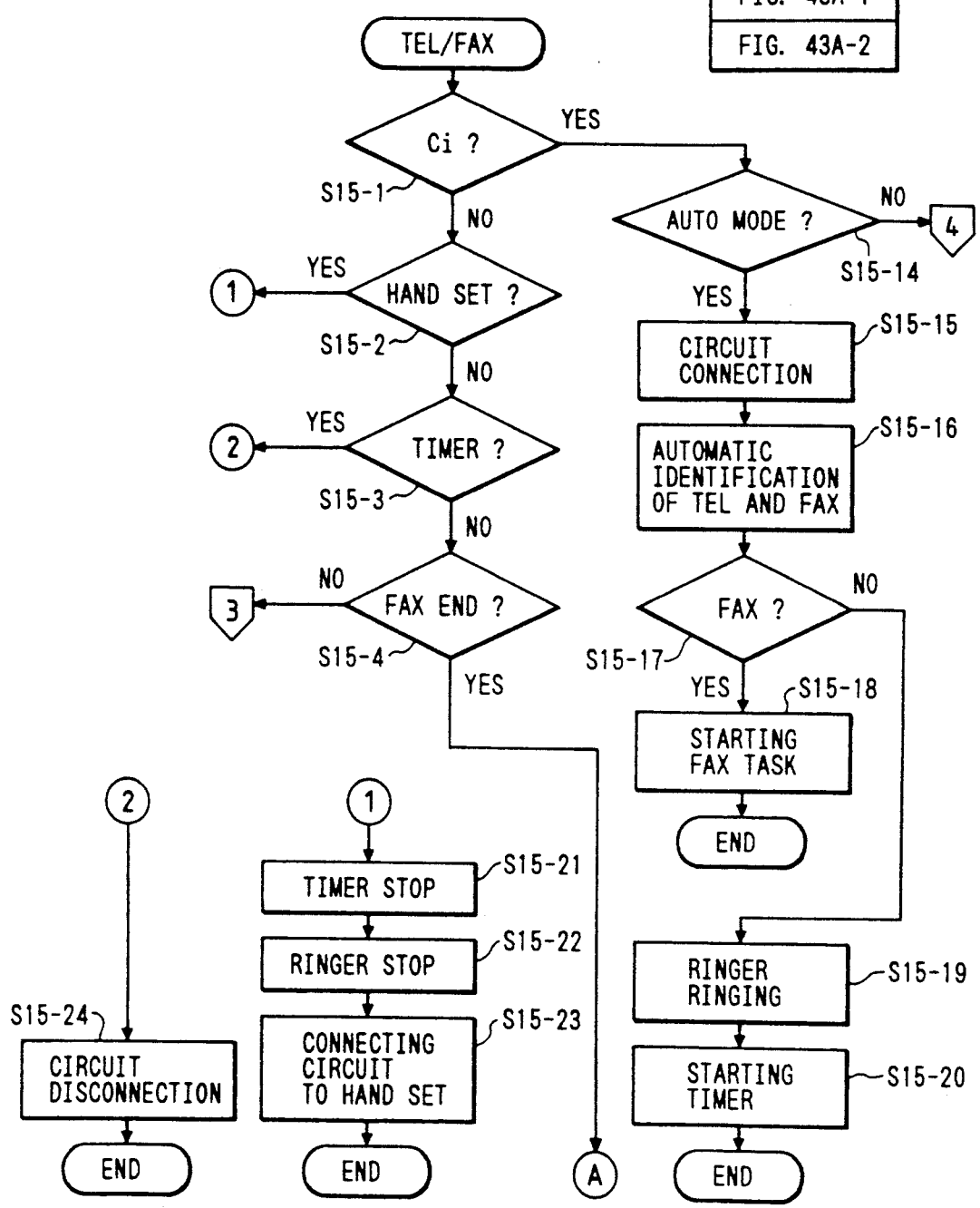

FIG. 43B
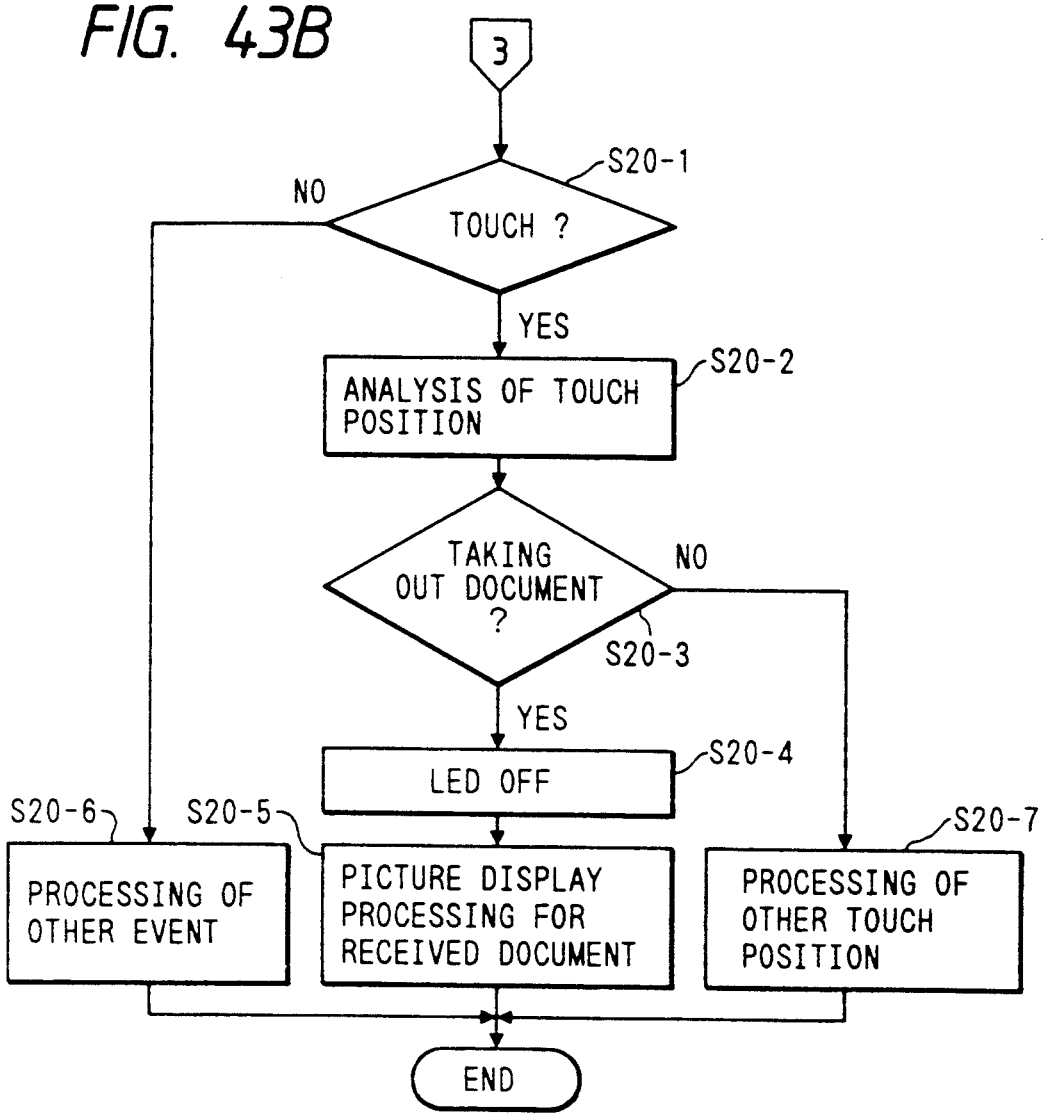
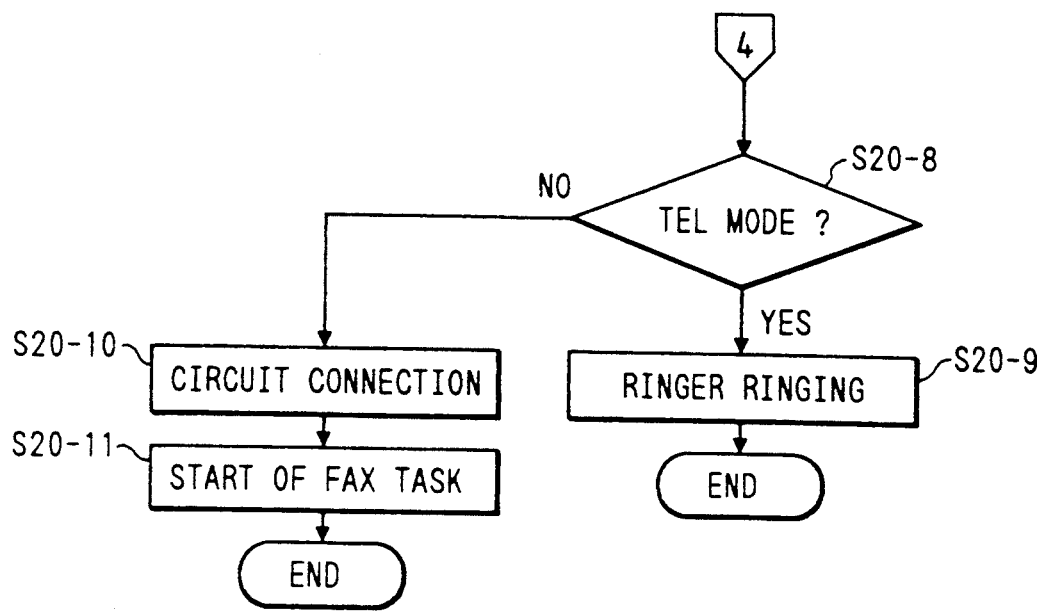

| FIG. 45A |
| FIG. 45B |

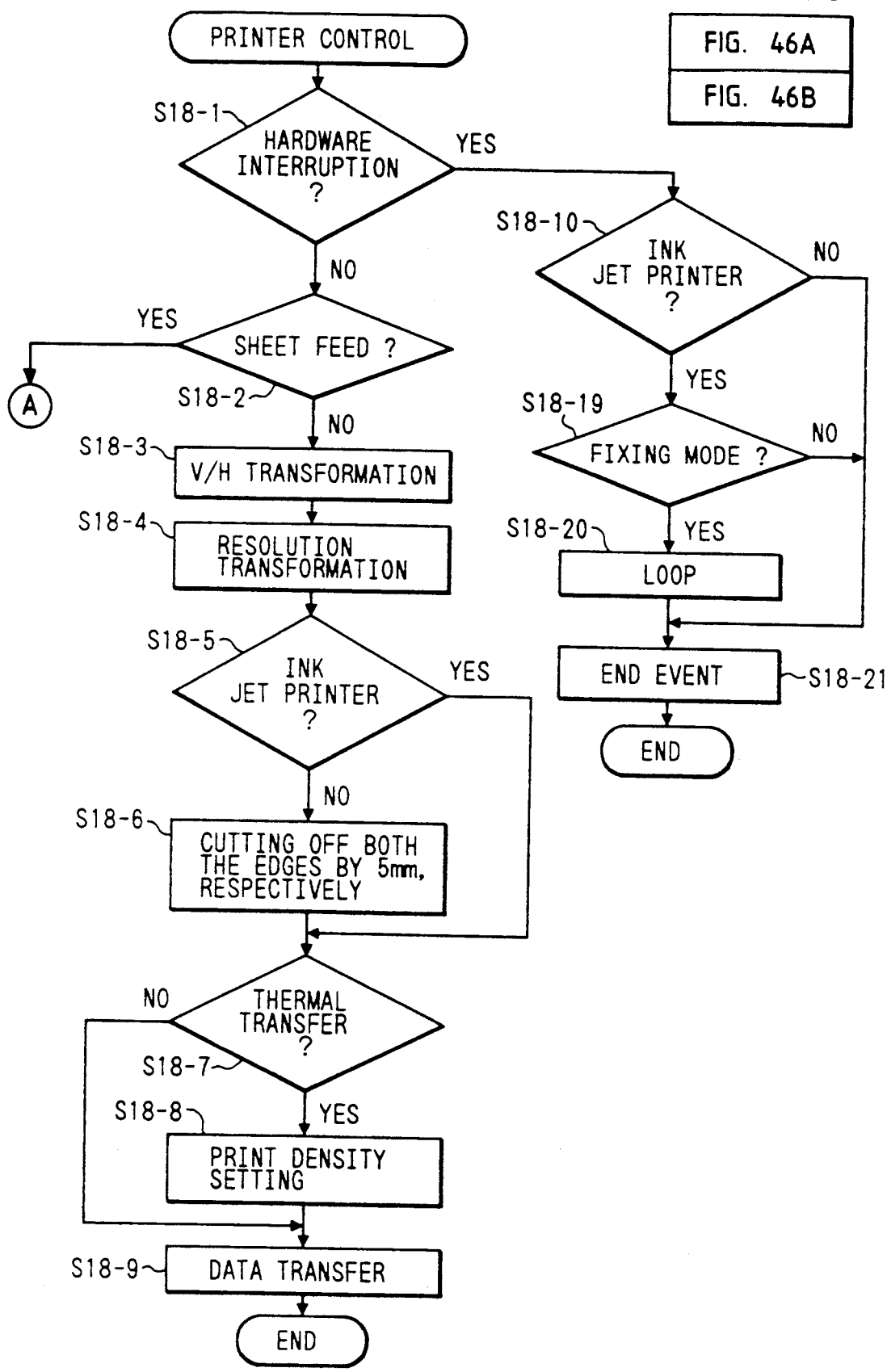

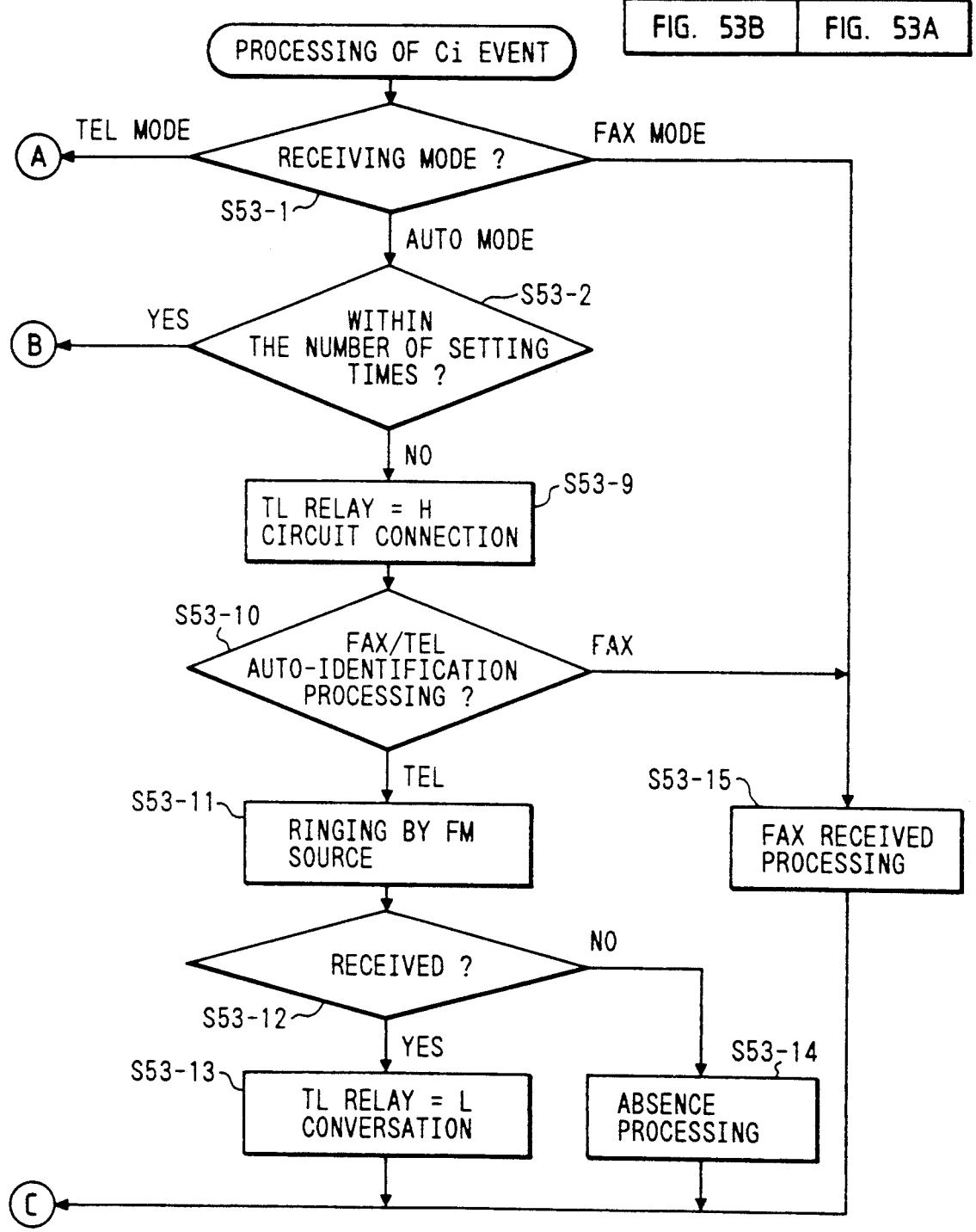

FIG. 54

INTERCEPTING LIST — 001/002

S9-3 INDIVIDUAL DELETION
S9-4 ALL DELETION

| * 1990-01-20  9:23:50 | * 1990-01-20  9:30:02 | * 1990-01-20 13:38:58 |
| * 1990-01-31 16:56:34 | * 1990-01-31 17:08:54 | * 1990-01-31 17:10:38 |
| * 1990-02-01 18:24:00 | * 1990-02-01 18:27:56 | * 1990-02-01 18:45:06 |

USER SETTING PICTURE

| S13-3 — KIND OF CIRCUIT — DIAL | PRESENCE/ABSENCE OF INTERNAL HD — PRESENT — S13-2 |
| LINE WIRE/PBX — LINE WIRE | PRINTER ASSORTMENT — BJ — S13-1 |
| POLE REVERSAL — PRESENT | PRESENCE/ABSENCE OF CUT SHEET FEEDER — PRESENT — S13-8 |
| HOOKING TIME — 0.2 SEC. | HARD DISK MONITOR TIME : START 09 — S13-6 |
| POSE TIME — 3 SEC. | HARD DISK MONITOR TIME : END 17 — S13-7 |
| DISTANCE FORM EXCHANGE — 1.8 km ~ | DELETION OF AFTER FAX AUTO-PRINTING — DO NOT — S13-4 |
| PULSE SPEED — 20 pps | AUTO-DELETION OF MARK * — DO NOT — S13-9 |
| PRESENCE/ABSENCE OF F NETWORK RECEIVING — ABSENT | TEL. RESERVATION CALLING TIME — 010 SEC. |
| S13-5 — FIXING MODE WAITING TIME — 2 | ORIGINAL END DETERMINATION TIME — 16 MIN. |

WRITING

APPARATUS AND METHOD FOR RECEIVING AND TRANSMITTED RECORDING DATA

BACKGROUND OF THE INVENTION

1. Field of the Invention

The present invention relates to an image communication apparatus such as a facsimile apparatus, and an image communication method and, more particularly, to an image communication method for recording reception data on a recording paper sheet or the like using an ink-jet printer.

2. Related Background Art

Conventional printers for recording data on recording media such as a paper sheet, an OHP sheet, and the like (to be referred to as a recording sheet or simply as a sheet hereinafter) have been proposed to carry recording heads of various recording systems. As recording heads, wire-dot, thermal, thermal-transfer, and ink-jet heads are available.

In particular, since an ink-jet system directly ejects an ink onto a recording sheet, it has received attention as a low-running cost and quiet recording method.

Of ink-jet systems, recently, a bubble-jet type ink-jet printer for ejecting an ink from ejection ports to a recording medium using bubbles generated by heat energy to record characters or images has been developed. This printer has heat generation resistors (heaters) which are arranged in the respective ejection ports and are considerably smaller than piezoelectric elements used in a conventional ink-jet printer, and multiple ejection ports can be arranged at a high density. Therefore, a high-quality image can be obtained, and high-speed and low-noise features can also be provided.

On the other hand, a facsimile apparatus is required not only to transmit an image at high speed but also to receive a high-quality image at high speed. The above-mentioned bubble-jet type ink-jet printer is considered as one of such printers which can satisfy the requirements in terms of its features.

In the ink-jet system, so-called out-of-ink detection for detecting the presence/absence of a remaining amount of ink must be performed. If a recording operation is continued without ink, nothing can be recorded, and a normal recording operation cannot be performed. However, if an out-of-ink detection circuit is arranged, cost is undesirably increased.

Even when an out-of-ink detection circuit is arranged, if its precision is low, an out-of-ink state often cannot be detected. Thus, a normal recording operation is distorted like in a case wherein no out-of-ink detection circuit is arranged.

In recent years, information processing apparatuses which can connect several types of printers (e.g., a thermal transfer printer) have been developed. The information processing apparatuses can select printers according to their recording characteristics.

In some image communication apparatuses having a facsimile function, data is temporarily stored in a file (memory) in a facsimile reception mode (to be referred to as a memory reception operation hereinafter), and the stored data is recorded by a printer after completion of reception. As a recording method, a method of automatically recording data after the memory reception operation, and a method of recording a data file designated by a manual operation are known.

When data is automatically recorded after the reception operation, the received data is deleted (erased) after the recording operation since a storage capacity of a file is limited.

When an ink-jet printer is connected as a printer for an information processing apparatus having a facsimile function by means of the memory reception operation, if it is an ink-jet printer which has no out-of-ink detection mode or has low precision if any, it is difficult to precisely perform out-of-ink detection, and received data which cannot be normally recorded may be deleted.

SUMMARY OF THE INVENTION

It is an object of the present invention to provide an image communication apparatus which can reliably record received recording data.

It is another object of the present invention to provide an image communication apparatus which can re-record recording data after a recording result of the received recording data is confirmed.

It is still another object of the present invention to provide an image communication apparatus which can delete received recording data after a recording result of the received recording data is confirmed when an ink-jet printer is connected.

In order to achieve the above objects, according to the present invention, there is provided an image communication apparatus for receiving transmitted recording data and recording the received data, comprising:

reception means for receiving the transmitted recording data;

storage means for storing the recording data received by the reception means in a nonvolatile manner;

recording means for reading out and recording the recording data stored in the storage means after the recording data is received by the reception means; and deleting means for deleting the recording data stored in the storage means by a manual operation after the recording data is recorded by the recording means.

BRIEF DESCRIPTION OF THE DRAWINGS

FIG. 8 is a side view showing a state wherein a keyboard is pushed in;

FIG. 16A is a schematic view showing a structure when an upper unit of a sheet convey path is closed;

FIG. 16B is a perspective view showing an opening/closing knob;

FIG. 31 shows a basic picture of a wordprocessor;

FIG. 37 shows a FAX print display/display picture;

FIG. 54 shows a FAX print display/received document list picture according to another embodiment of the present invention;

FIG. 55 shows a memory switch picture;

DETAILED DESCRIPTION OF THE PREFERRED EMBODIMENTS

Schematic Structure of Apparatus

Figure 1:
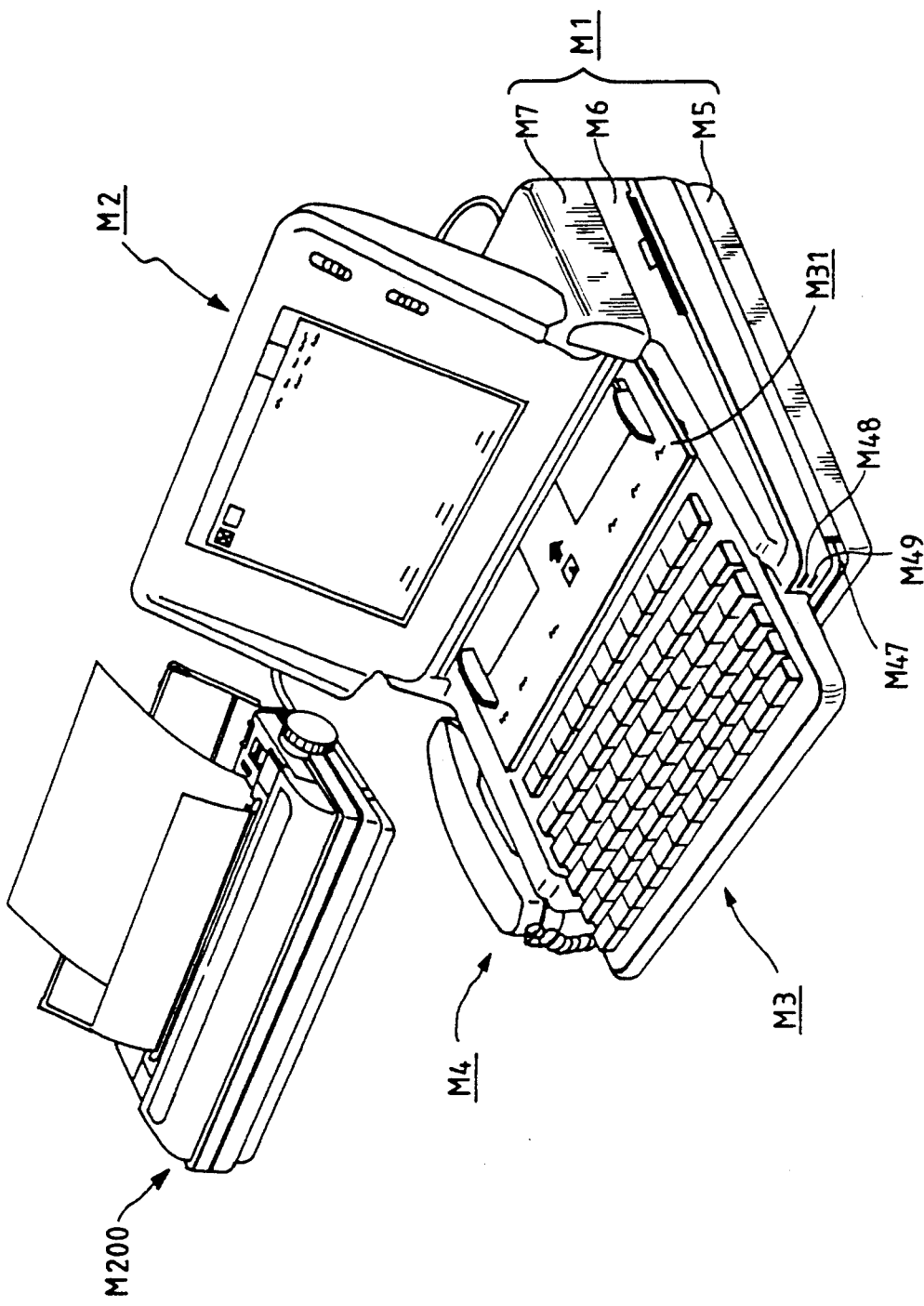
FIG. 1 is a perspective view showing an outer appearance of a system of an apparatus according to the present invention.

FIG. 1 shows a system employing an apparatus according to the present invention. A printer M200 is connected to an apparatus M201 of the present invention through an interface cable, and performs a print operation on the basis of a signal from the apparatus. The apparatus of the present invention mainly comprises a main body unit M1, a display unit M2, a keyboard M3, and a handset unit M4.

Figures 2, 43A:
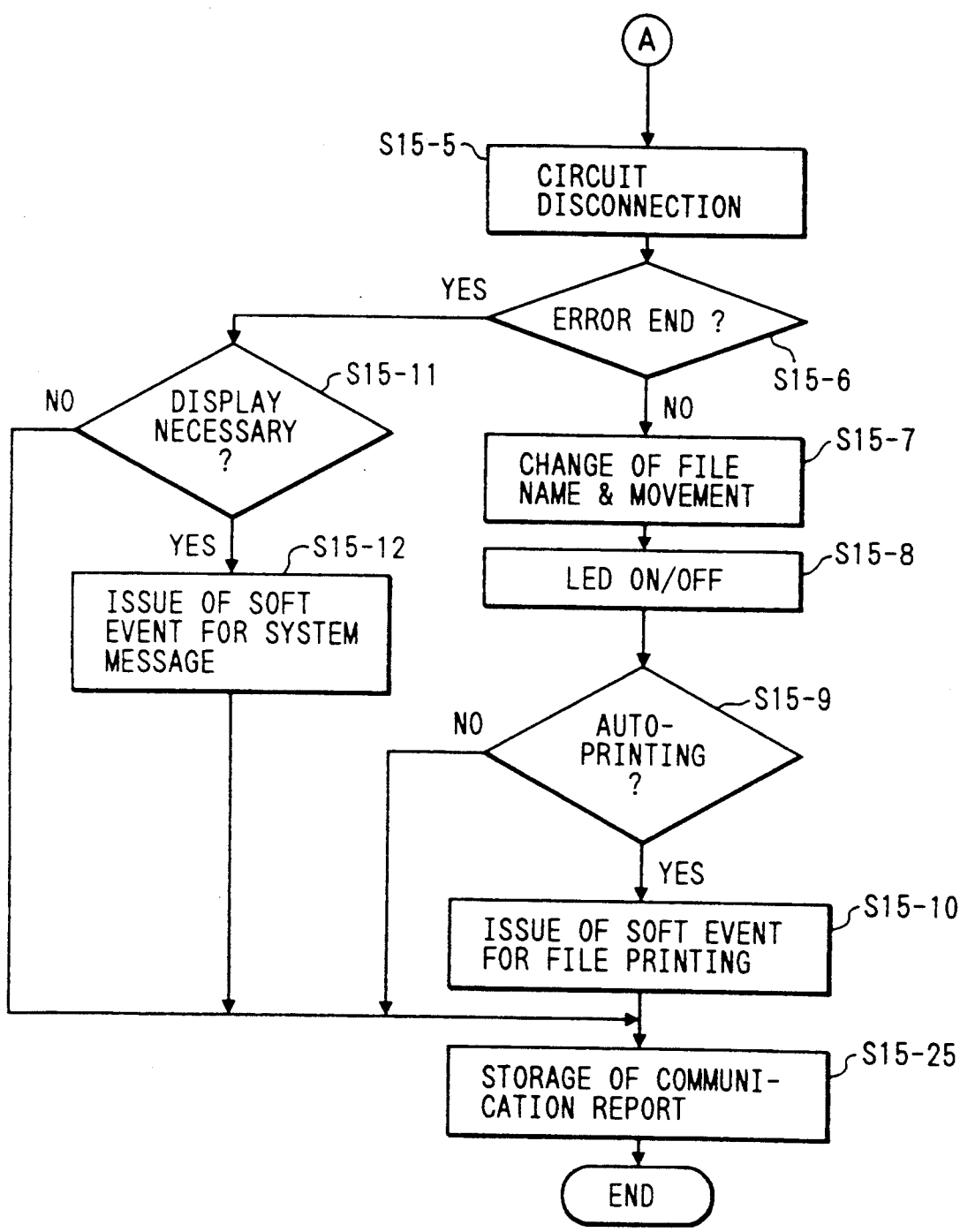
FIGS. 43A, consisting of FIGS. 43A-1 and 43A-2, and 43B are flow charts of a TEL/FAX mode.

As shown in FIG. 2, the main body unit M1 is constituted by a bottom cover M5, a main body cover M6, and an upper cover M7. A control circuit M8 such as a CPU board, an external interface M9, a floppy disk drive M10, a hard disk drive M11, and a speaker M12 are arranged in the main body unit M1. An original reading means (to be referred to as a scanner hereinafter) M13 can be equipped in a rear portion of the main body unit M1 as an optional equipment.

Figure 6:
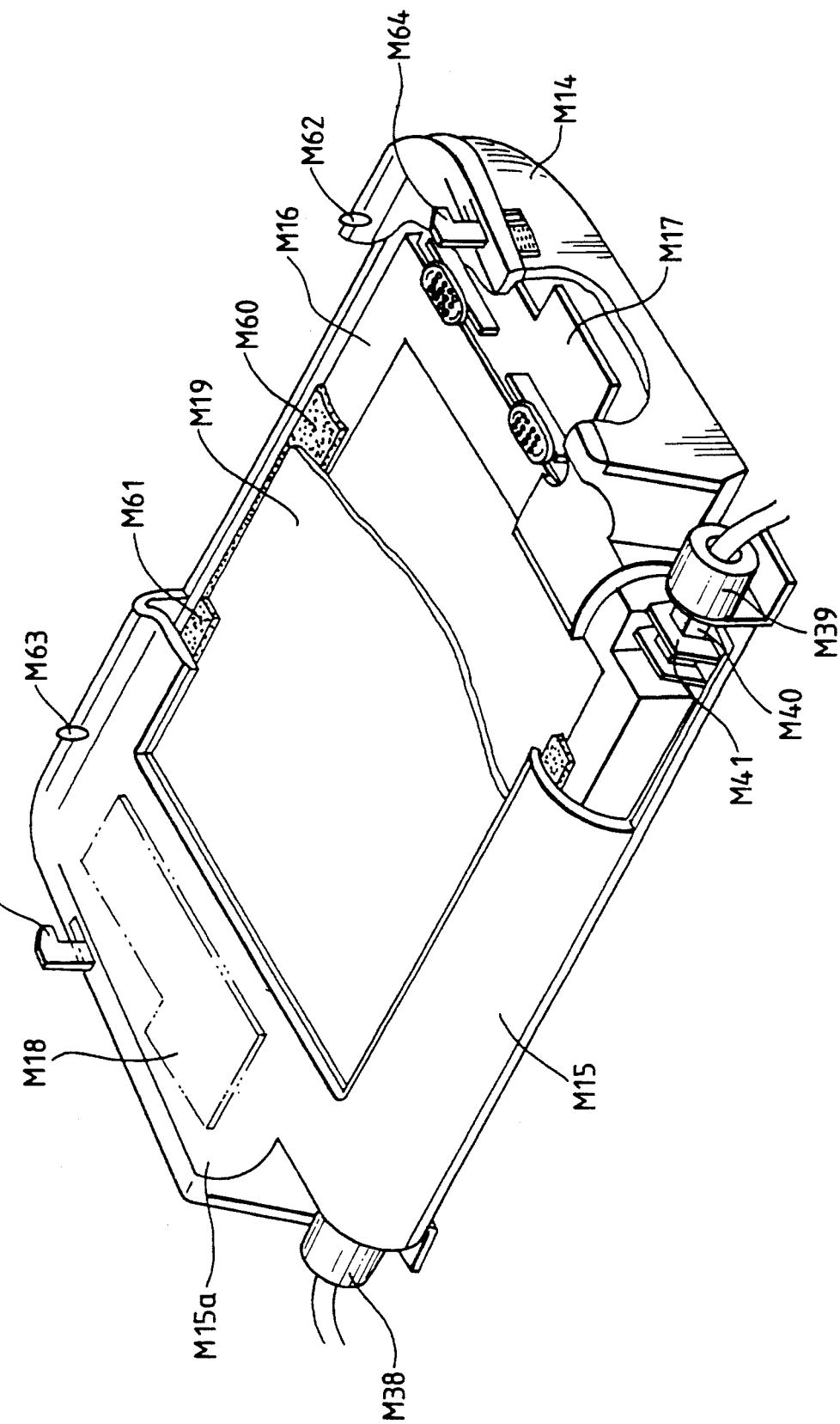
FIG. 6 is a partial sectional view of a display rear cover.

The display unit M2 is constituted by a display rear cover M14, a display front cover M15, a liquid crystal display M16 with a backlight, a display luminance/contrast control board M17, a backlight inverter M18, and a touch panel M19 (FIG. 6).

An interface cable of the keyboard M3 is connected to the control circuit M8 in the main body unit through a hole M6a (FIG. 2A) formed in the central portion of the main body cover M6. The handset unit M4 is fixed to the main body unit such that a portion of its base M81 is inserted in a left slit M6c of the main body cover M6, and its telephone line is connected to a modular jack M21, M22, or M23 and is connected to the control circuit M8.

Structure of Main Body Unit (1) Interior of Sheet Metal Chassis

Figure 2A:
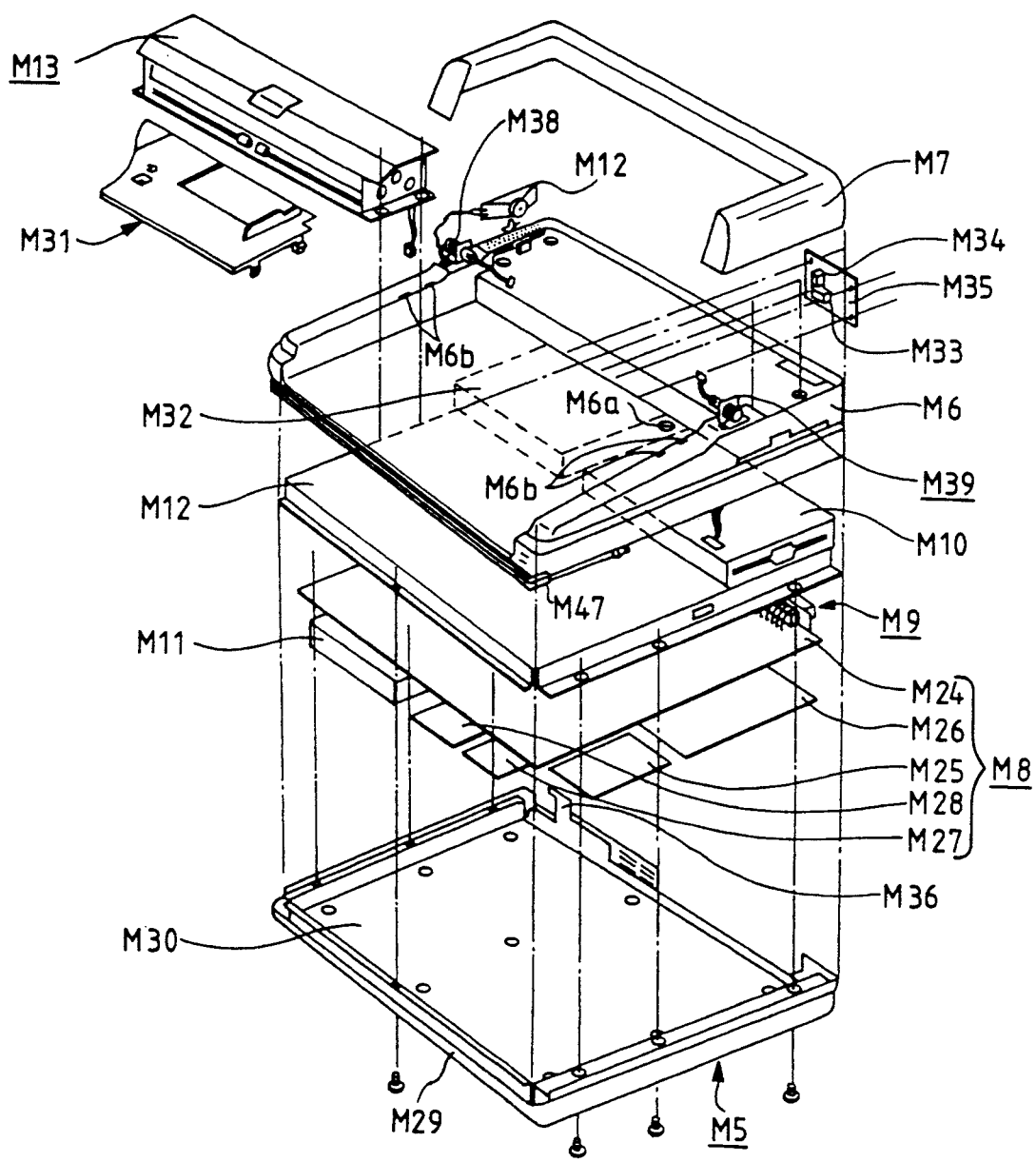
FIG. 2A is an exploded perspective view of a main body of the apparatus according to the present invention.
Figure 2B:
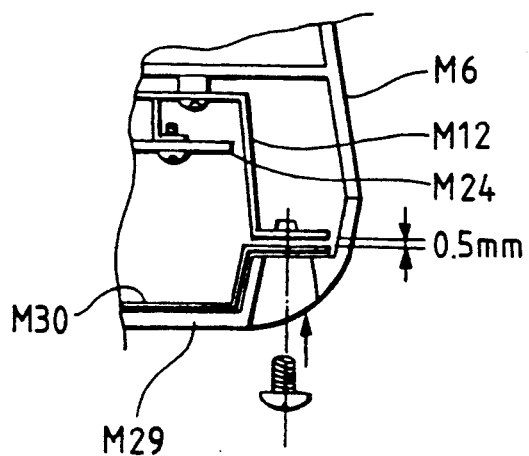
FIG. 2B is a partial sectional view of the main body of the apparatus according to the present invention.

As shown in FIG. 2A, in the main body unit M1, a CPU board M24, an NCU board M25, an RP board M26, an SCSI board M27, an optional board M28, and the hard disk drive M11 as an optional equipment are fixed to the lower portion of the main body cover M6 via a sheet metal chassis M12. These boards and parts can be easily detached by disengaging the bottom cover M5. The bottom cover M5 is constituted by a bottom mold M29, and a bottom sheet metal M30, which are integrated by heat caulking. When the bottom cover M5 is mounted, the main body cover M6 is in contact with the bottom mold M29, and the bottom sheet metal M30 keeps a gap of 0.5 mm from the sheet metal chassis M12. FIG. 2B is a partial sectional view. In FIG. 2B, seven holes are formed in the bottom mold M29, and the bottom sheet metal M30 and the metal sheet chassis M12 are fastened by screws inserted in the holes, thereby mounting the bottom cover M5. As a result, the sheet metal chassis M12 and the bottom sheet metal M30 can shield the boards, the hard disk drive (HDD) M11, and the like, thus providing an effect of suppressing generation of noise. The main body cover M6 and the bottom mold M29 are engaged with each other without a gap by a 0.5-mm deformation force of the sheet metal.

(2) Around Sheet Metal Chassis

Figure 4A:
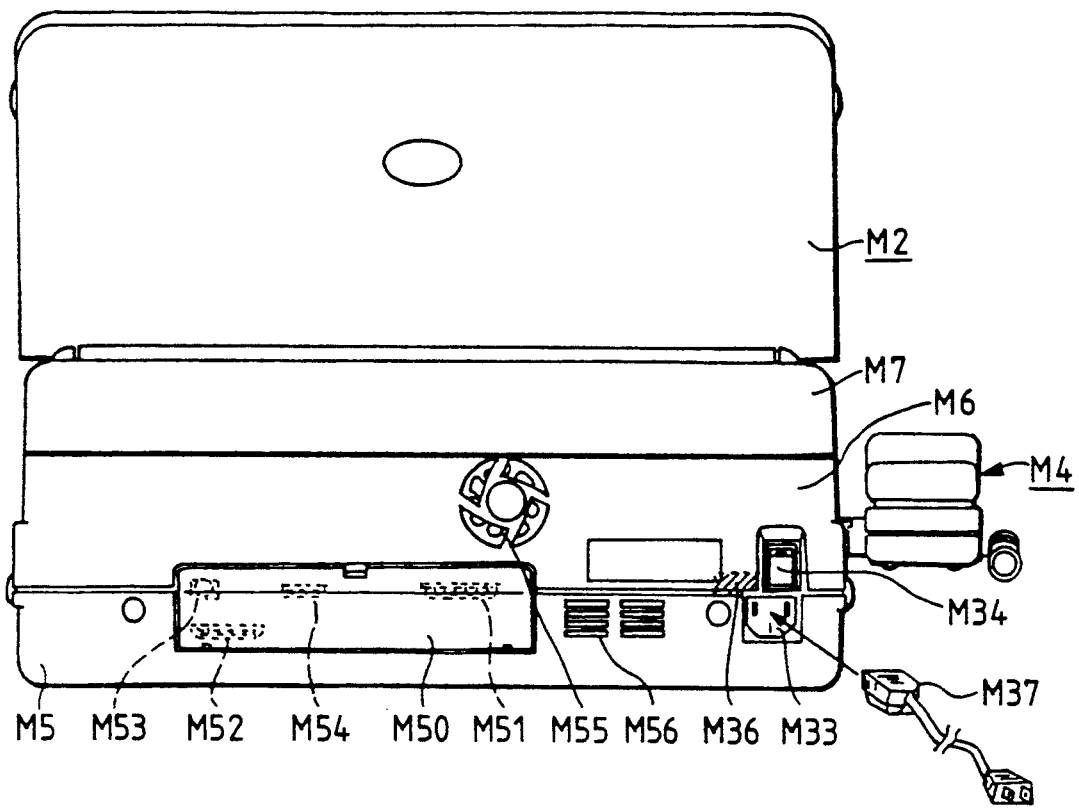
FIG. 4A is a rear view of an outer appearance of the apparatus according to the present invention.
Figure 4B:
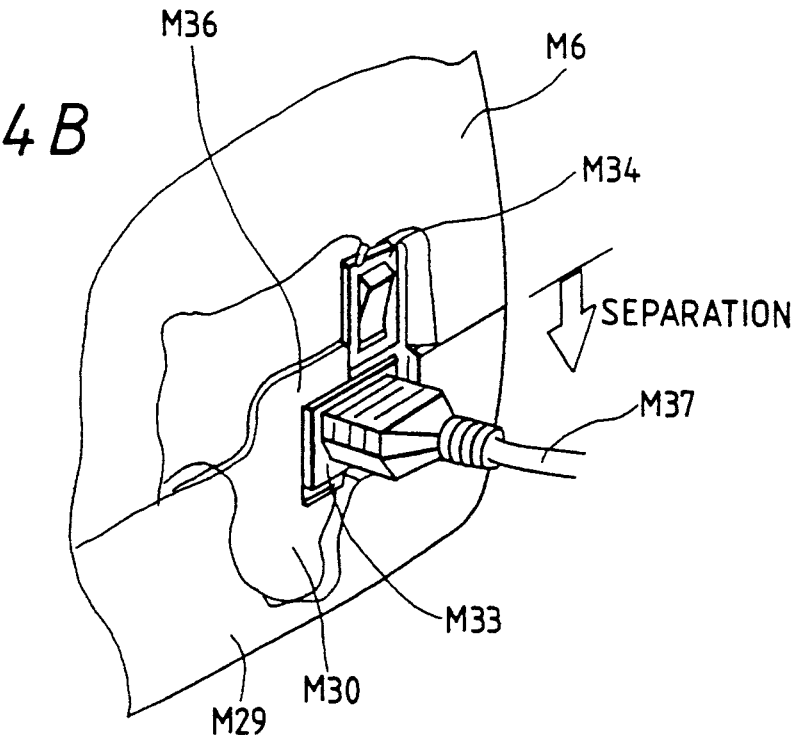
FIG. 4B is a perspective view of a power supply inlet portion of the apparatus according to the present invention.

The floppy disk drive M10 and a power supply M32 are fixed on the upper portion of the sheet metal chassis M12. This is to separate the control circuits inside the sheet metal chassis M12 from the power supply, thereby eliminating the influence of noise therebetween. Furthermore, an AC inlet M33 and a power switch M34 of the power supply M32 are fixed to a sheet metal M35 mounted on the sheet metal chassis M12, and are exposed from notches of the main body cover M6 and the bottom cover M5, as shown in FIGS. 4A and 4B. A portion M36 of the bottom sheet metal M30 extends to a portion above the AC inlet M33 from a gap between the main body cover M6 and the sheet metal M35, so that the bottom cover M5 cannot be disengaged in a state wherein a power cord M37 is kept fitted in the AC inlet M33. For this reason, when a user or a serviceman opens a bottom cover to exchange optional boards or perform a maintenance, he or she must pull out the power cord M37, resulting in a safe work.

(3) Above Rear Portion of Main body Cover

Figure 5A:
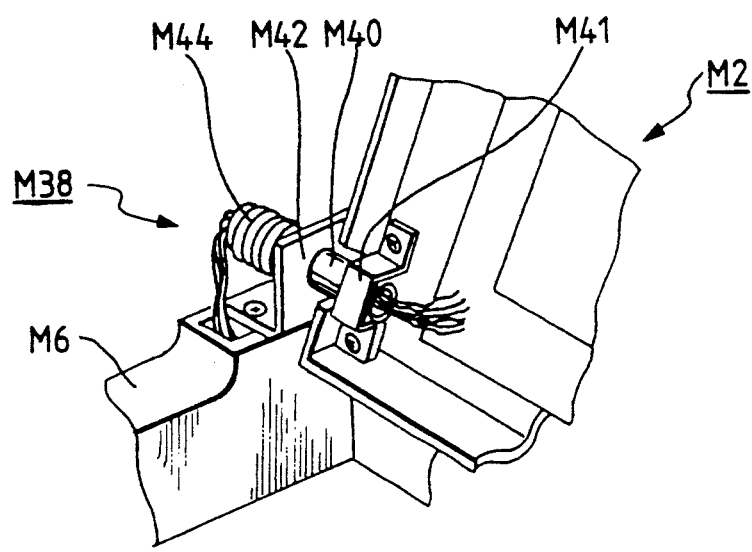
FIG. 5A is a perspective view of a main part showing a hinge of a display.
Figure 5B:
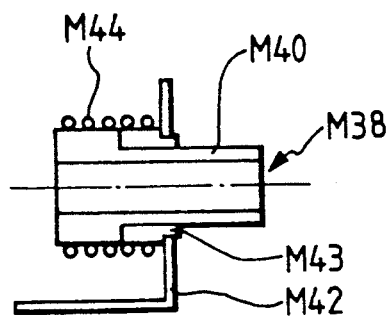
FIG. 5B is an enlarged sectional view of a hinge portion.
Figure 5C:
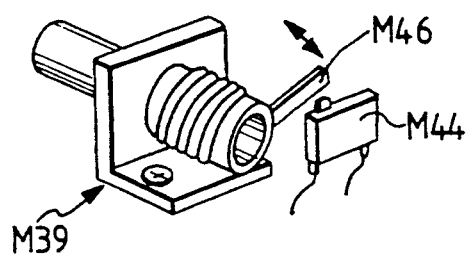
FIG. 5C is an enlarged perspective view of the hinge portion.

As shown in FIG. 2A, the scanner unit M13 as an optional equipment and the speaker M12 are fixed on the main body cover M6, and their connection cords are connected to the CPU board M24 via holes and notches of the main body cover M6 and the sheet metal chassis M12. Hinge units M38 and M39 for the display are arranged on the central left and right portions of the main body cover M6. The hinge unit M38 is a one-way frictional load means by means of a spring clutch. As shown in FIGS. 5A to 5C, a member M40 is fixed to the display unit side by a fixing member M41, and a bearing M43 mounted on the main body cover M6 by a sheet metal M42 supports the member M40. A coil spring M44 is wound around the member M40 and the outer surface of a cylinder of the bearing M43 in a direction shown in FIG. 5A, so that the spring is loosened in a display opening direction to allow a light opening operation, and is fastened in a display closing direction to make a closing operation heavy. The member M40 and the bearing M43 comprise hollow shafts, and signal lines between the display unit and the CPU board extend through these hollow spaces. The opposite hinge unit M39 has a similar but right-and-left symmetrical structure. With this mechanism, movement of the signal lines upon rotation can be minimized. In addition, when the display is opened, a light operation is allowed, and when the display is closed, a free-stop operation is attained, thus avoiding a danger such that fingers of a user are caught in the apparatus when he or she closes the display. A microswitch M44 for detecting an open/-close state of the display is arranged in the right hinge unit M39. An actuator M46 mounted on the member M40 of the hinge unit turns on/off the microswitch M44 according to a rotational position of the display, thus detecting an open/close state.

(4) Other Parts Around Main Body

Three modular jacks M21, M22, and M23 respectively for a telephone circuit, a branch telephone, and a handset exclusively used for the main body are arranged on the left side of the main body unit from the rear side.

Figure 14:
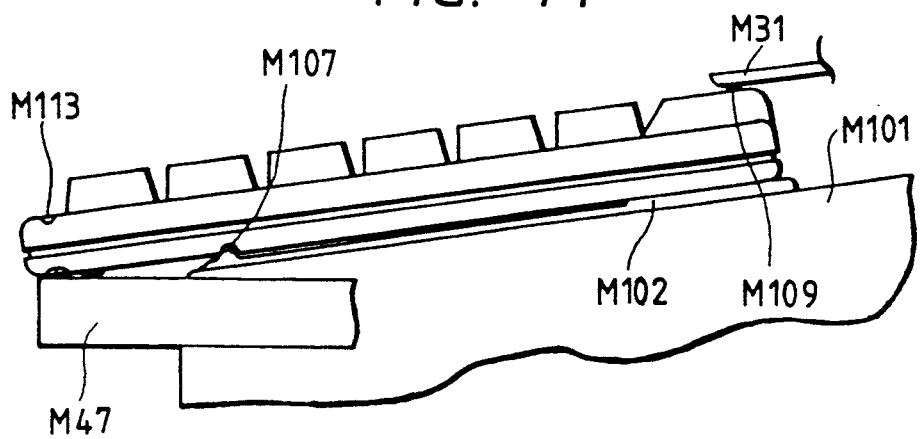
FIG. 14 is a side view showing the positional relationship obtained when a handle is used as a keyboard rest.
Figure 15:
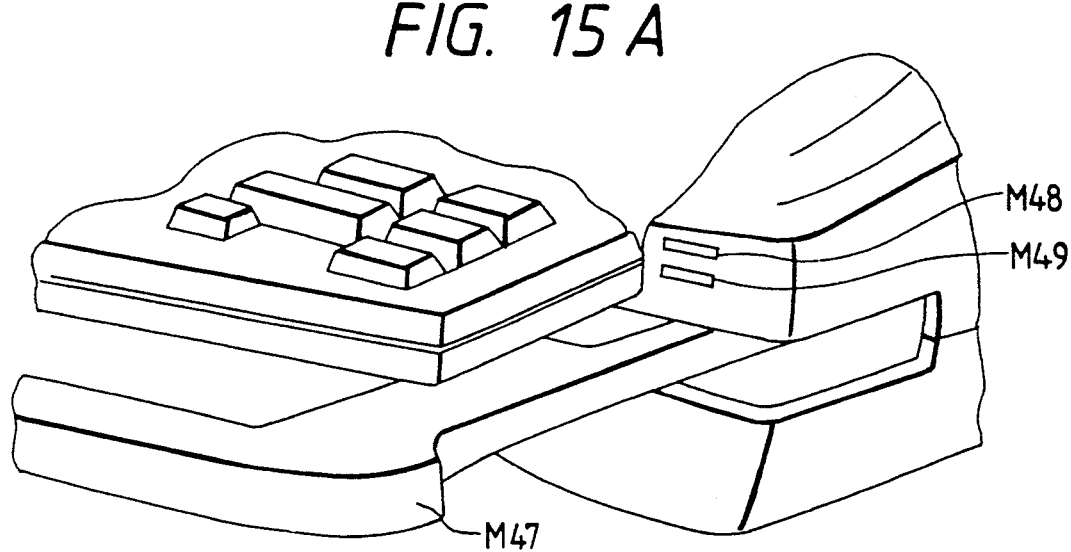
FIG. 15A is a partial perspective view of a state wherein the handle is used as an arm rest.
FIG. 15B is a side view showing the positional relationship obtained when the handle is used as the arm rest.
Figure 15:
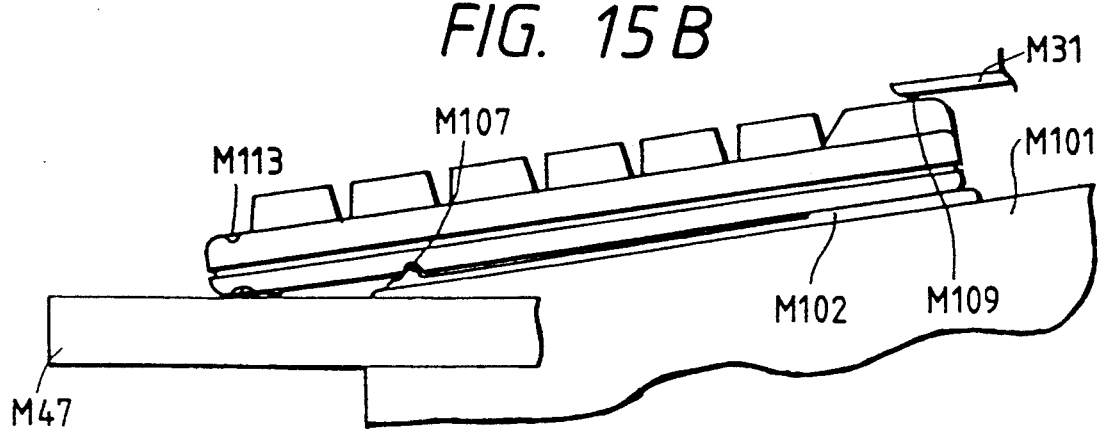

Furthermore, a handle M47 which is reciprocally moved by a slide mechanism is supported on the front side of the main body (FIG. 3), thus allowing an easy carry of the apparatus of the present invention. The handle M47 can be pulled out to two positions. FIG. 14 is a side view when the handle is pulled out to the first position. At this position, the handle supports near the leading edge of the keyboard when the keyboard is located at an operation position. FIGS. 15A and 15B show a state wherein the handle is pulled out to the second position. At this position, the handle M47 can serve as an arm rest for a keyboard operation while supporting the leading edge of the keyboard.

A red LED M48 indicates a standby state, a FAX reception state, and the like, and a green LED M49 indicates a power-ON state.

On the rear side of the main body (FIG. 4A), when a rear cover M50 is opened, connectors of an SCSI interface M51, a printer interface M52, a mouse interface M53, and an RS232C interface M54 are exposed. FIG. 4A also shows an exhaust fan M55, and an intake port M56 for the fan.

Structure of Display Unit

As shown in FIG. 6, the liquid crystal display (LCD) unit M16 with the backlight is fixed to the display rear cover M14, and the touch panel M19 is mounted on the front surface of the LCD unit through a 2-mm thick thin cushion M60. The display luminance/contrast control board M17 and the backlight inverter M18 are fixed on two sides of the LCD unit, and are connected to the signal lines extending from the above-mentioned hinge units M38 and M39. The members M40 of the hinge units are fixed to the two lower ends by the corresponding fixing members M41, so that the display can be pivotal about the hinges.

The display front cover M15 is fixed to the rear cover M14 by screws, and presses the LCD unit M16 and the touch panel M19 by a shock absorbing member M61 attached to the rear surface of its display frame, thereby preventing an offset of the touch panel from the LCD unit. Projections M62 and M63 are arranged on an upper portion of the display front cover M15 to prevent the keyboard M3 from being disengaged, as will be described later. Lock levers M64 and M65 are arranged on portions outside the projections M62 and M63. When the display is opened, the levers M64 and M65 are fitted in square holes M66 and M67 formed in the main body cover M6, and are locked when they are slid toward the front side.

Figure 11:
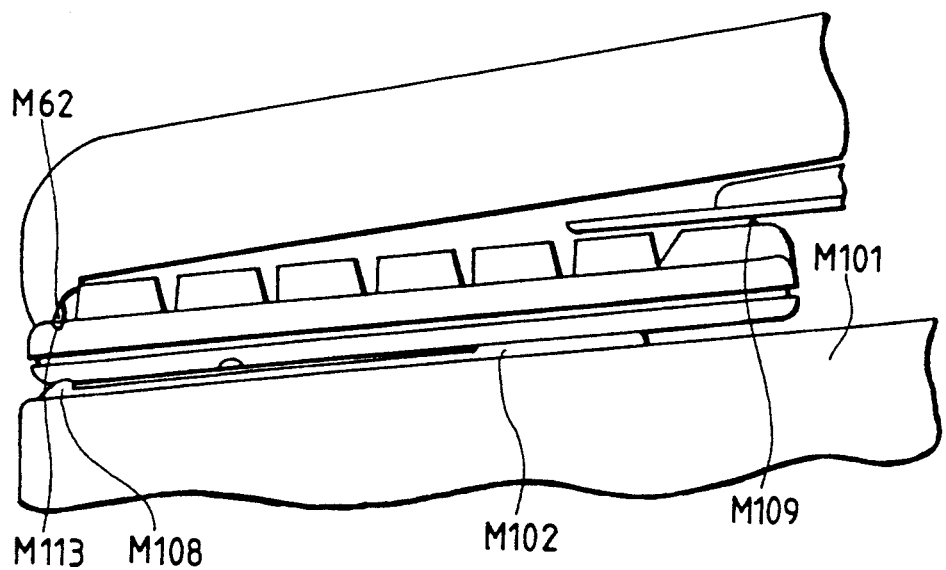
FIG. 11 is a side view showing an internal structure when the display is closed.

As shown in FIG. 11, when the keyboard is housed, and the display is closed, a gap is formed between the touch panel surface and the key top surface. This gap becomes gradually wider toward the rear side, and a sheet feed table unit is arranged in this portion. Banks M15a whose height is gradually increased toward the hinge units are formed on the two sides of the display to fill the above-mentioned gap when the display is closed. That is, the key top surface and the upper surfaces of wing portions of the main body are at almost the same level. If no banks are formed on the display side, the height of the wing portions of the main body must be increased to fill the gap in terms of an outer appearance, and the wing portions have a higher level than that of the key top surface, resulting in poor operability.

Structure of Keyboard Unit

Figure 7:
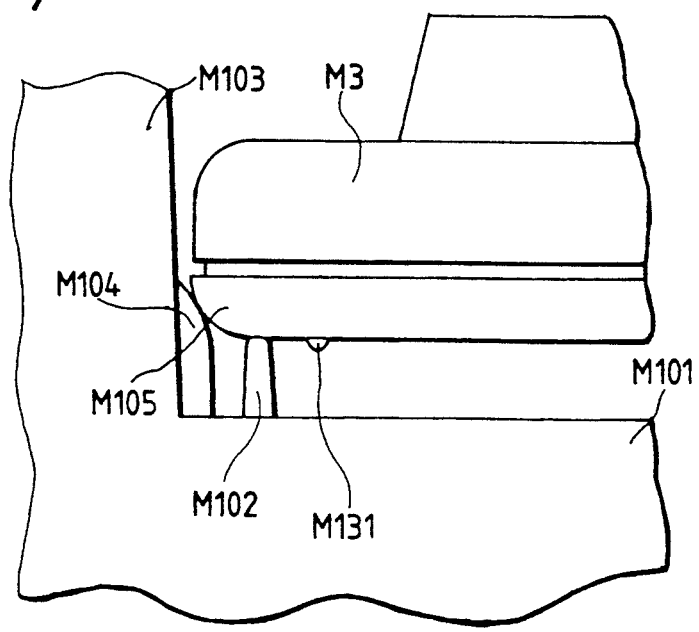
FIG. 7 is a front view of a keyboard portion when viewed from the front side of the main body.

FIG. 7 is a view showing a state wherein the keyboard M3 is stored in the main body when viewed from the front side of the main body. The keyboard M3 is stored in a hollow portion M100 of the main body, and can be moved forward and taken out while being guided along rails M102 arranged on a main body storage surface M101, and two side surfaces M103. More specifically, as shown in FIG. 7, projecting surfaces M104 are formed on the two side surfaces M103 as guides, and are in contact with lower ridge portions M105 of the keyboard M3, so that scratches caused by reciprocal movement of the keyboard are formed at nonconspicuous positions.

Figure 8:
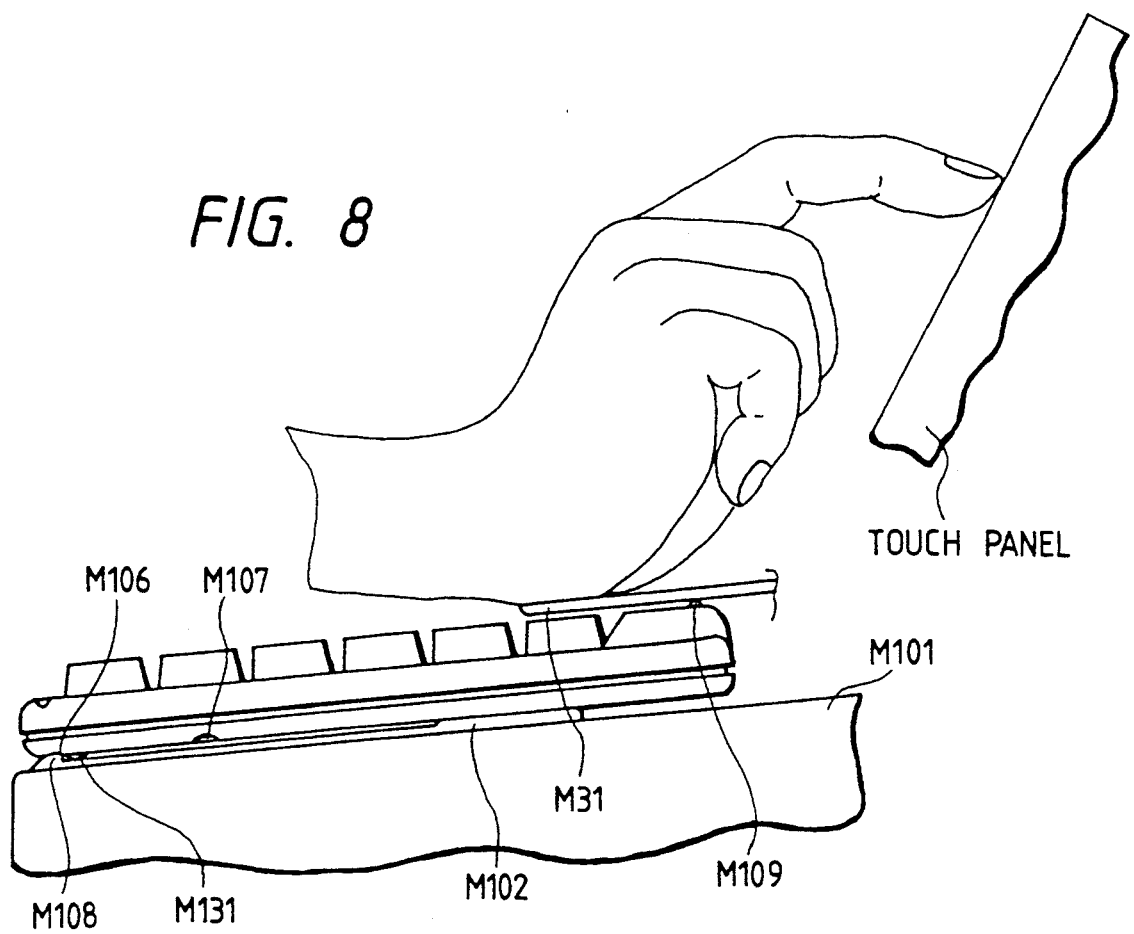
Figure 9:
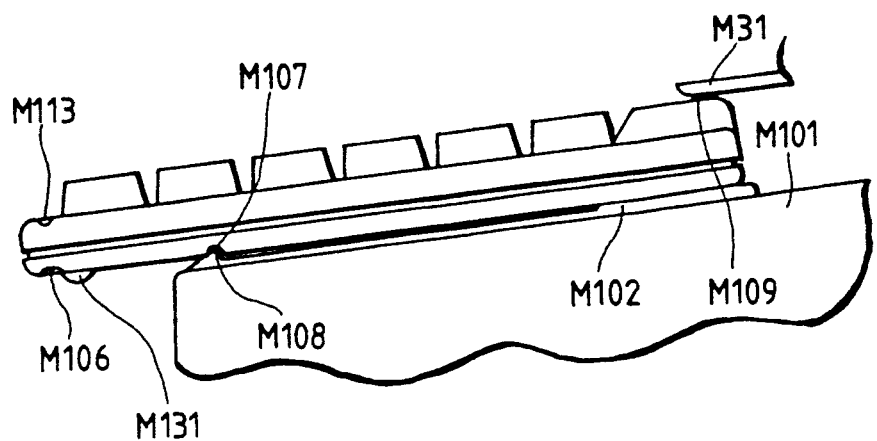
FIG. 9 is a side view showing a state wherein the keyboard is pulled out.

FIGS. 8 and 9 are side views showing a state wherein the keyboard M3 is located on the main body storage surface.

Two pits M106 and M107 are formed in the rear surface of the keyboard. Since these pits are engaged with projections M108 formed on the rail M102, the keyboard can have two stable positions. The keyboard has rubber legs M131. Since no projections are formed on the lower surface of the keyboard, the height of the rubber legs need not be increased. Engaging portions are located near the leading edge of the main body, and the keyboard has a high degree of freedom and can be easily lifted by a hand. Thus, the keyboard can be smoothly moved.

The first position corresponds to a storage position. At this position, as shown in FIG. 8, the projection M108 is fitted in the pit M106, and the leading edge of the keyboard is aligned with that of the main body. When the keyboard is located at the storage position, function keys located at deeper positions are concealed by a sheet feed table unit, and can be prevented from being touched by a hand when a user touches the touch panel with his or her finger.

The second position corresponds to an operation position. At this position, as shown in FIG. 9, the projection M108 is fitted in the pit M107. In this case, the function keys concealed by the sheet feed table unit M31 appear, so that all the keys can be operated. The pit M107 is formed deep to enhance safety at the operation position, and the pit M106 is formed shallow to allow smooth movement of the keyboard at the storage position. The rear portion of the keyboard is located below the sheet feed table unit, and projections M109 formed on the rear portion of the keyboard M3 are in contact with the lower surface of the sheet feed table unit, thus preventing the keyboard from floating upon operation of keys. The sheet feed table unit is detachably mounted on the main body, and can be detached when an excessive force is applied thereto. For example, when a portion of the keyboard is left under the sheet feed table unit, and the keyboard is lifted upward, the sheet feed table unit can be prevented from being broken. When a cable is stored incorrectly and is caught between the keyboard and the sheet feed table unit, and when the keyboard cannot be taken out, the sheet feed table unit can be detached to release this state.

Figure 10:
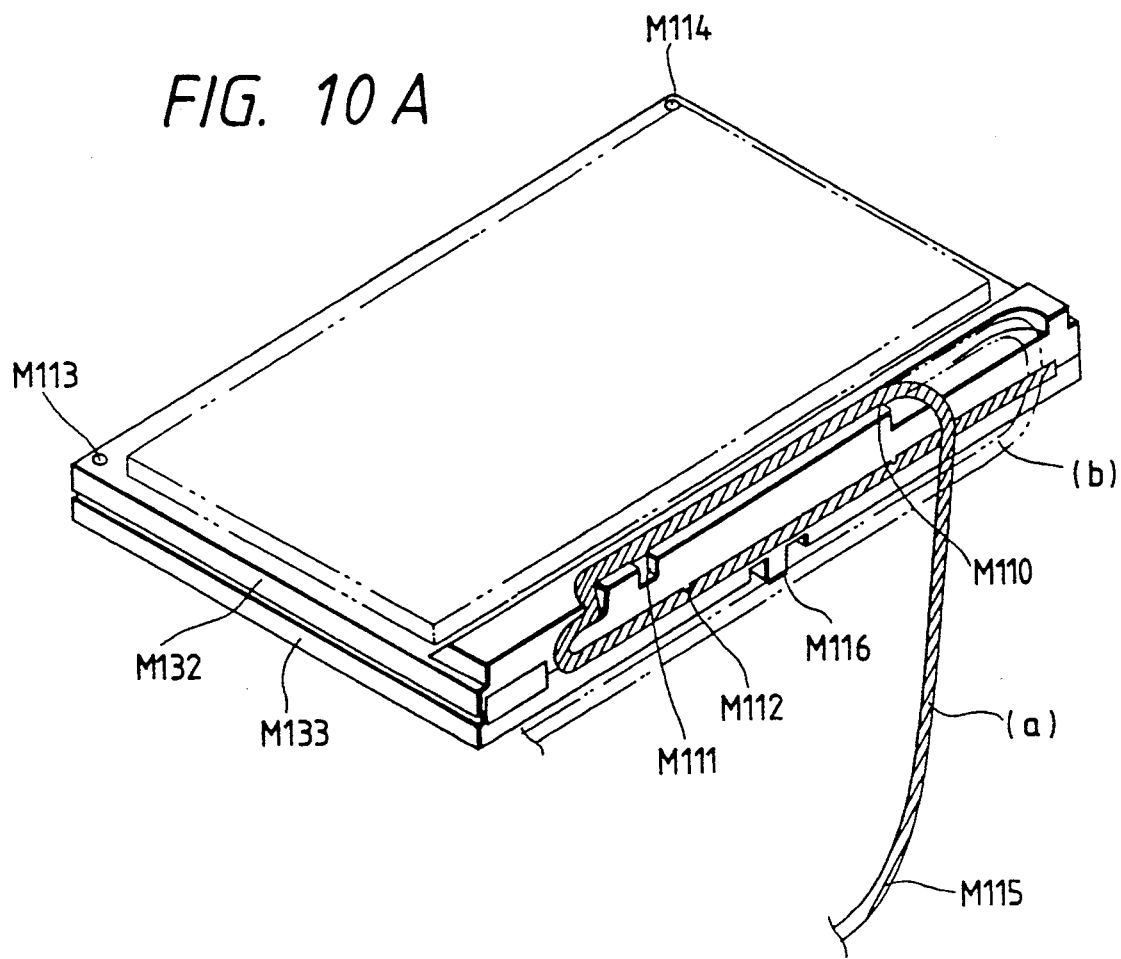
FIG. 10A is a rear perspective view of the keyboard storing a cable.
FIG. 10B is an enlarged sectional view showing a storage state of a cable.
Figure 10:
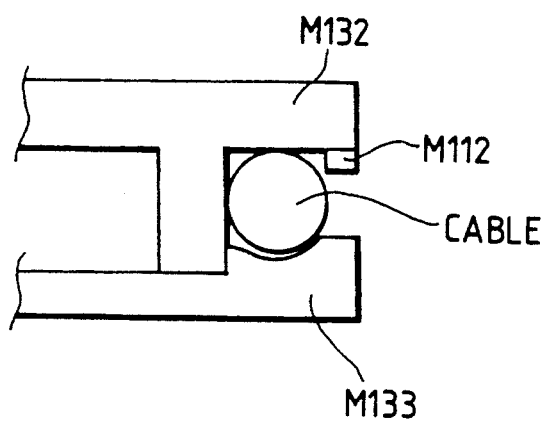

FIG. 10A is a rear perspective view of the keyboard M3. Pits M113 and M114 are formed in the front upper surface portions of the keyboard M3. When the display is closed, the projections M62 and M63 are fitted in these pits, and the keyboard is held at the storage position. FIG. 11 illustrates a state when the display is closed.

The pits M113 and M114 are small and shallow so as not to impair an operation feeling and an outer appearance. However, since the projections are fitted in the pits in the bottom and upper surfaces of the keyboard to sandwich the keyboard vertically, a high holding force can be assured.

Cable

Storage of the cable will be described below with reference to FIG. 10A. A cable M115 is stored in a groove formed to extend from the back surface to the upper surface of the keyboard M3. The groove is formed in the upper surface up to a 2/3 position of the width of the upper surface. That is, the cable M115 is fixed to a terminal end M110 of the groove. As shown in FIG. 10A, when the keyboard is pulled out, the cable M115 is located at a position (a), and when the keyboard is stored in the main body, the cable is stored in the back surface in a U shape, as indicated by an alternate long and two short dashed line (b). When the cable is fixed in this position, the keyboard can be set at a position below and in front of the main body. The cable can be fixed at several other positions such as a portion M111 where the groove is notched, a hook M112, and the like in addition to the groove, and can be extended up to about 70 cm. Thus, the keyboard can be used on the user's lap.

When the keyboard is stored in the main body, it is pushed in from its rear side. As shown in FIG. 9, since the keyboard is fitted under the sheet feed table unit M31, if the cable on the upper surface floats from the groove, the cable is pinched, and the keyboard can no longer be moved. Contrary to this, if the cable floats on the back surface side, there is no fear of such a trouble since the cable is pushed in. In the apparatus of the present invention, a predetermined length of the cable to be frequently used is stored in the upper surface side, and the remaining cable portion is stored in the back surface side.

A case of the keyboard can be divided into two cases, i.e., an upper case M132 and a lower case M133, as shown in FIG. 10A, and the groove formed in the back surface is defined by these upper and lower cases. FIG. 10B is a sectional view of the keyboard. A shallow groove is formed in the lower case M133 side, and the cable is pressed by the upper case M132. Thus, the cable can be held by a simple structure, and the hook M112 is added to easily form a portion with a strong holding force.

Ejector

Figure 12:
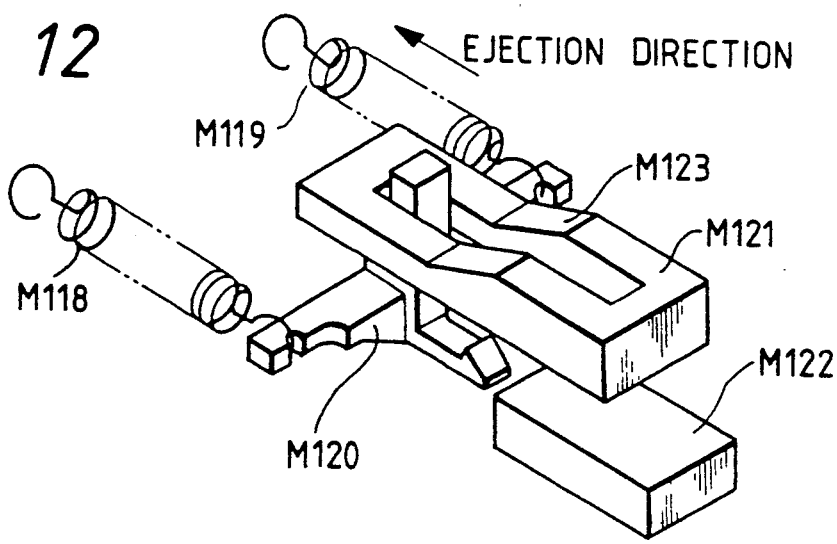
FIG. 12 is a perspective view showing a structure of an ejector unit.
Figure 13A:
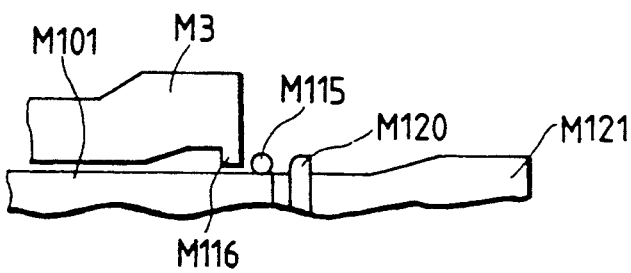
FIGS. 13A to 13D are side views showing the relationship between the keyboard and an ejector guide.
Figure 13B:
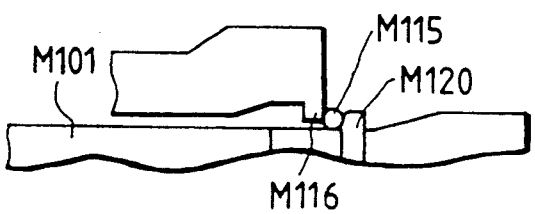
Figure 13C:
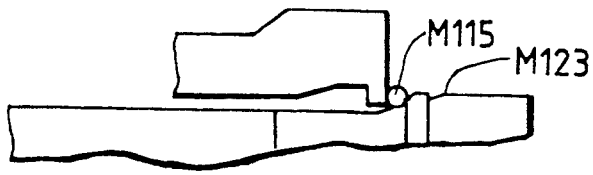
Figure 13D:
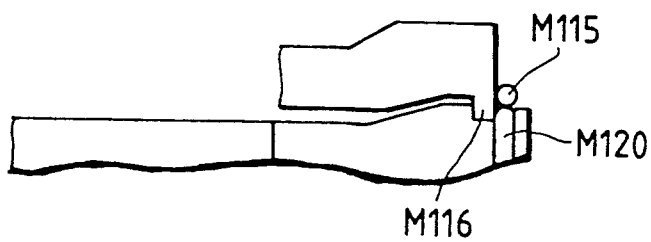

The keyboard M3 is pushed out from the storage position toward the operation position by an ejector unit M117 arranged in the main body. FIG. 12 shows a structure of the ejector unit. FIG. 12 illustrates the ejector unit when viewed from the back surface side in correspondence with FIG. 10A.

The ejector unit M117 comprises an ejector M120 which is biased by springs M118 and M119 in a direction to push out the keyboard, an ejector guide M121 for guiding sliding movement of the ejector M120, and a latch M122 for latching and releasing the ejector M120. A projection M116 formed on the back surface of the keyboard M3 opposes the ejector M120, and pushes the ejector M120 toward the latch in cooperation with movement for pushing in the keyboard in the storage direction, so that the ejector M120 in a released state is latched by the latch M122. When the keyboard is pushed in the storage direction, the ejector is released in cooperation with this operation, and the ejector M120 is moved by the biasing forces of the springs M118 and M119, thereby pushing out the keyboard M3. A slope M123 is formed on the ejector guide M121, and the rear surface of the keyboard is scooped out in correspondence with the slope. Thus, since the cable is lifted up along the slope, and climbs over the projection, it can be prevented from being caught between the projection and the ejector.

An operation of the ejector unit will be described in detail below with reference to FIGS. 13A to 13D. FIGS. 13A to 13D are side views showing the relationship between the keyboard M3 and the ejector guide M121, and illustrate operations until the keyboard is stored in turn from the above.

(A) When the projection M116 on the back surface of the keyboard reaches the ejector M120, the cable M115 is present between the projection M116 and the ejector M120.

(B) The projection M116 pushes the ejector M120 while sandwiching the cable M115 therebetween.

(C) The cable M115 is gradually lifted upward along the slope M123.

Figure 19:
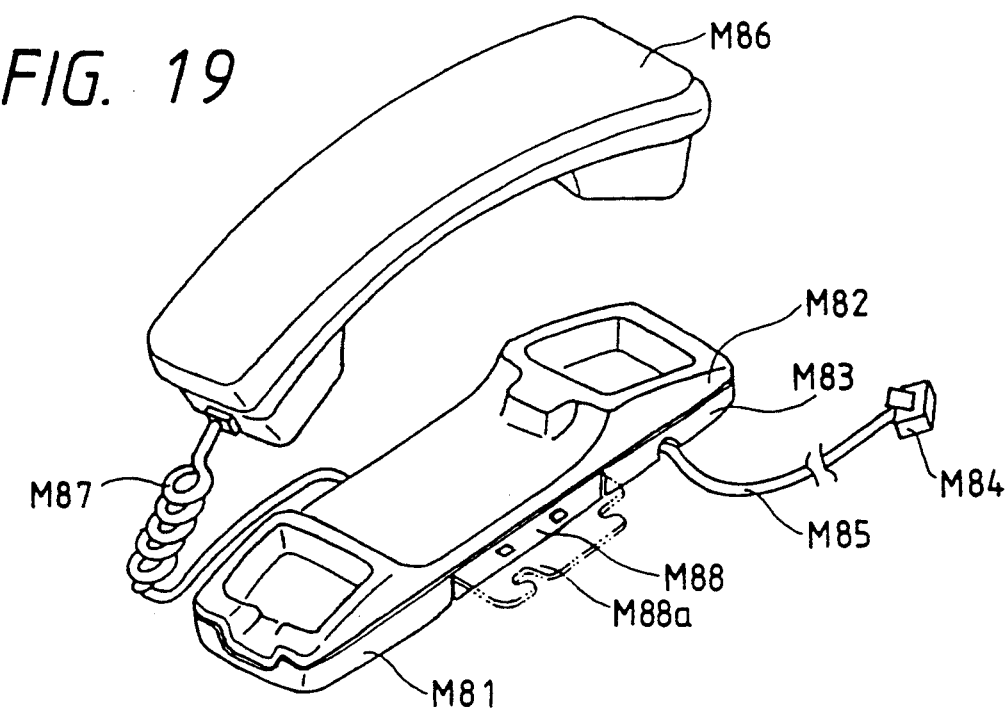
FIG. 19 is a perspective view showing an outer appearance of a handset unit.

(D) The cable M115 is lifted up along the slope M123, and climbs over the projection M116, the projection M116 is in correct contact with the ejector M120, and the ejector M120 is pushed into a regular position Structure of Handset FIG. 19 shows the handset unit M4.

The handset base M81 is constituted by an upper cover M82 and a lower cover M83. The base M81 comprises a telephone line M85 having a connector M84 to be connected to the main body. A handset M86 is connected to the handset base M81 via a telephone line M87. A base fixing member M88 for coupling the base to the main body is pivotally and slidably arranged on the base M81 to define an outer shape of the base M81. When the fixing member M88 is pivoted and slid, it causes one-end fixing portion M88a to project, as indicated by an alternate long and short dashed line.

Figure 20:
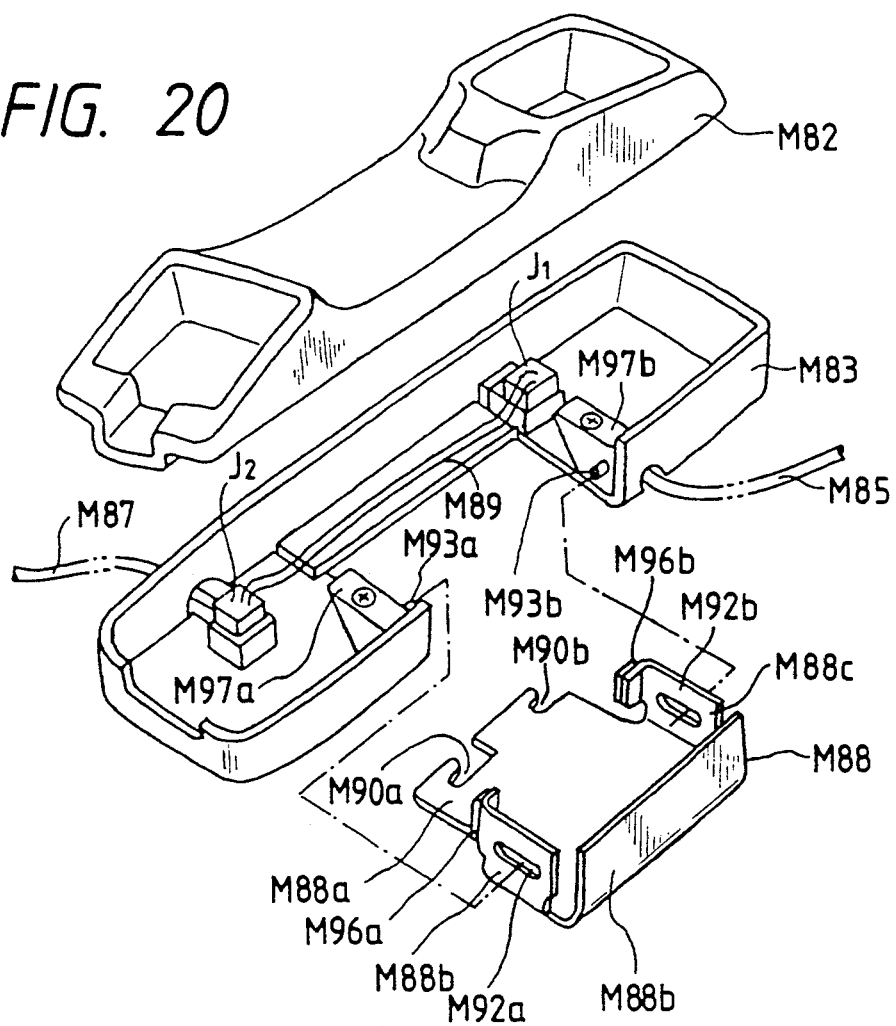
FIG. 20 is an exploded perspective view of a handset base.
Figure 21:
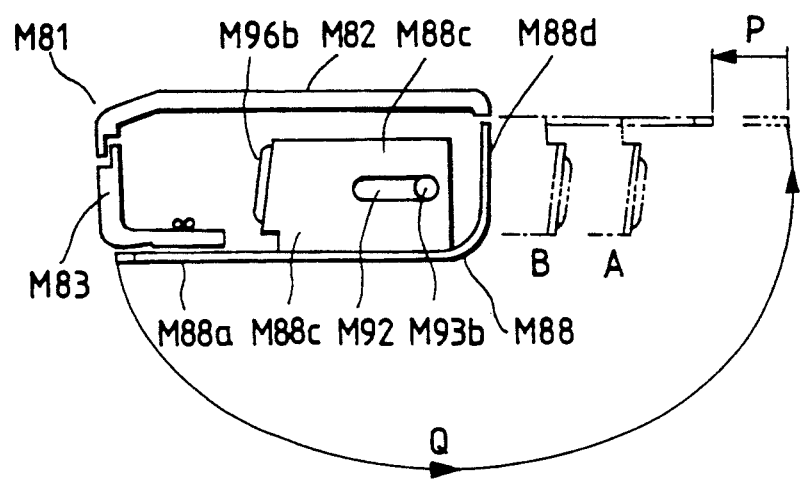
FIG. 21 is a sectional view of a handset base fixing member.

FIG. 20 is an exploded perspective view of the handset base M81, and reference numerals M82, M83, and M88 designate the upper cover, the lower cover, and the base fixing member shown in FIG. 19, respectively. A junction cable M89 which joins the telephone lines M85 and M87 via two modular jacks $J_1$ and $J_2$ is arranged in the lower cover M83. The base fixing member M88 is formed into a shape for partially defining the bottom and side surfaces of the lower cover M83. One end of the base fixing member M88, which partially defines the bottom surface of the lower cover M83, forms the fixing portion M88a, and two hooked grooves M90a and M90b are juxtaposed in the distal end portion of the fixing portion M88a. Bent segments M88b and M88c are formed at two sides of the base fixing member M88. Elongated holes M92a and M92b are formed in the bent segments M88b and M88c on the side of the other end portion M88d defining a portion of the side surface of the lower cover M83. Shafts M93a and M93b extending from mounting pieces M97a and M97b mounted on the lower cover M83 are inserted in these elongated holes M92a and M92b. Thus, the base fixing member M88 is pivotal in a Q direction, and is slidable in a P direction after the pivotal movement, as shown in FIG. 21. Abutment portions M96a and M96b are formed on the bent segments M88b and M88c, respectively, and abut against the outer wall of the main body cover M6 when the fixing member is coupled to the main body, as shown in FIG. 22.

Figure 22:
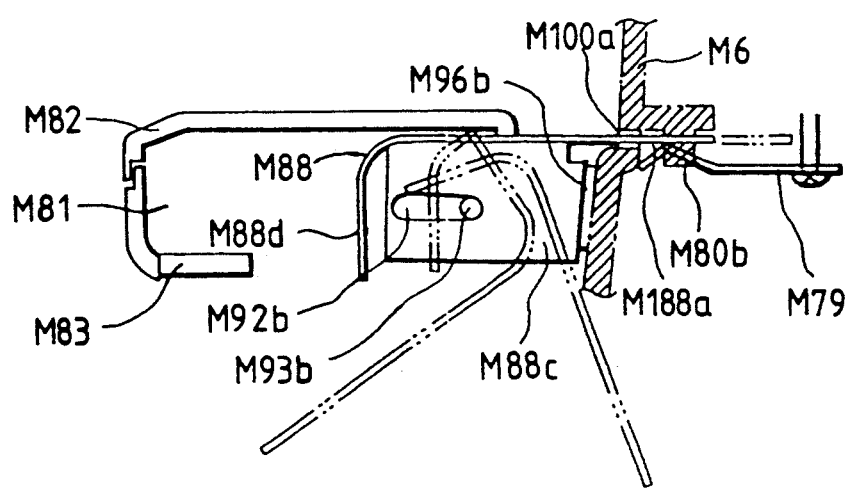
FIG. 22 is a front view showing a state wherein the fixing member is coupled to the main body.
Figure 23:
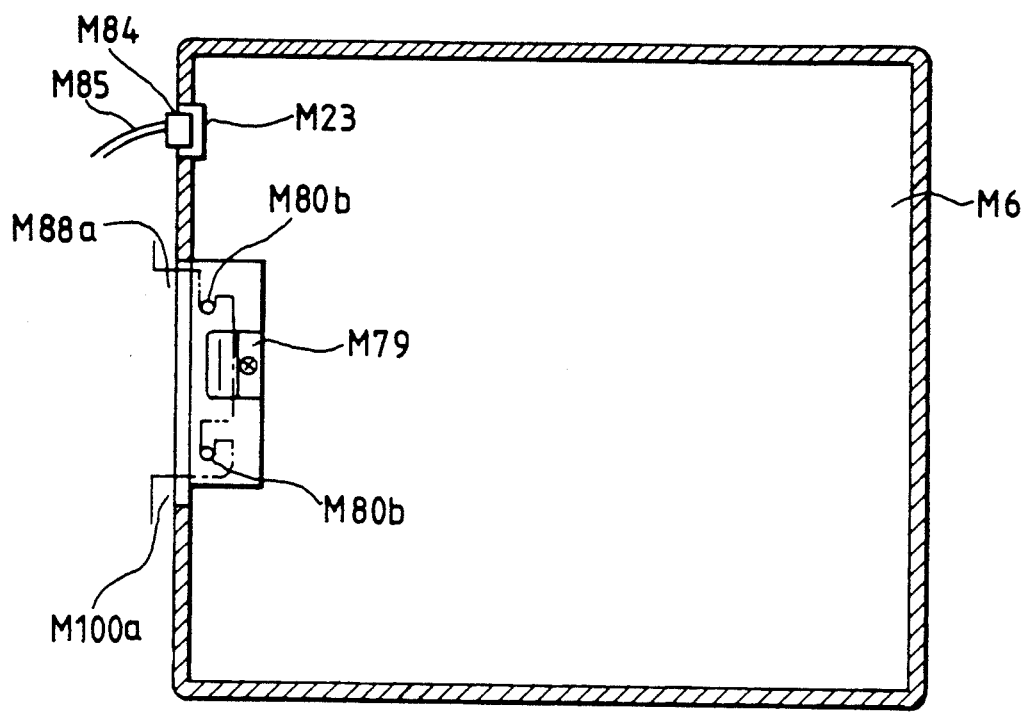
FIG. 23 is a plan view showing a state wherein the fixing member is coupled to the main body.

The fixing portion M88a is coupled to a coupling portion M100a of the main body cover M6, as shown in FIGS. 22 and 23, and the grooves M90a and M90b at the distal end portion of the fixing portion M88a are locked by shafts M80b. A connector M102 of the main body receives the connector M84 of the handset base M81.

Figure 3:
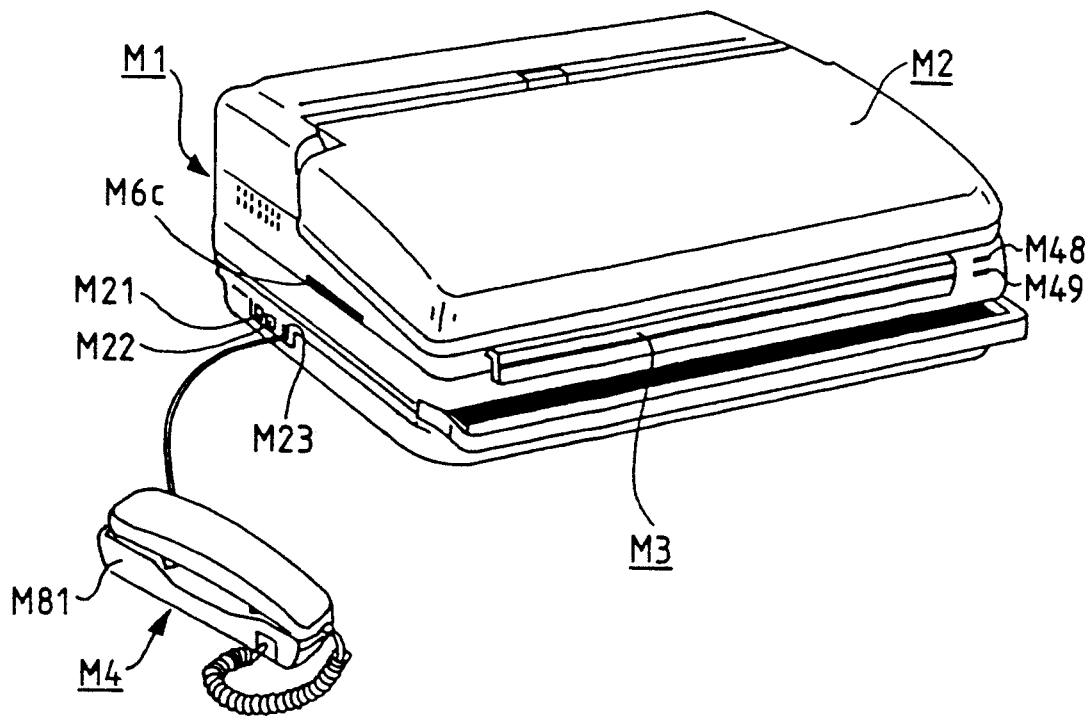
FIG. 3 is a perspective view of the apparatus according to the present invention when viewed from an obliquely front side.

The operation of the above structure will be described below. A description will be started from a state wherein the base fixing member M88 partially defines the outer shape of the lower case M83 of the handset base M81, as indicated by a solid line in FIG. 21. In this state, it is impossible to couple the handset base M81 to the coupling portion M100a of the main body cover M6. Only the connector M84 of the telephone line M85 extending from the base M81 is connected to the modular jack M23 of the main body, and the handset base M81 is separated from the main body to be located at a desired position. The overall state at this time is illustrated in FIG. 3.

A case will be described below wherein the handset base M81 is coupled to the main body.

The base fixing member M88 is pivoted about the shafts M93a and M93b via the elongated holes M92a and M92b from a storage state shown in FIG. 21 until it contacts the upper cover M82 in a direction of an arrow Q. As a result, the abutment portions M96a and M96b are located at a position indicated by an alternate long and two short dashed line A in FIG. 21. The fixing portion M88a at the distal end portion of the base fixing member M88 is slid by a distance defined by the elongated holes M92a and M92b in a direction of an arrow P, so that the abutment portions M96a and M96b are located at a position indicated by an alternate long and two short dashed line B in FIG. 21.

The fixing portion M88a of the base fixing member M88 is inserted in the coupling portion M100a of the main body cover M6 until the abutment portions M96a and M96b abut against the outer surface of the main body cover M6, and the shafts M80b of the coupling portion M100a are fitted in and engaged with the hooked grooves M90a and M90b, so that the fixing portion M88a is locked by the main body. As a result, the handset base M81 comprising the handset M86 is coupled to the main body, as shown in FIGS. 22 and 23. At this time, the handset base M81 is securely and three-dimensionally held by the main body by the following holding portions, i.e., the engaging portions between the grooves M90a and M90b at the distal end of the fixing portion M88a and the shafts M80b on the main body side, the abutment portions M96a and M96b abutting against the outer wall of the main body cover M6, the shafts M93a and M93b, and the base portion of the fixing portion M88a, which contacts the upper cover M82. An area of the base portion of the fixing portion M88a, which contacts the upper cover M82, is increased by sliding the base fixing member M88 in the direction of the arrow P, and the base M81 can be held by the main body very securely. A leaf spring M79 arranged in the main body cover M6 presses the fixing portion M88a against the main body cover M6, thus preventing the handset base M81 from cluttering with respect to the main body. The overall state of the base M81 and the main body coupled in this manner is shown in FIG. 4. Thus, the apparatus can be used in the same manner as in a state wherein the handset base M81 were arranged integrally with the main body. A case will be described below wherein the handset base M81 is separated from the main body, as shown in FIG. 3, and is set in an independent state again.

Engagement between the grooves M90a and M90b of the fixing portion M88a and the shafts M80b of the coupling portion M100a is released, and the fixing portion M88a is disengaged from the coupling portion M100a of the main body cover M6. The fixing portion M88a of the base fixing member M88 is slid in a direction opposite to the direction of the arrow P, so that the abutment portions M96a and M96b are moved from the position indicated by the alternate long and two short dashed line B to the position indicated by the alternate long and two short dashed line A (FIG. 21). The base fixing member M88 is pivoted in a direction opposite to the direction of the arrow Q, thus setting the base fixing member M88 in a storage state shown in FIG. 21.

Structure of Scanner Unit

The scanner unit M13 is located in a rear portion of the main body, and uses a gap between a portion below the display hinges and the main body unit M1 as a sheet feed port. In a sheet feed unit, the sheet feed table unit M31 comprising an original guide means is fitted in four holes M6b (FIG. 2) of the main body cover M6. This unit M31 can be easily attached/detached by snap fit since it is replaced with a unit having no original guide for a model without a scanner. This engaging system is also effective as a safety means when a large force is applied to the unit upon rough handling of the keyboard M3. FIG. 16A is a sectional view of the scanner unit. As shown in FIG. 16A, the scanner unit comprises a separation roller M222, a separation pad M223, a pair of convey rollers M224 and M225, a reading sensor M226, a reading platen roller M227, and a pair of exhaust rollers M230 and M231. When an original is to be transmitted in a FAX mode, a user sets an original on the sheet feed table unit M31. An original sensor M234 is arranged immediately before the separation roller M222. When the sensor M234 detects insertion of the original, a control circuit on the CPU board M24 drives a sheet feed motor (not shown) to rotate the separation roller M222. The separation roller M222 separates a lowermost sheet by a frictional force between itself and the separation pad M223, and feeds and stops it at an original edge sensor M235. When a user issues a FAX transmission or copy command from the touch panel, a control unit drives the sheet feed motor and a convey motor (neither are shown), thereby feeding the sheet until it is clamped between the pair of convey rollers M224 and M225. Thereafter, the control unit stops the sheet feed motor to inhibit the second and subsequent sheets from being fed, and conveys the first sheet to a reading unit above the reading sensor M226. Image information of the original sheet conveyed to a position between the reading sensor M226 and the reading platen roller M227 is electrically read by known photoelectric conversion, and is transmitted to the control circuit. The first original is electrically read while being fed by the convey roller M224, and is then exhausted by the pair of exhaust rollers M230 and M231 onto a tray M236 equipped on the rear portion of the main body. The second and subsequent sheets are read and exhausted by the same operations as described above.

The apparatus of the present invention is constituted by the above-mentioned units.

Summary of Printer

Figure 24:
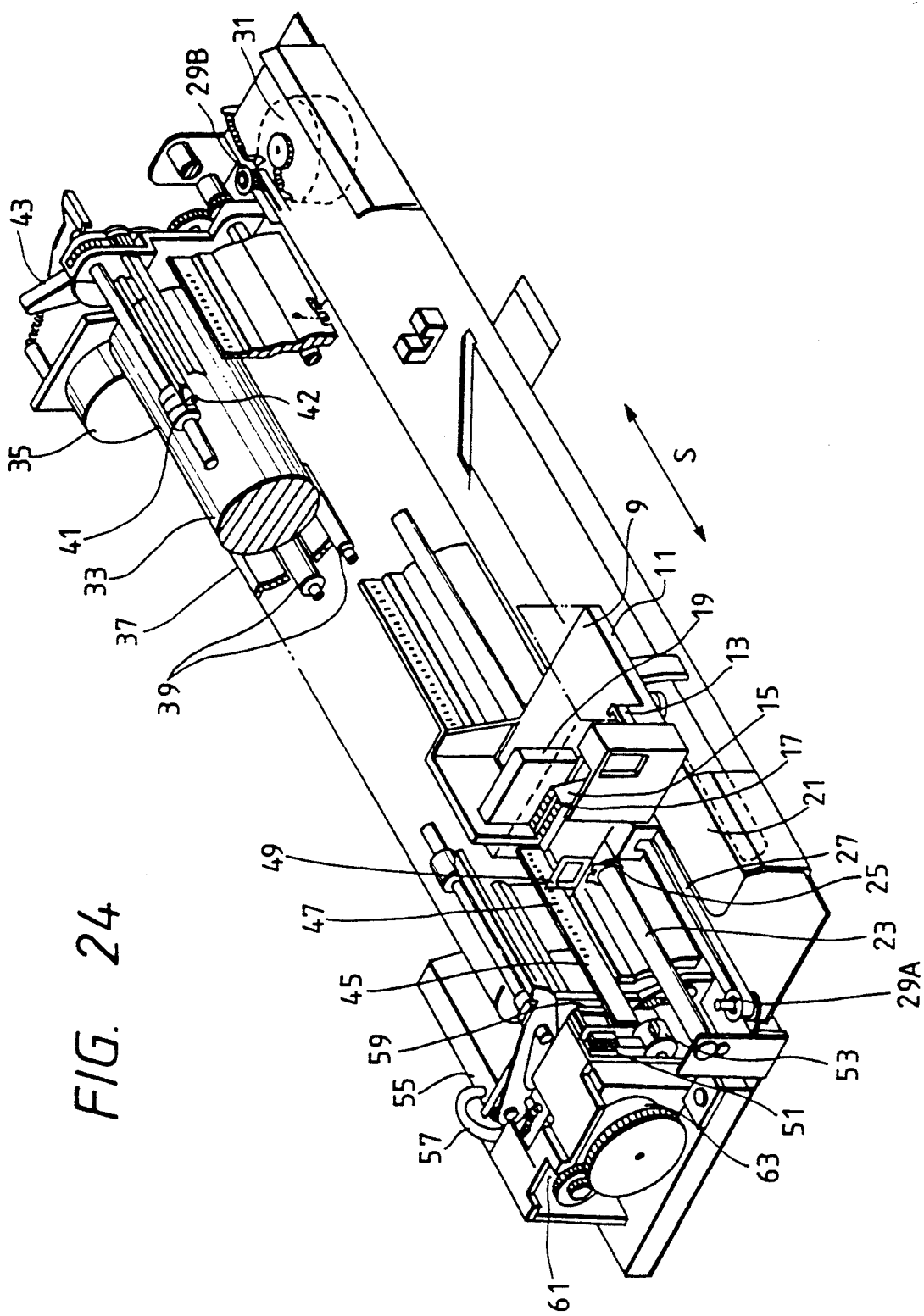
FIG. 24 is a perspective view showing an internal structure of the printer shown in FIG. 1.

FIG. 24 shows an internal structure of the printer M200 shown in FIG. 1.

A carriage 11 carries a head cartridge 9 having an ink-jet recording head (to be described in detail later with reference to FIG. 25), and scans in directions S in FIG. 24. The head cartridge 9 is mounted on the carriage 11 by a hook 13, which is operated by a lever 15 The lever 15 has a marker 17 for indicating a scale marked on a cover (to be described later) to allow reading of a printing or setting position of the recording head of the head cartridge. A support plate 19 supports an electrical connection portion for the head cartridge 9. A flexible cable 21 connects the electrical connection portion and the control unit of the main body.

The carriage 11 is guided in the directions S along a guide shaft 23, which is inserted in a bearing 25 of the carriage 11. The carriage 11 is fixed to a timing belt 27 for transmitting a driving force for moving the carriage 11 in the directions S. The timing belt 27 is looped between pulleys 29A and 29B arranged at the two side portions of the apparatus. One pulley 29B receives a driving force from a carriage motor 31 through a transmission mechanism such as gears.

A platen roller 33 for regulating a recording surface of a recording medium such as a paper sheet (to be also referred to as a recording sheet hereinafter), and conveying it during, e.g., a recording operation is driven by a convey motor 35. A paper pan 37 is used to guide a recording medium from a sheet feed tray 4 side to a recording position. Feed rollers 39 are arranged midway along a convey path of the recording medium, and press the recording medium against the platen roller 33 to convey it. An exhaust roller 41 is arranged at the upstream side of a convey direction of a recording medium, and at the downstream side of the recording position, and exhausts the recording medium toward an exhaust port (not shown). A spur 42 is arranged in correspondence with the exhaust roller 41. The spur 42 presses the roller 41 via a recording medium to cause the exhaust roller 41 to generate a convey force for the recording medium. A release lever 43 is used to release biasing forces of the feed rollers 39, a pressing plate 45, and the spur 42 when a recording medium is set.

The pressing plate 45 suppresses, e.g., floating of a recording medium near the recording position to keep a contact state of the recording medium with respect to the platen roller 33. The printer of the present invention employs an ink-jet recording head for performing a recording operation by ink ejection as a recording head. Therefore, a distance between an ink ejection port formation surface of the recording head and the recording surface of the recording medium is very small, and must be strictly controlled to prevent contact between the recording medium and the ejection port formation surface. Thus, the pressing plate 45 can effectively control such a distance.

A cap 51 is formed of an elastic member such as rubber, and opposes the ink ejection port formation surface of the recording head. The cap 51 is supported to be able to contact or separate from the recording head. The cap 51 is used to protect the recording head in a non-recording mode, and used in ejection recovery processing of the recording head. The ejection recovery processing includes processing for driving energy generation elements, which are arranged in the ink ejection ports and used to eject an ink, and ejecting an ink from all the ejection ports, thereby removing ejection error factors such as bubbles, dust, an inks whose viscosity is too high to be recorded, and the like (preliminary ejection), and progressing for forcibly discharging an ink from the ejection ports to remove the ejection error factors in addition to the above-mentioned processing.

A pump 53 is used to apply a suction force for forcibly discharging an ink, and to draw an ink received by the cap 51 by suction in the ejection recovery processing by forced discharge or the ejection recovery processing by preliminary ejection. A discharged ink tank 55 stores a discharged ink drawn by suction by the pump 53. The pump 53 and the discharged ink tank 55 communicate with each other via a tube 57.

A blade 59 wipes the ejection port formation surface of the recording head, and is supported to be movable between a position where the blade projects toward the recording head to wipe the head during movement of the head, and an escape position where the blade is not engaged with the ejection port formation surface. A cam device 63 drives the pump 53, and moves the cap 51 and the blade 59 upon reception of a driving force from a motor 61.

The head cartridge 9 described above will be described in detail below.

Figure 25:
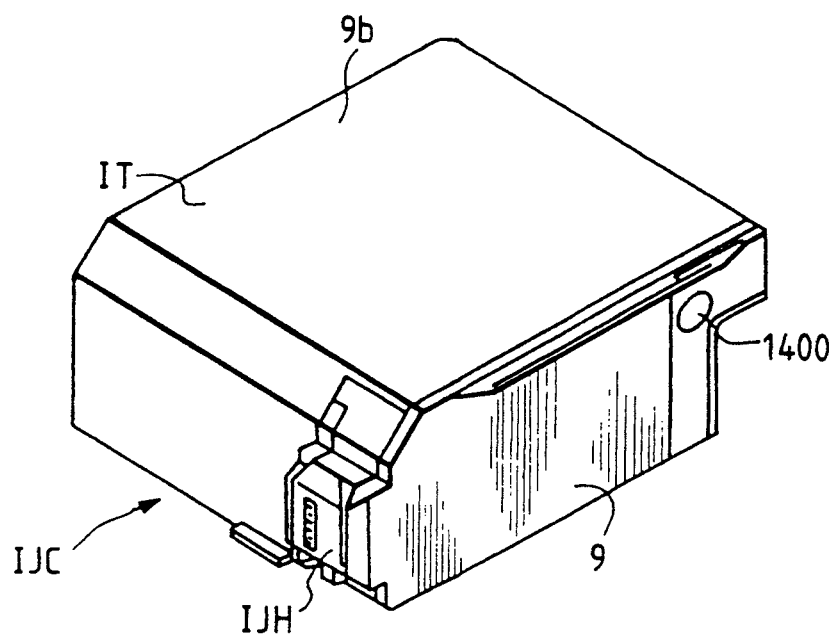
FIG. 25 is a perspective view of a head cartridge as a recording means of the printer.

FIG. 25 is a perspective view of the head cartridge used as a recording means of the printer used in the present invention. The head cartridge is of a disposable type which integrates an ink storage portion as an ink supply source.

A recording head unit IJH of this cartridge comprises a heater board (not shown) prepared by forming electro-thermal conversion elements ejection heaters), and an Al wiring layer for supplying an electric power to these elements on an Si substrate by a film formation technique.

The recording head unit IJH comprises a supply tank, which serves as a subtank for receiving an ink from an ink storage portion IT serving as an ink supply source, and guiding an ink to a common ink chamber defined by joining the heater board and a top plate.

The ink storage portion IT incorporates an absorbing member for impregnating an ink, and is arranged in an ink tank main body 9b.

An air communication port 1400 is formed to communicate the interior of the cartridge with air. An ink repellent is arranged in the air communication port 1400, thereby preventing leakage of an ink from the air communication port 1400.

An ink is supplied from the interior of the cartridge into the supply tank constituting the recording head, and passes through the interior of the tank. Thereafter, the ink flows from an outlet port into the common ink chamber via a proper supply tube and an ink inlet port of the top plate.

The ejection heaters are heated on the basis of a predetermined recording signal, and the ink is ejected by utilizing the heat energy, thereby obtaining a desired recording image.

This printer employs an ink-jet recording method for forming flying ink droplets by utilizing heat energy to perform recording, i.e., so-called bubble-jet recording head and recording apparatus proposed by CANON INC. of the above-mentioned ink-jet recording systems. According to this method, high-density and high-definition recording can be attained.

As for a typical arrangement and principle of the bubble-jet recording head, the basic principle disclosed in U.S. Pat. Nos. 4,723,129, and 4,740,796 is preferably used. The method disclosed in these references can be applied to either a so-called on-demand type or continuous type system. In particular, the on-demand type system is effective for the following reason. That is, at least one drive signal for giving an abrupt temperature rise exceeding a film boiling temperature in correspondence with recording information is applied to an electro-thermal conversion element arranged in correspondence with a sheet or an ink path for holding an ink, so that the electro-thermal conversion element generates heat energy to cause film boiling on a heat application surface of a recording head, and a bubble can be consequently formed in the ink to have a one-to-one correspondence with this drive signal. Upon growth and shrinkage of this bubble, the ink is ejected through the ejection port, thereby forming at least one ink droplet. It is more preferable to form the drive signal in a pulse form since bubbles can be quickly and appropriately grown and shrunk, thus attaining ink ejection having good response characteristics. As a pulse-drive signal, signals disclosed in U.S. Pat. Nos. 4,463,359 and 4,345,262 are preferable. When conditions associated with a rate of an increase in temperature of the heat application surface, as described in U.S. Pat. No. 4,313,124, are adopted, better recording can be assured.

As for an arrangement of a recording head, the present invention includes an arrangement disclosed in U.S. Pat. Nos. 4,558,333 and 4,459,600 wherein a heat application portion is arranged in a bent region as well as an arrangement as a combination of an ejection port, an ink path, and an electro-thermal conversion element (linear liquid path or a right-angle liquid path) disclosed in the above-mentioned references. In addition, the effect of the present invention can be obtained if an arrangement based on Japanese Laid-Open Patent Application No. 59-123670 which discloses an arrangement wherein a slit common to a plurality of electro-thermal conversion elements is used as an ejection portion of the electro-thermal conversion elements, and an arrangement based on Japanese Laid-Open Patent Application No. 59-138461 which discloses an arrangement wherein an opening for absorbing a pressure wave of heat energy is formed in correspondence with an ejection portion is adopted. More specifically, recording can be reliably and efficiently performed regardless of the types of recording head.

Moreover, the present invention can be effectively applied to a full-line type recording head which has a length corresponding to a maximum width of a recording medium which can be used in a recording apparatus. A recording head of this type may adopt either an arrangement for satisfying the length as a combination of a plurality of recording heads, or an arrangement using an integrally formed single recording head. In addition, the present invention is also effective when an exchangeable chip-type recording head which can be electrically connected to an apparatus main body and can receive an ink from the apparatus main body when it is attached to the apparatus main body like in the above-mentioned serial type head, or a cartridge-type recording head integrally arranged on a recording head itself is employed. In this embodiment, the cartridge-type recording head is exemplified.

It is preferable to add a recovery means, an auxiliary assist means, and the like to a recording head since the effect of the present invention can be further stably obtained. More specifically, these means include a capping means, cleaning means, and compression or suction means for the recording head, a preliminary heating means such as an electro-thermal conversion element, or another heating element, or a combination thereof, and a means for performing a preliminary ejection mode in addition to an ejection operation for recording. If these means are employed, recording can be more stably performed.

As for the type and number of recording heads to be mounted, for example, only one head may be arranged in correspondence with a monochromatic ink, or a plurality of heads may be arranged in correspondence with a plurality of inks having different recording colors and densities.

Figure 17:
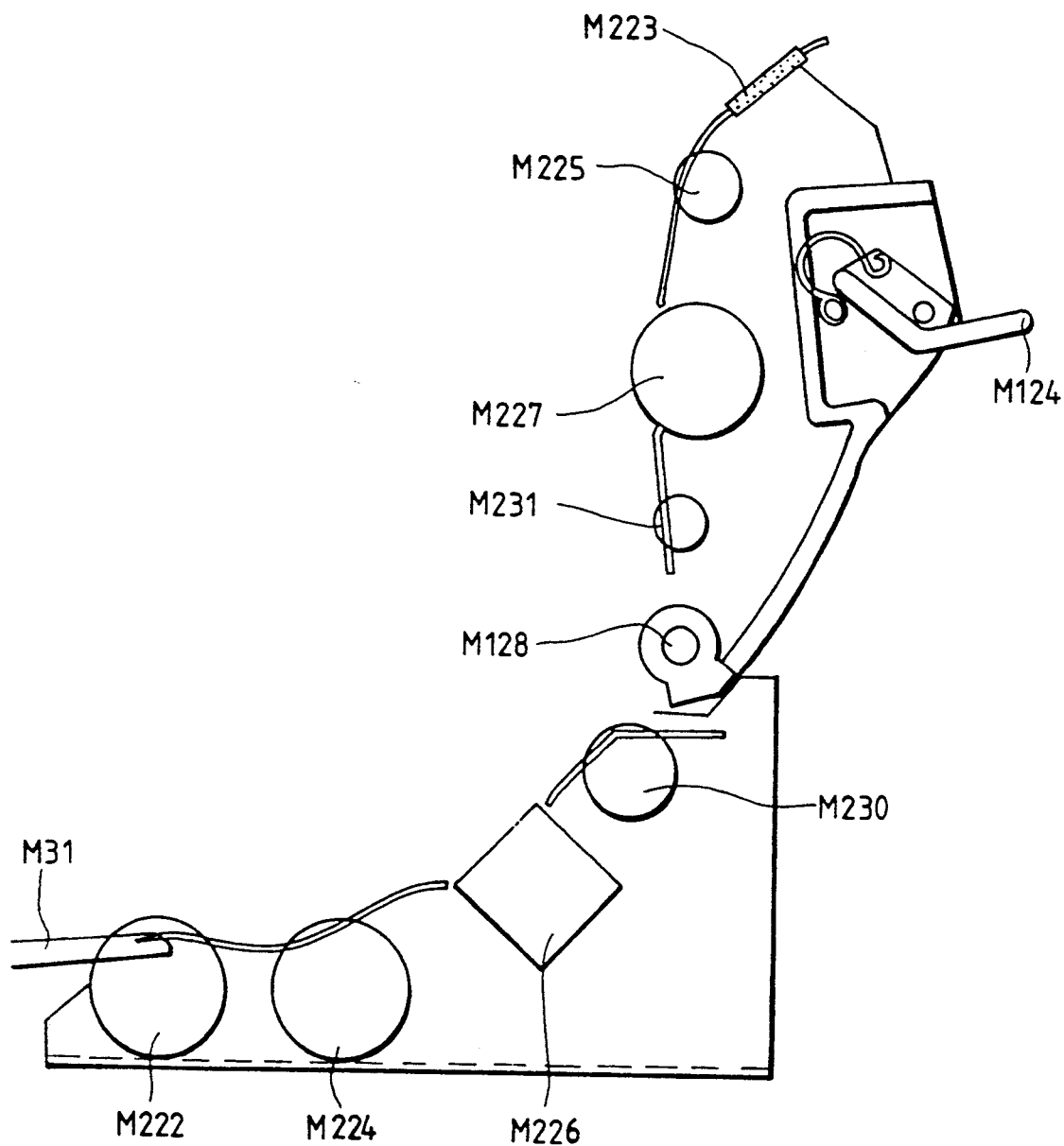
FIG. 17 is a schematic view showing a state wherein the upper unit of the sheet convey path is opened.

A sheet convey path upper portion of the scanner unit can be rotated about a shaft M128 to be opened so as to remove a jamming sheet during conveyance. FIG. 17 shows an open state. Since the upper portion including the separation pad M223, the convey roller M225, the reading platen roller M227, and the exhaust roller M231 is removed, a convey surface appears, and a jamming sheet can be easily removed. The upper portion is opened by holding an opening/closing knob M124 with a hand. The opening/closing knob M124 is normally located at a position (a) shown in FIG. 16A, and is moved to and used at a position (B) when the upper portion of the scanner unit is opened. The opening/closing knob M124 is attached to be rotatable about a shaft M125, and is stabilized at two positions (a) and (b) in association with a spring M127 which is rotated about a shaft M126 in cooperation with the movement of the opening/closing knob M124. In this manner, the opening/closing knob M124 is normally located at the position (a), and is integrated with an outer shape, resulting in good appearance. When a jamming sheet is to be removed, the opening/closing knob M124 is moved to the position (b), and can be easily held by a hand, thus allowing easy opening of the upper portion. FIG. 16B is a perspective view of the opening/closing knob M124 at the position (b).

Figure 18:
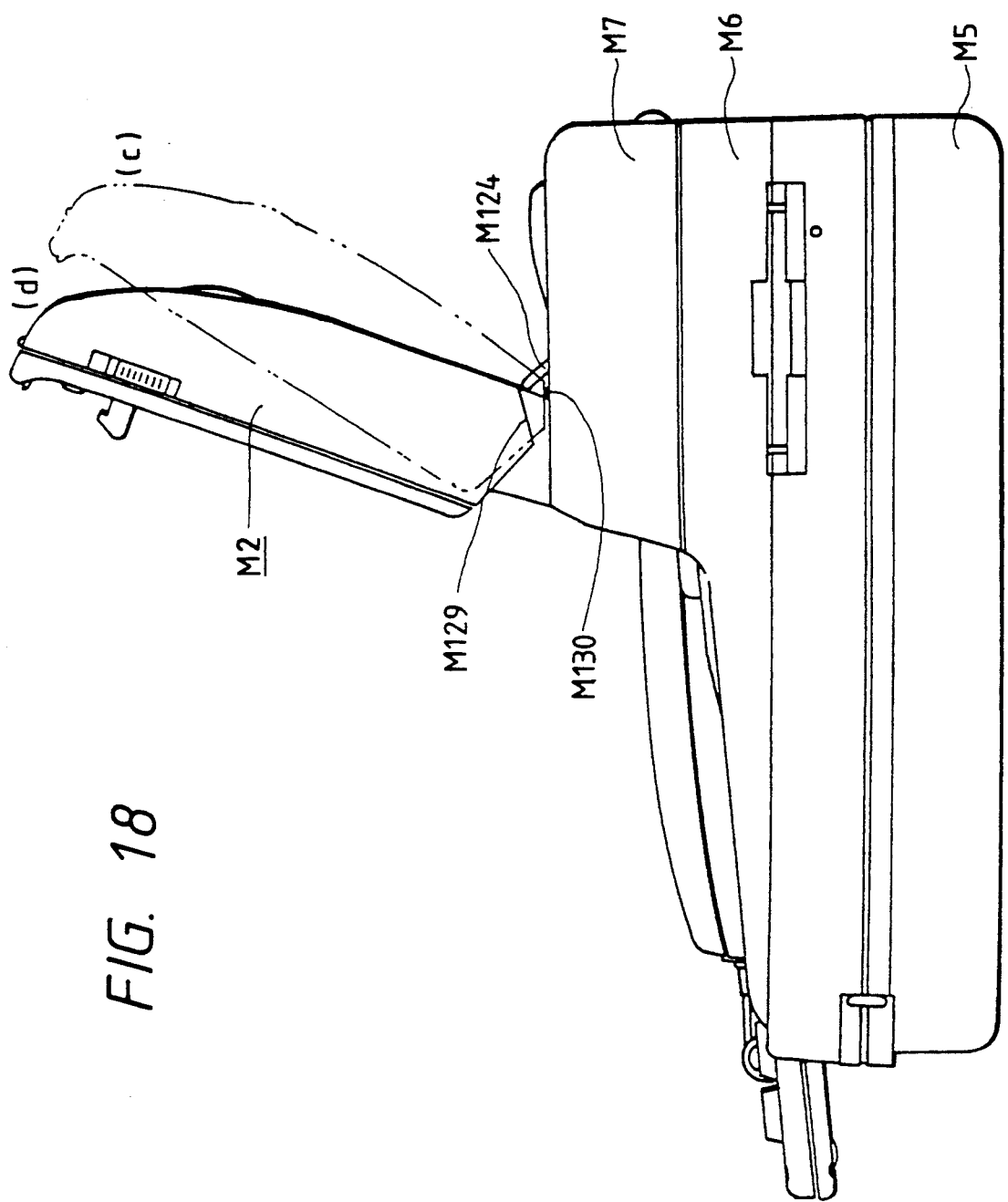
FIG. 18 is a side view showing the opening/closing knob and an angle of the display.

The opening/closing knob M124 also serves as an angle adjusting stopper of the display M2. This will be described below with reference to FIG. 18. When the display M2 is opened at a maximum angle, it is located at a position (c) in FIG. 18. In this case, a surface M129 of the display is in contact with a projection M130 of the upper cover M7 of the main body. In general, an angle of a display is continuously adjusted by utilizing a friction of rotary hinges. However, when the touch panel is pressed during an operation like in the apparatus of the present invention, a holding force of the display is important. In the apparatus of the present invention, a position (d) in FIG. 18 is provided by utilizing the opening/closing knob M124. More specifically, when the opening/closing knob M124 is moved to the position (b) in FIG. 16A, the back surface of the display M2 is in contact with the end portion of the opening/closing knob M124, and the display M2 can be held at the position (d) in FIG. 18.

Basic Circuit Arrangement

Figure 26B:
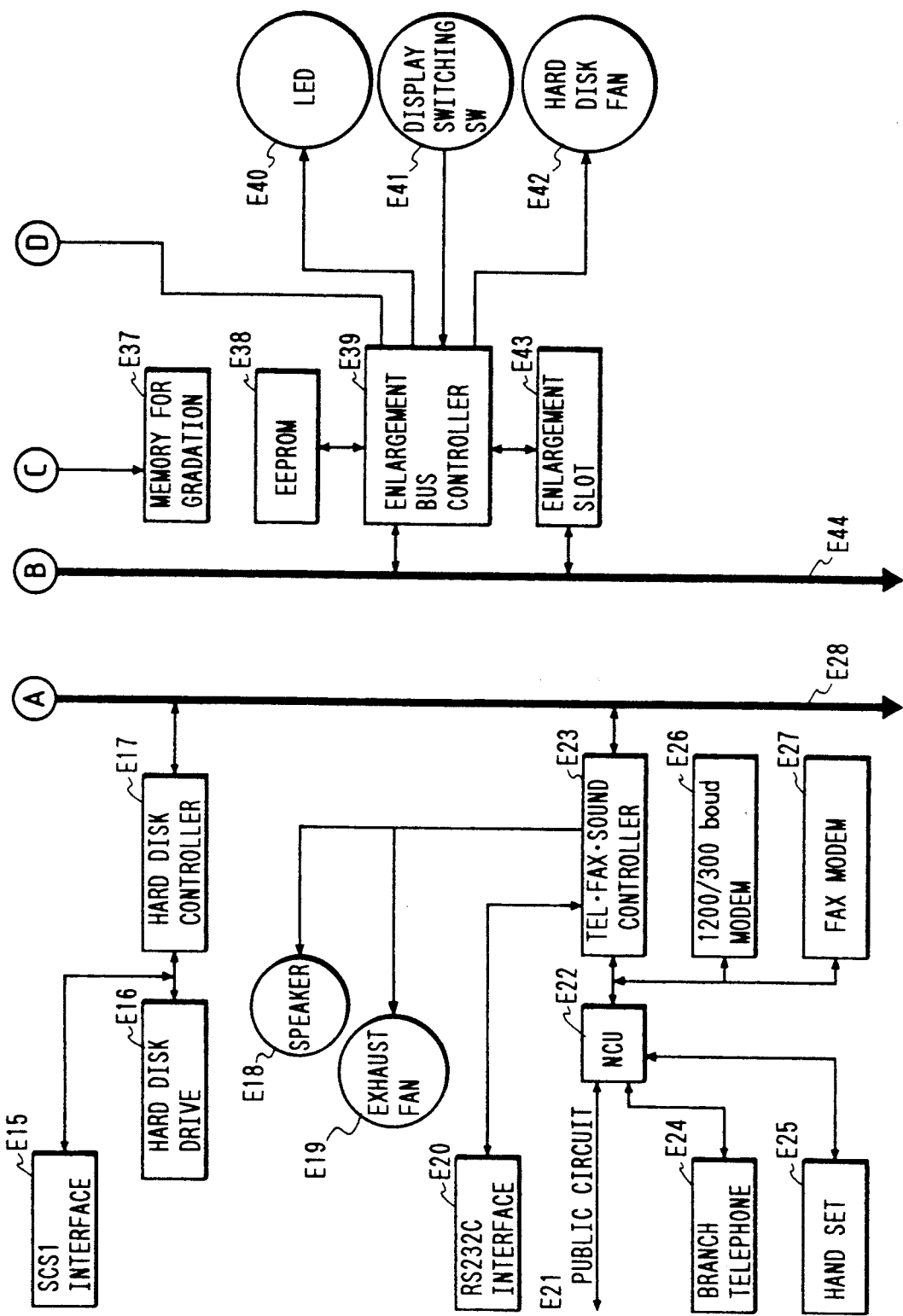
FIG. 26, consisting of FIGS. 26A and 26B, is a block diagram showing a basic arrangement of an embodiment of the present invention.

FIG. 26 is a block diagram showing a basic circuit arrangement of this embodiment.

Respective units will be described below with reference to FIG. 26.

A CPU E1 controls the overall system, and performs calculations for the system. A fundamental operation frequency of the CPU E1 is 10 MHz. A contact sensor E2 converts an image into an electrical signal. As described above, the contact sensor E2 is arranged in the upper surface of the rear portion of the main body. A light source for the contact sensor comprises an LED, and its resolution is 200 dpi. In combination with a scanner controller E3, the contact sensor can read an image in a binary mode or an error diffusion method mode. The scanner controller E3 controls and drives mechanisms of the overall scanner unit, and performs image reading in a binary/halftone (error diffusion method) mode, or the like.

In this embodiment, a printer E4 is of a stand-alone type, and can be selected depending on software applications. For example, a bubble-jet (BJ) printer as one of ink-jet printers, a thermal transfer printer, a laser beam printer (LBP), and the like can be applied, thus meeting a variety of needs. In the apparatus of the present invention, a resolution of 200 dpi is adopted. Since a printer controller E5 (to be described below) performs density conversion, a 360-dpi printer can be used. The printer controller E5 converts image data supplied from an I/O controller E9 into a parallel signal, and supplies the parallel signal to the printer E4 via a printer interface. Note that vertical/horizontal (V/H) transformation of an image is executed by the printer controller E5. The printer controller E5 also performs density conversion (expansion—interpolation—compression) to convert 200 dpi as a standard density inside the apparatus into 360 dpi.

A touch panel E6 is used to input an instruction from a user. The touch panel E6 is subjected to a non-glare treatment to provide an easy-to-see panel. The touch panel is of an analog type (resistance-division type) of a conductive thin film system, and obtained data is used after it is A/D-converted by the I/O controller E9. A special pattern, called "hot key" is printed on the touch panel. A special pattern representing a given function is printed on a specific portion on the touch panel, and when a user touches this portion, the specific function is unconditionally executed regardless of processing which is being executed. For example, "telephone", "FAX", and the like which are always unexpectedly required are printed, and the above-mentioned processing is executed to improve operability for a user. The touch panel of this embodiment has a touch enable region of 235 mm×146 mm.

A ten-key pad E7 is used to input numerals, and the like, and is connected to a keyboard E8. The ten-key pad E7 includes "0" to "9" keys, cursor keys, a return key, and the like, and is used to improve input efficiency of numerical data. The keyboard E8 is used to input data of, e.g., a wordprocessor. This keyboard is of a wordprocessor built-in type. As described above, the keyboard E8 is of a separate type which can be stored in the main body, and can be used while stored in the main body. As a connection method of the keyboard, wired connection is employed, and a keyboard arrangement is an old JIS arrangement.

The I/O controller E9 controls standard I/Os other than memories. More specifically, the I/O controller E9 receives addresses, data, and control information from the CPU E1, and performs 8-bit/16-bit bus conversion, and address decoding to supply these data to a floppy disk controller E12, a real time clock E14, a hard disk controller E17, and a TEL.FAX.sound controller E23. The I/O controller E9 also performs bus control (DMA control, or the like) to supply data to the scanner controller E3 and the printer controller E5. The controller E9 also A/D-converts data obtained from the touch panel E6, and supplies digital data to the CPU E1. The controller E9 converts serial data from the keyboard E8 into parallel data. Furthermore, the controller E9 decodes data from a mouse E10 to convert them into X-displacement, Y-displacement, push button status, and their interrupt control information.

For the mouse E10, a special-purpose connector is prepared on the rear portion of the main body, and when a mechanical type mouse is connected thereto, it can be used as a pointing device as well as the touch panel. A floppy disk drive E11 can be commonly used for 1.6M and 1M type disks. When a 1M type disk is used, the disk is formatted to have a format capacity=720 KB, 512 B sectors, 9 sectors/track, and 80 tracks×2. When a 1.6M type disk is used, the disk is formatted to have a format capacity=1.2MB, 1024B sectors, 8 sectors/track, and 77 tracks×2. The floppy disk controller E12 converts information on a floppy disk into digital data, and vise versa, and performs mechanical control such as a seek operation.

A battery E13 backs up the real time clock E14. The battery E13 is a disk-like lithium battery, and is located in a power supply block. The real time clock E14 receives an electric power from the power supply block of the overall system when a power switch is ON, and receives an electric power from the battery E13 when the power switch is OFF, thereby backing up timepiece data.

An SCSI interface E15 has an external terminal, and can be connected to an equipment using the SCSI interface device via a connector to use the equipment. A hard disk drive E16 has a capacity of 40MB, and is equipped inside the apparatus. The hard disk controller E17 is connected to the hard disk drive E16 via an SCSI signal. The hard disk controller E17 also controls a hard disk fan E41 depending on a use condition, and can stop a spindle motor using a command. A speaker E18 is used to reproduce a voice, music, signal, and the like by the TEL.FAX.sound controller E23. An exhaust fan E19 is stopped when the overall apparatus is set in a standby state, thus reducing noise and power consumption.

An RS232C interface E20 has an external connector, and can be used when it is connected to equipment such as a modem having a serial interface. A public telephone circuit E21 is used to connect an external facsimile apparatus, a telephone set, and the like. A network control unit (NCU) E22 performs circuit control, e.g., voltage conversion for a telephone set, and a facsimile apparatus. The NCU E22 has one speech path, and can be used in any of AA, MA, AM, and MM modes. The NCU can use a pulse dial (10/20 pps) and a tone dial. The NCU is connected to a branch telephone E24 and a handset E25 via modular jacks. The NCU E22 has a ringer off function for both the branch telephone E24 and the handset E25. Connections among the NCU E22, the public circuit E21, the branch telephone E22, and the handset E25 will be described in detail later with reference to FIG. 27.

The TEL.FAX.sound controller E23 performs systematic control of the telephone set and the facsimile apparatus, and also performs sound control of, e.g., an ADPCM, an FM sound source, and the like. The ADPCM can select three frequencies, i.e., 3.9, 5.2, and 7.8 kHz as a sampling frequency. The FM sound source can simultaneously generate 11 melody tones, or five melody tones and six rhythm tones. The controller E23 also has a function of a PB receiver, and can recognize a tone signal sent from a circuit. The controller E23 includes an amplifier portion for the speaker E18, and eight levels can be varied by software.

The branch telephone E24 is used to terminate or originate a call or to transfer data in a facsimile mode at a remote location from a master apparatus. The handset E25 is a telephone set having dial buttons, a hook button, and the like. Therefore, the handset E25 has a 10 pps/20 pps dial function, a tone dial function, and a ringer function. The handset E25 can be used as a normal telephone beside the apparatus of this embodiment, and can also be used to input data to the ADPCM circuit. When this handset E25 is set in an off-hook state, a display is switched to a telephone use picture regardless of applications.

When an asynchronous communication modem board E26 (CCITT V.21, V.22 standards) is inserted in a corresponding connector, the public circuit E21 commonly used for both the telephone set and the facsimile apparatus can also be used for personal-computer communications. In order to operate this modem E26, a serial interface is necessary. The serial interface is used commonly with the RS232C interface E20, and is switched in the TEL.FAX.sound controller E23. An operation mode of this modem includes originate/answer/auto modes. The modem can be operated by a command complying with an AT command.

A FAX modem E27 can cope with G3 and G2 modes, adopts a half duplex communication method, and supports CCITT V.29, V.27ter, T.30, V.21 channel 2, T.4, and T.3. This system independently has an I/O bus E28, a DRAM bus, and a ROM bus, thereby achieving high-speed access and facilitating bus control. More specifically, a load on a bus buffer is reduced, and in a DRAM refresh mode, the ROM and I/O buses are enabled to improve performance.

In the apparatus of this embodiment, a ROM E29 comprises eight 4-Mbit (512K×8 bits) mask ROMs. The ROM E29 stores control programs (managers, drivers, DOS, and applications) for the entire apparatus, and data such as fonts, dictionaries, and the like. When ROMs each having an access speed of 200 nsec are selected, the CPU E1 can be operated in one-wait mode.

A RAM E30 is used to store data and programs for the overall apparatus. In this apparatus, the RAM E30 comprises eight 1Mbit Dynamic RAMs in a standard specification, and can be extended to comprise a maximum of 24 DRAMs. In this case, the capacity of the RAM E30 becomes 3 Mbytes. When RAMs each having an access speed of 100 nsec are used, the CPU E1 can be operated in a no-wait mode. The DRAMs are refreshed by a system controller E31 during a horizontal blanking interval.

The system controller E31 controls the entire system. More specifically, the controller E31 performs refresh control of the DRAMs, address mapping, software wait control, generation of various control signals, and DMA control. The controller E31 has a clock oscillator, and supplies a fundamental clock to the entire system.

A VRAM E32 stores an image signal. In practice, the VRAM E32 comprises a 2-port memory called a dualport RAM, and can be simultaneously accessed from the CPU E1 and a display controller E33, thus allowing a high-speed image display operation. When the VRAM having an access speed of 100 nsec is selected like in the RAM E30, the CPU E1 can be operated in a no-wait mode, and its refresh operation is executed by the system controller E31. The display controller E33 reads out an image written in the VRAM E32 by the CPU E1, and converts the readout data into an LCD signal. The display controller E33 has a special-purpose window memory E34 for synthesizing a cursor and windows with a video signal read out from the VRAM E32, and displaying synthesized data. The controller E33 has a memory E37 for gradation as a special-purpose memory for gradation display. In addition, the controller E33 has a memory E36 for conversion as a work buffer. A signal output from the controller E33 is supplied to an LCD E35, thus displaying an image.

The window memory E34 stores an image for displaying a cursor and windows. The blue-mode LCD (liquid crystal display) E35 with a backlight by a cold cathode tube performs various displays (e.g., main menu, applications, timepiece, date, keyboard status, tool box) for the apparatus of this embodiment. Since the touch panel E6 is overlaid on the LCD E35, a user watches a display on the LCD and touches the touch panel E6, thereby issuing various instructions to a manager as control software of this apparatus. Since a correct position cannot often be instructed depending on the relative position between the LCD and the touch panel E6 and precision of the touch panel E6 even if a user touches the touch panel E6, data obtained from the touch panel E6 is adjusted using a variable resistor. The LCD performs a three-divided image display on a horizontal plane, and has a variable display start address. Note that the contrast of the LCD and the luminance of the backlight can be adjusted by independent variable resistors in the display controller E33.

The work buffer E36 for various display associated operations, and the memory E37 for gradation display are connected to the display controller E33. In this apparatus, a normal signal is not subjected to gradation display, and gradation display is performed using data from an enlargement slot E43. An EEPROM E38 stores various kinds of information of the system (states of connected devices, setup details associated with a telephone, states of use of memories, and the like), and backs up such information when the power switch is OFF. The EEPROM does not require a backup power supply. These data are exchanged with the CPU E1 through an enlargement bus controller E39.

The enlargement bus controller E39 performs various control operations for the enlargement slot E43, and also controls peripheral I/Os such as the EEPROM E38, LEDs E40, a display switching switch E41, a hard disk fan E42, and the like. The two, i.e., red and green LEDs E40 can be turned on/off upon an instruction from the CPU E1. For example, the LEDs E40 can be used as lamps for indicating states of the facsimile apparatus and the telephone during absence of a user. When the display unit of this apparatus is opened/closed, the display switching switch E41 is mechanically turned on/off, and the ON/OFF state of the switch can be transmitted to the CPU E1 through the enlargement bus controller E39. By utilizing this data, when the cover is closed, the backlight is turned off via a path of the display switching switch E41→the enlargement bus controller E39→the CPU E1→the enlargement bus controller E39→the LCD E34, and when the display is opened, the backlight is turned on via the same path, so that the backlight can be turned on/off in response to an opening/closing operation of the display.

The apparatus of this embodiment has the exhaust fan E19, and the hard disk fan E42, and finely controls these fans according to a use condition of the overall apparatus, thereby reducing noise and power consumption. For example, a spindle motor of the hard disk drive E16 is stopped after the lapse of three minutes from the end of use of the hard disk drive, and the hard disk fan E42 is stopped after the lapse of another five minutes. The enlargement slot E43 is arranged inside the apparatus, and can mount circuit boards while stacking them on each other by using stacking type connectors. Interface signals for processing various I/Os, memories, and video signals are prepared. A main bus E44 is a fundamental bus of this apparatus. All the memories such as the ROM E29, the RAM E30, the VRAM E32, and the like are connected to this bus. Various signals output from the enlargement slot E43 are also connected to this bus.

NCU Arrangement

Figure 27:
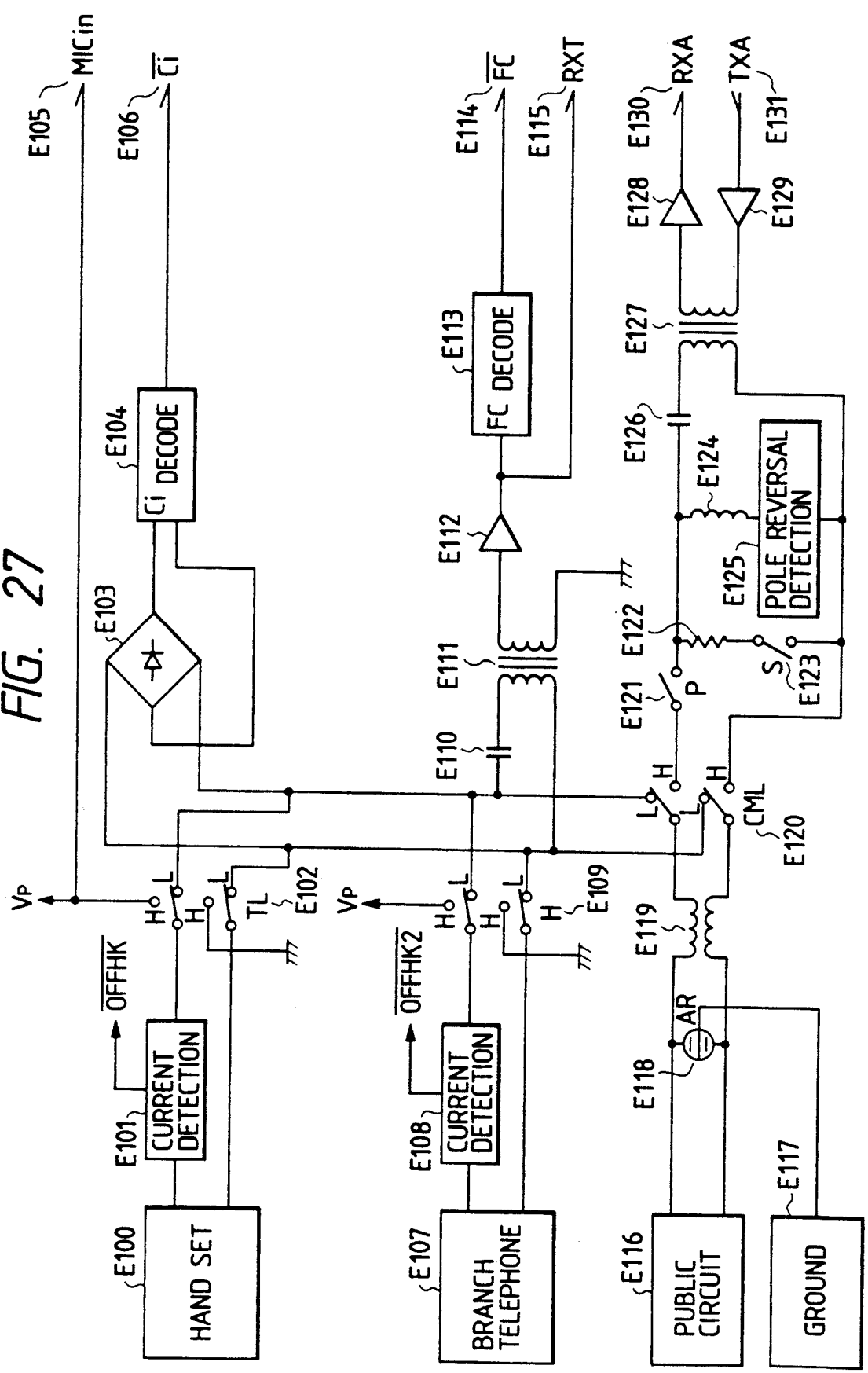
FIG. 27 is a block diagram showing an arrangement of an NCU.

FIG. 27 is a block diagram showing an arrangement of the network control unit (NCU E22) of this embodiment. The respective portions will be described below with reference to FIG. 27.

A terminal E100 is used for the handset used in this embodiment. In this embodiment, a conventional telephone set can be used as the handset. A current detection circuit E101 detects a hook state of the telephone set. When the telephone set is set in an off-hook state, an OFFHK signal from the current detection circuit E101 goes to LOW level. The current detection circuit E101 is connected to a hand-set control relay (TL) E102. When this relay is switched to an H side, the handset is disconnected from a circuit. In this state, the handset can be used for an ADPCM microphone. At this time, no Ci signal can be supplied to the handset. By utilizing this, ringer control of the handset can be attained.

The relay E102 is connected to a diode bridge E103 for rectifying a circuit to decode a Ci signal. The diode bridge E103 is connected to a Ci signal decode circuit E104 for decoding the signal rectified by the diode bridge E103, and transmitting the decoded signal to other circuits as a Ci signal indicating that a ringer rings. When the handset is used in place of a microphone, a microphone input signal MICin E105 is input from this portion to the ADPCM circuit via the relay E102. A Ci signal E106 is used to transmit to other circuits that the Ci signal is received.

A terminal E107 is used for a branch telephone. In this embodiment, another telephone set can be connected to this terminal in addition to the handset. The terminal E107 is a modular jack used in this case. The terminal E107 is connected to a current detection circuit E108 for detecting a hook state of the telephone set. When the telephone set is set in an off-hook state, an OFFHK2 signal from the current detection circuit E108 goes to LOW level. The circuit E108 has the same functions as those of the current detection circuit E101. The current detection circuit E108 is connected to a branch telephone control relay (H) E109. When this relay is switched to an H side, a ringer of the branch telephone is inhibited from ringing. More specifically, the ringer of the branch telephone can be controlled. When the relay E109 is switched to an L side, the branch telephone is connected to a circuit. More specifically, the ringer of the branch telephone rings, and functions of a normal telephone set can be used.

The relay E109 is connected to a hybrid transformer E111 via a DC-cut capacitor E110. The hybrid transformer E111 separates a signal sent from a circuit into primary and secondary signals, then separates its input signal, and transmits the separated signals to an F network detection circuit E113, and a circuit monitor signal E115. The transformer E111 is connected to an operational amplifier E112 which is used for impedance conversion. The operational amplifier E112 is connected to the F network detection circuit E113 which can detect a 1,300-Hz signal in order to allow a use of an F network. The F network detection circuit E113 outputs an F network detection signal Fc E114. When the circuit E113 detects the F network, the signal E114 goes to LOW level. The operational amplifier E112 outputs the line motor signal RXT E115 which is used to record a signal during a conversation. A public telephone terminal (modular jack) E116 is used to connect this apparatus to a public circuit.

An arrester ground terminal E117 is connected to an arrester E118 which is a circuit for protecting circuits when a lightening surge is input from the circuit connected to the terminal E116. The arrester E118 is connected to a line filter E119 for removing noise on the public circuit connected to the terminal E116. The line filter E119 is connected to a circuit switching control relay (CML) E120. When this relay is switched to an H side, information on the public circuit connected to the terminal E116 is transmitted to a facsimile modem. When this relay is switched to an L side, information on the public circuit connected to the terminal E116 is transmitted to the handset or the branch telephone connected to the terminal E100 or E107.

The relay E120 is connected to a dial pulse generation relay E121. When the relay E121 is switched to a contact connected to the circuit switching control relay E120, it is used for generating dial pulses. When the relay E121 is turned on/off at 10 or 20 pulses/sec, dialing is performed. The relay E121 is connected to a circuit current resistor E122 which is used to flow a current through the circuit when the dial pulses are generated. The resistor E133 id connected to a dial pulse waveform rectifying relay (S) E123 for rectifying a waveform of the dial pulses. The relay E121 is also connected to a return coil E124 used for supplying a current to the circuit. The return coil E124 is connected to a pole reversal detection circuit E125 for detecting pole reversal occurring when a called party responds. By utilizing this, whether or not a called party responds can be detected. The relay E121 is also connected to a hybrid transformer E127 via a DC-cut capacitor E126. The transformer E127 is used to separate a facsimile modem signal into transmission and reception signals. The transformer E127 has the same functions as those of the hybrid transformer E111.

The transformer E127 is connected to an operational amplifier E128 for converting a reception side impedance. The operational amplifier E128 performs impedance matching between the circuit side and the facsimile modem (or communication modem) side. The transformer E127 is also connected to an operational amplifier E129 for converting a transmission side impedance. The operational amplifier E129 performs impedance matching between the circuit side and the facsimile modem (or communication modem) side. The operational amplifier E128 outputs an input signal RXA E130 to the facsimile modem (communication modem). The operational amplifier E129 receives an output signal TXA E131 from the facsimile modem (communication modem).

Software Architecture

FIGS. 28 to 53 show control operations of the CPU E1 according to the embodiment of the present invention.

Figure 28:
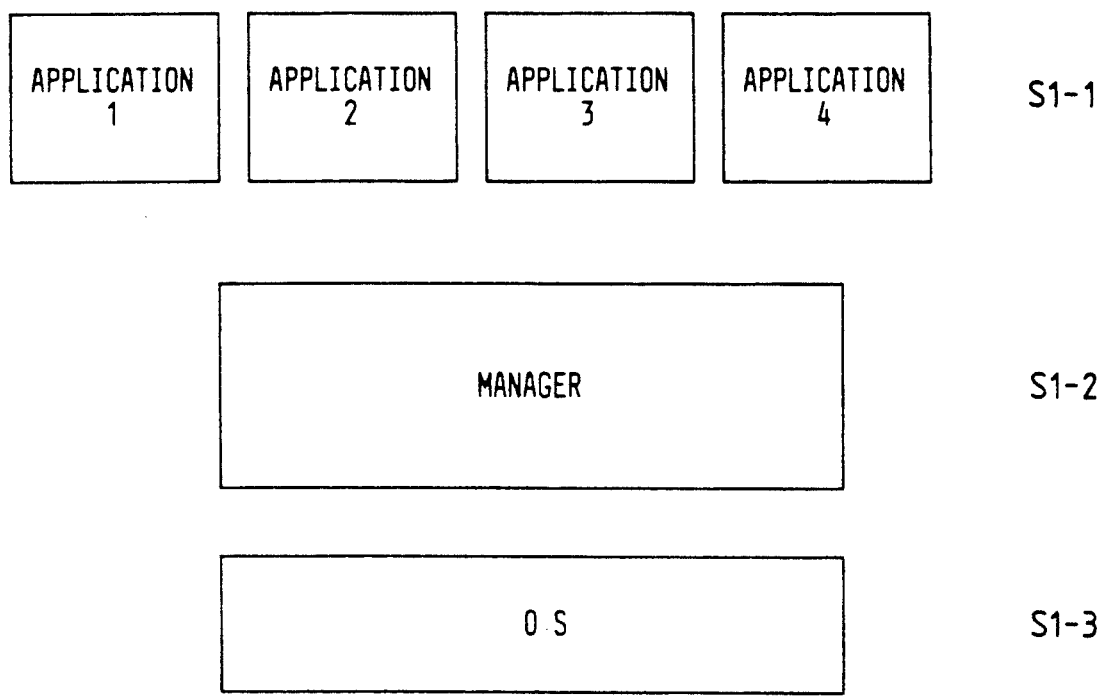
FIG. 28 shows a software architecture.

FIG. 28 shows a software architecture of this embodiment. An OS (operating system) S1-3 is a multi-task OS to allow a FAX transmission/reception operation to be executed in a background mode. A management program S1-2 called a manager is present between the OS S1-3 and applications S1-1, and interfaces between a user and the applications. The manager S1-2 particularly has a function of controlling a so-called event drive type system for simultaneously managing various events such as touch inputs to the touch panel, keyboard inputs, timers, and the like, and passing control to an application which waits for given events.

Events include hard and soft events. The hard events include a touch input to the touch panel E6, inputs to the keyboard E8, and the like, for causing a hardware interruption, and the soft events occur when a given application issues a request for actuating another application. When there are a plurality of applications having the same event, a currently executed application has priority over other applications (such an application will be called a current application hereinafter). A plurality of applications are permanently present on a memory, and are set in an event waiting state. The event waiting state is a state wherein the manager monitors the applications until a given event occurs. When a given event occurs, the manager actuates an application which waits for the given event. When the manager passes control to an application, the application actuated by the manager executes processing according to the event. Thereafter, the application returns control to the manager, and is set in the event waiting state.

The manager also has functions of managing and servicing hardware resources. In the hardware resource managing function, which application uses which hardware is managed since an application always uses hardware resources such as a printer, a hard disk, and the like through the manager. Therefore, it can be controlled such that a plurality of applications cannot simultaneously use the same hardware resource. The hardware resource servicing function includes four control operations. First control is spindle-motor ON/OFF control for prolonging a service life of the hard disk drive. A time of use by a user is set in a memory switch application (to be described later), so that the spindle motor of the hard disk drive is kept ON during this time range, but is stopped during a non-use time range. When the hard disk is accessed in a state wherein the spindle motor is kept OFF, control waits for several seconds until the rotational speed of the motor reaches a steady rotational speed.

Second control is fan (exhaust fan and hard disk fan) ON/OFF control. For the purpose of noise reduction and power consumption saving, the fans are turned off during the above-mentioned non-use time range, and are turned on during use. Third control is cleaning control for preventing an ink ejection error when a bubble-jet printer is connected. When four days pass without using a printer, a printer head cleaning command is issued. In addition, when the power switch of the main body is turned on, the cleaning command is issued as well as other initial processing operations. Fourth control is display picture ON/OFF control. In accordance with a picture dark interval set in a circumstance set application (to be described later), when a setting time passes in a state wherein no event occurs, a display picture is turned off. If any event occurs thereafter, the display picture is turned on. Since the display itself serves as the cover, when the display is closed, the picture is turned off; when it is opened, the picture is turned on.

Figure 29:
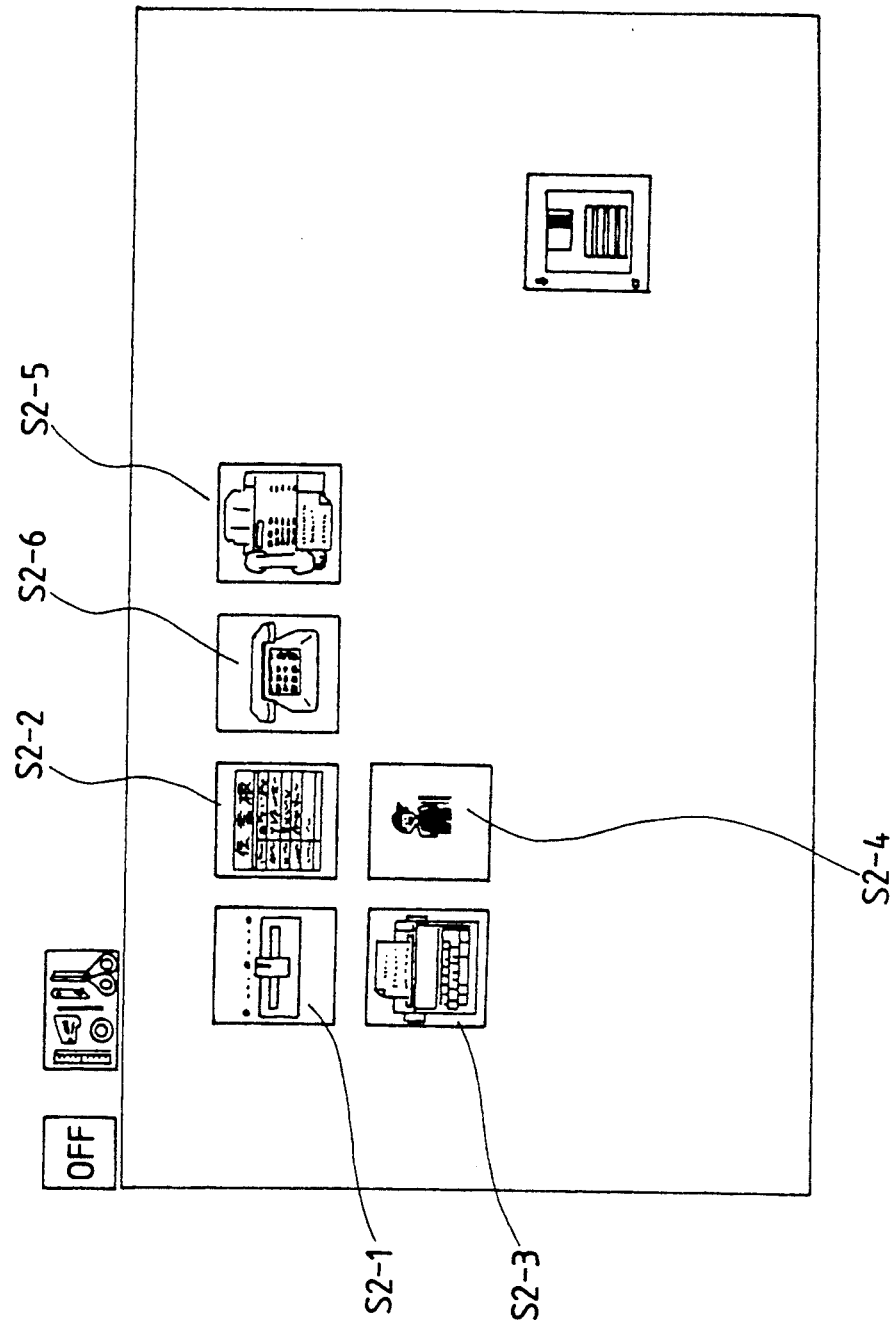
FIG. 29 shows a main menu picture.

FIG. 29 shows a main menu picture as one of applications. The main menu has a function of displaying a list of applications developed on a memory, and causing a user to select a current application. In this case, the current application corresponds to the main menu.

Figure 30:
FIG. 30 shows a circumstance set-up picture.

In FIG. 29, an icon S2-1 represents a circumstance set application. FIG. 30 shows a picture of the circumstance set application. In this application, a picture dark interval, an interval of a repeat function of a keyboard input, a speaker volume, and the like are set. When a print operation is performed by a bubble-jet printer on a sheet on which an ink cannot be quickly dried, an item S3-1 "fixing mode" is used to turn on/off a mode for performing a printing operation at a predetermined time interval for each line. This item is altered depending on a printer to be connected. When a thermal transfer printer is connected, this item is used to set a printing density. Furthermore, a fixing time (wait time after a one-line printing operation) can be set in the memory switch application (to be described later). This is because the ink dried state depends on quality of a paper sheet to be used, a room temperature, humidity, and the like of a room where this system is placed.

An icon S2-2 represents a message board application. In this application, a user can directly input a message using the keyboard, and a message is also automatically written, e.g., when an error occurs in a FAX transmission/reception operation in a FAX application (to be described later) (such a message will be referred to as a system message hereinafter).

Figure 32:
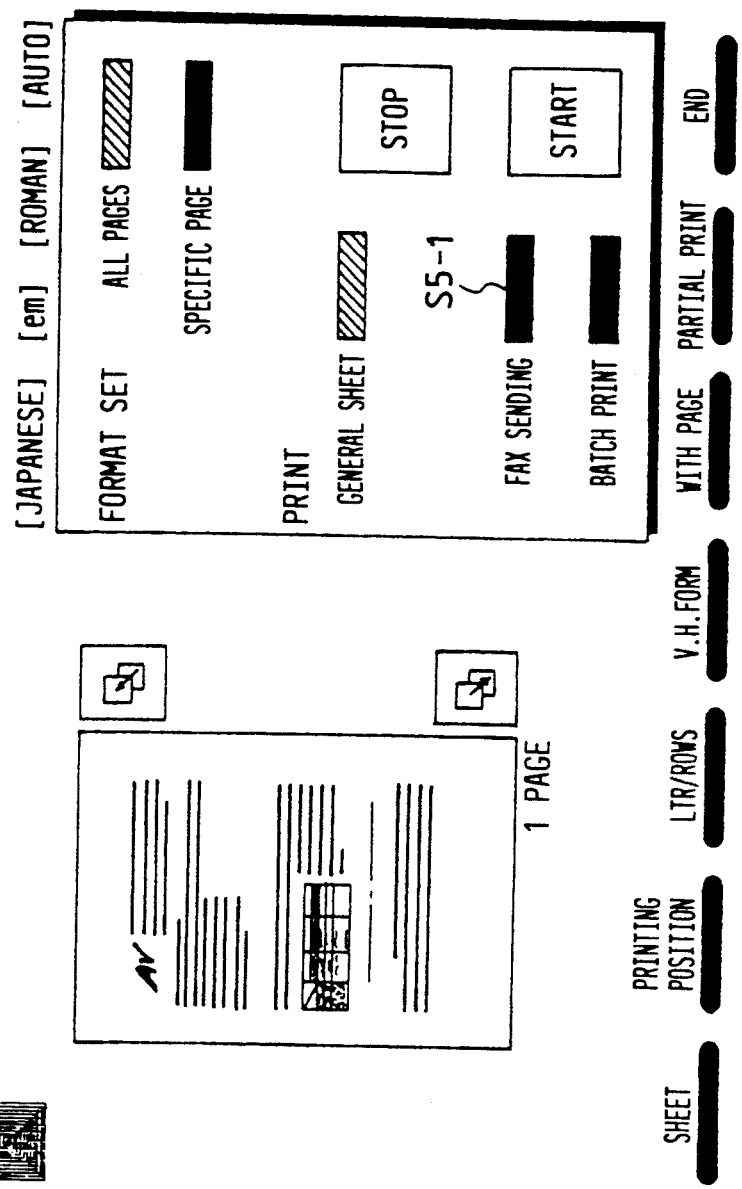
FIG. 32 shows a print setting picture of the wordprocessor.

An icon S2-3 represents a wordprocessor application. FIG. 31 shows a basic picture of a wordprocessor, and FIG. 32 is a print setting picture. A FAX sending switch S5-1 shown in FIG. 32 is used to directly create a sending file and to send a file without performing a printing operation.

An icon S2-4 represents a touch panel cleaning application. Since this system employs the touch panel, a state wherein a touch input is inhibited when the touch panel is wiped is set by this application.

Figure 33:
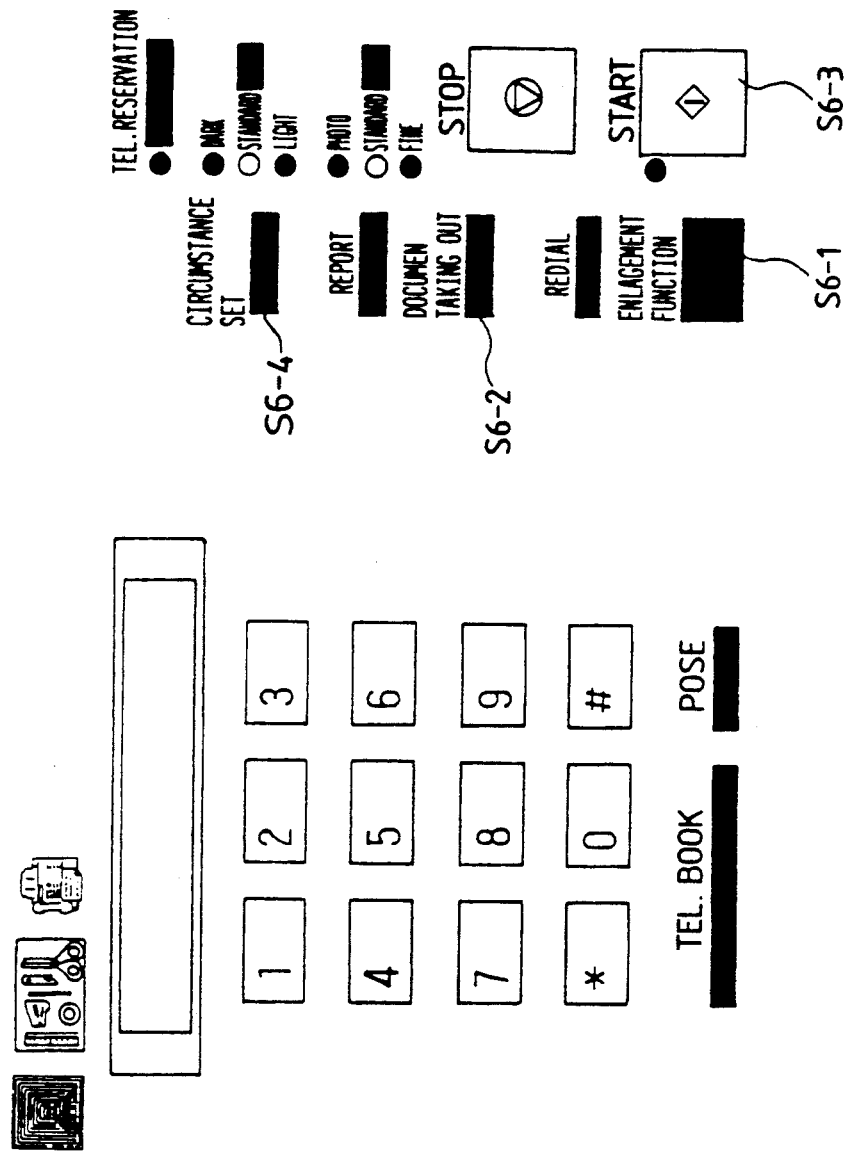
FIG. 33 shows a FAX ten-key picture.
Figure 34:
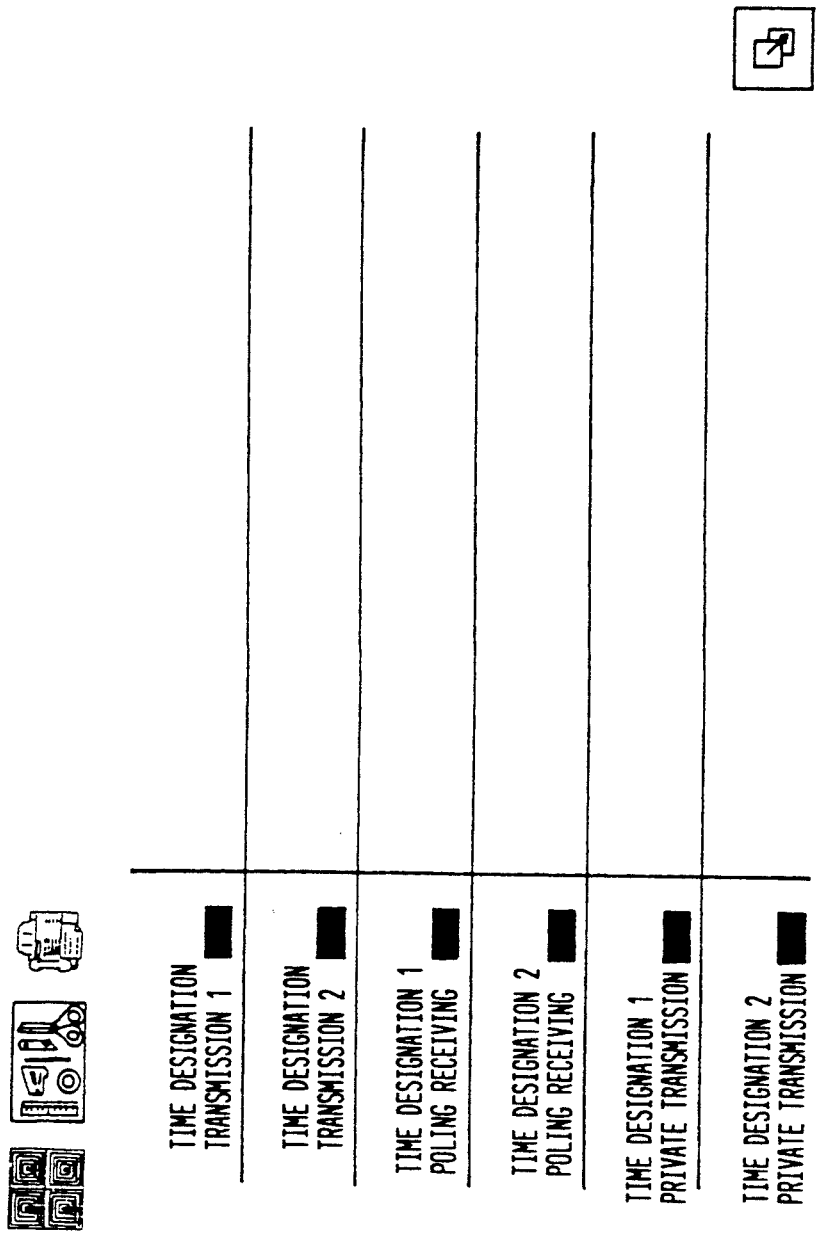
FIG. 34 shows a FAX enlargement function picture.
Figure 35:
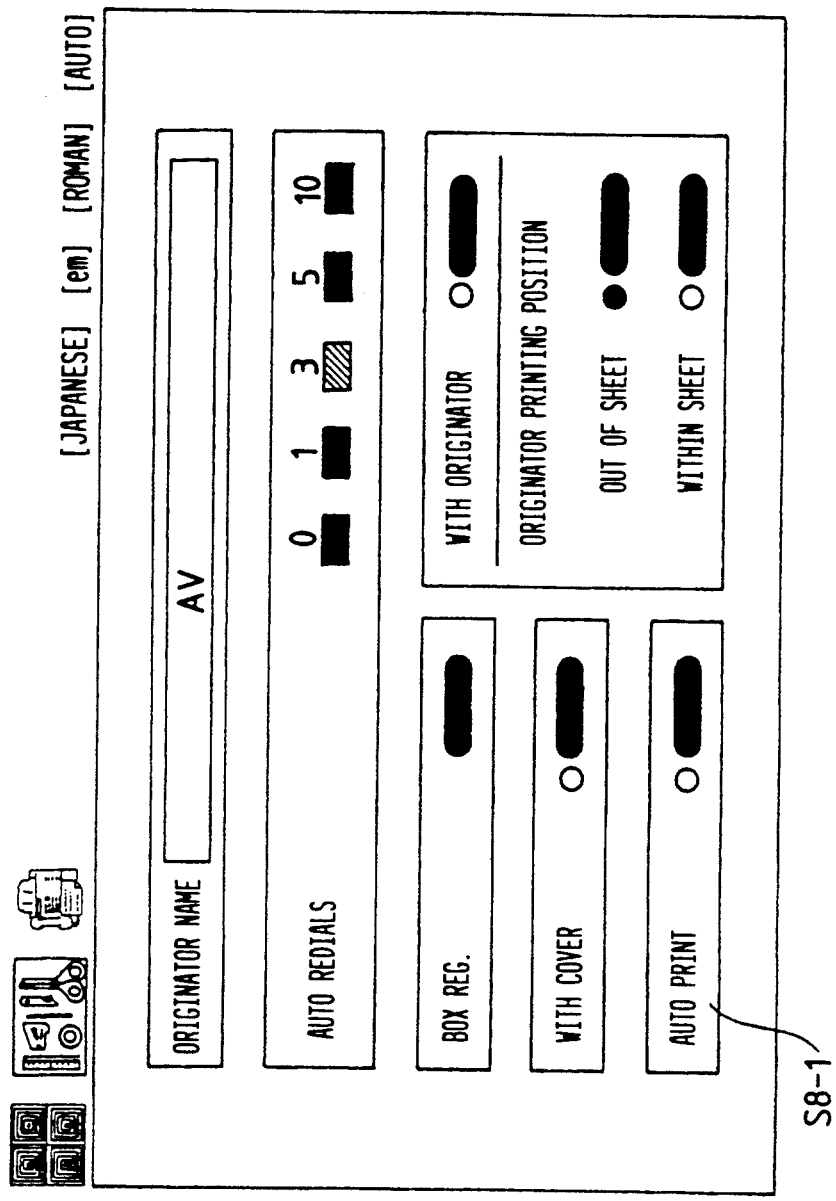
FIG. 35 shows a FAX circumstance picture.
Figure 36:
FIG. 36 shows a FAX print display/received document list picture.

An icon S2-5 represents a FAX application. FIG. 33 shows a basic picture of this FAX application, FIG. 34 shows an enlargement function picture, FIG. 35 shows a FAX circumstance picture, FIG. 36 shows a document taking out picture. In FIG. 33, a user need only input a destination telephone number from the touch panel, set an original on the sheet feed table unit, and then touch a start button S6-3 to send the original data. When an enlargement function button S6-1 is touched, the picture shown in FIG. 34 is displayed. In this picture, enlargement functions such as some time designation functions, a multi-address calling function, and the like are available.

In this system, since a printer to be connected is a general sheet printer, a cut sheet FAX mode is set. Since this system has no line printer exclusively used for a FAX mode, received data is temporarily stored in a disk. Note that a large-capacity nonvolatile semiconductor memory such as an EEPROM may be used in place of the disk. When a printing operation is to be automatically executed thereafter, an auto print switch S8-1 in FIG. 35 is set in an ON state. Furthermore, whether or not a received file is to be deleted after the printing operation can be set in the memory switch application (to be described later). When the auto print switch is set in an OFF state, no printing operation is performed. A received file can be displayed on a screen in the document taking out function. FIG. 36 shows a picture of a list of received documents. A mark "*" S9-1 represents that the printing operation is ended. A deletion switch S9-2 has a function of simultaneously deleting files marked with "*". FIG. 37 shows a state wherein a received document is displayed on the screen. A printing operation can be independently performed upon depression of a print switch S10-1, if necessary, and an unnecessary file can be independently deleted upon depression of a deletion switch S10-2.

In a FAX mode, a document may often be received when a user is absent, and reception of a document must be indicated to the user. The LED M48 shown in FIG. 1 is used for this purpose. When reception is normally performed, this LED is flashed in step S15-8 shown in FIG. 43 (to be described later). Thereafter, even if some documents are received, the LED is kept flashed. When a document taking out switch S6-2 shown in FIG. 33 is depressed, the LED is turned off in step S20-4 in FIG. 43 (to be described later). This operation is performed under an assumption that a user will check a received file.

Figure 38:
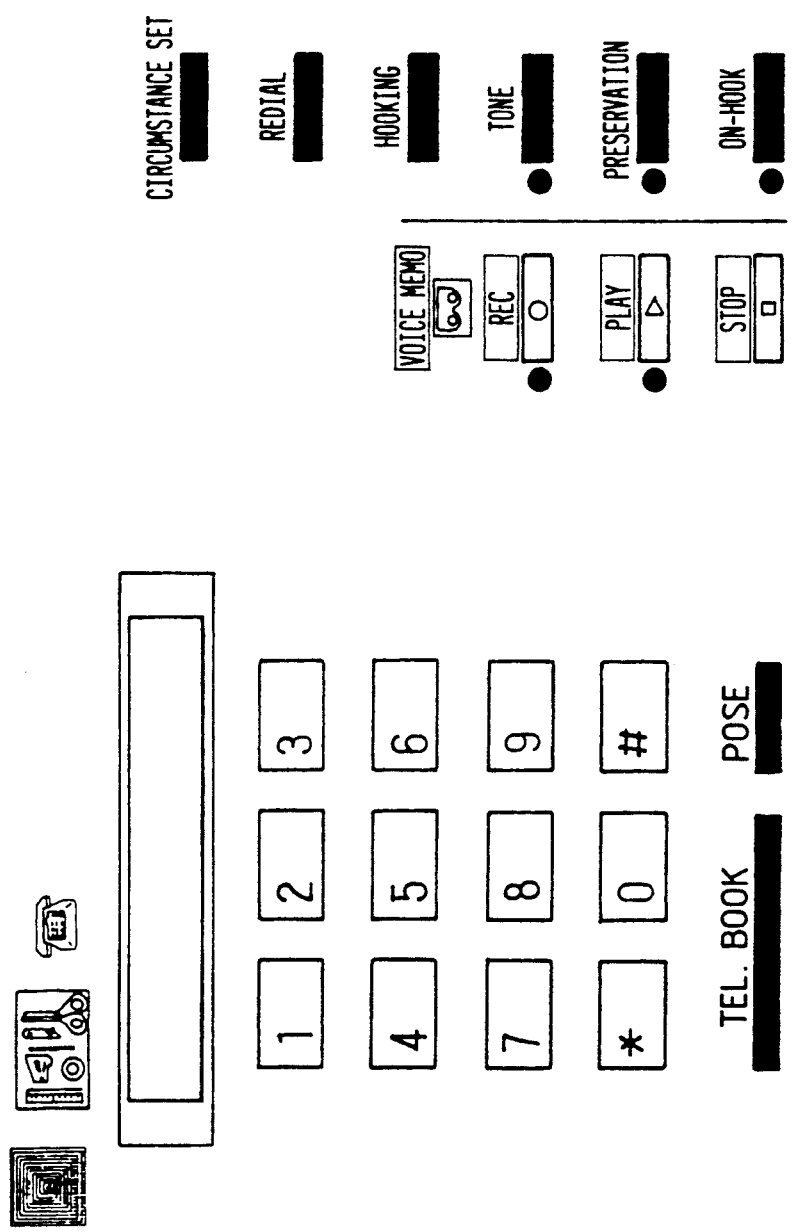
FIG. 38 shows a telephone ten-key picture.
Figure 39:
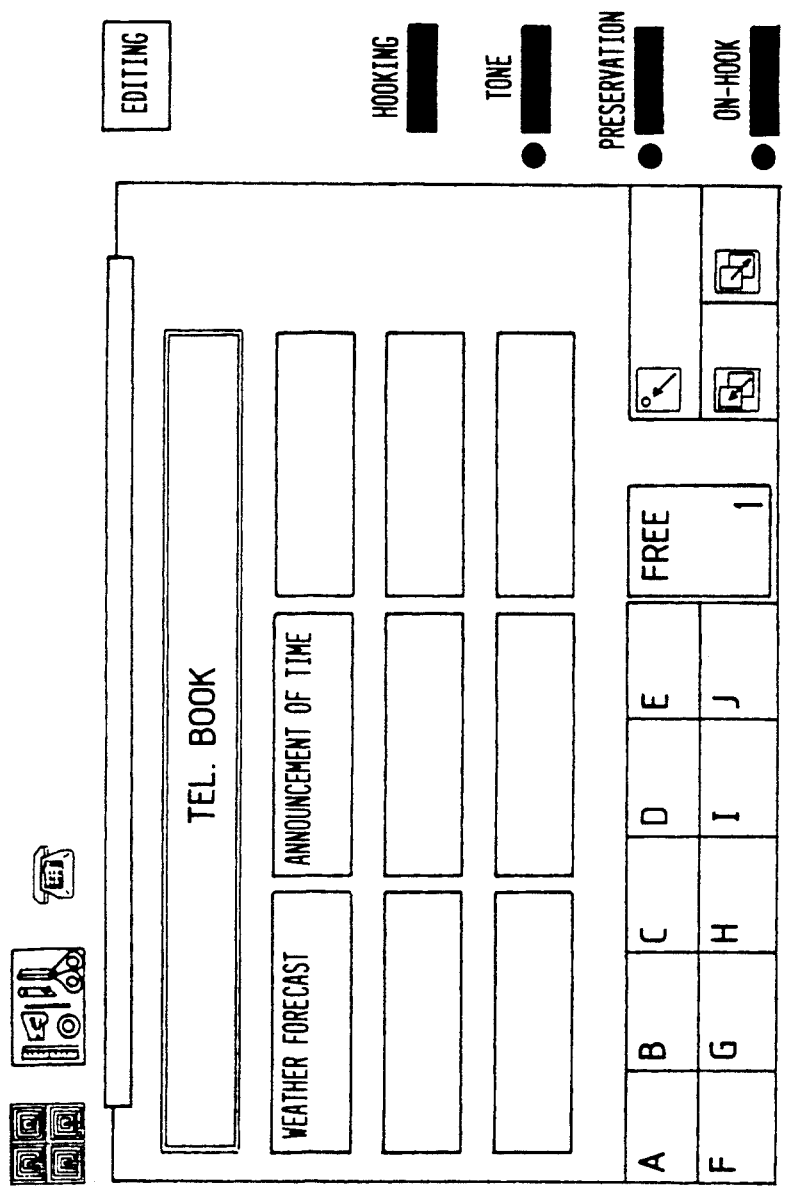
FIG. 39 shows a telephone list picture.

An icon S2-6 shown in FIG. 29 represents a telephone application. FIG. 38 shows a basic picture of the telephone application, and FIG. 39 shows a telephone book picture. Since the handset from which a dialing operation can be performed is connected to this system, a dialing operation can be directly performed from the handset. At this time, the telephone book picture shown in FIG. 39 is automatically displayed. In this case, a user need only search the telephone book, and touch a corresponding item to perform a one-touch dialing operation. In this system, the branch telephone can be connected, as described above. In this case, when a telephone call is detected, the following selections are available: (1) the ringer of only the branch telephone rings; (2) the ringer of only the main telephone rings; and (3) the ringers of both the branch and main telephones ring. Since the FAX and telephone applications call each other inside the apparatus, they are regarded as one application under event control of the manager.

Figure 40:
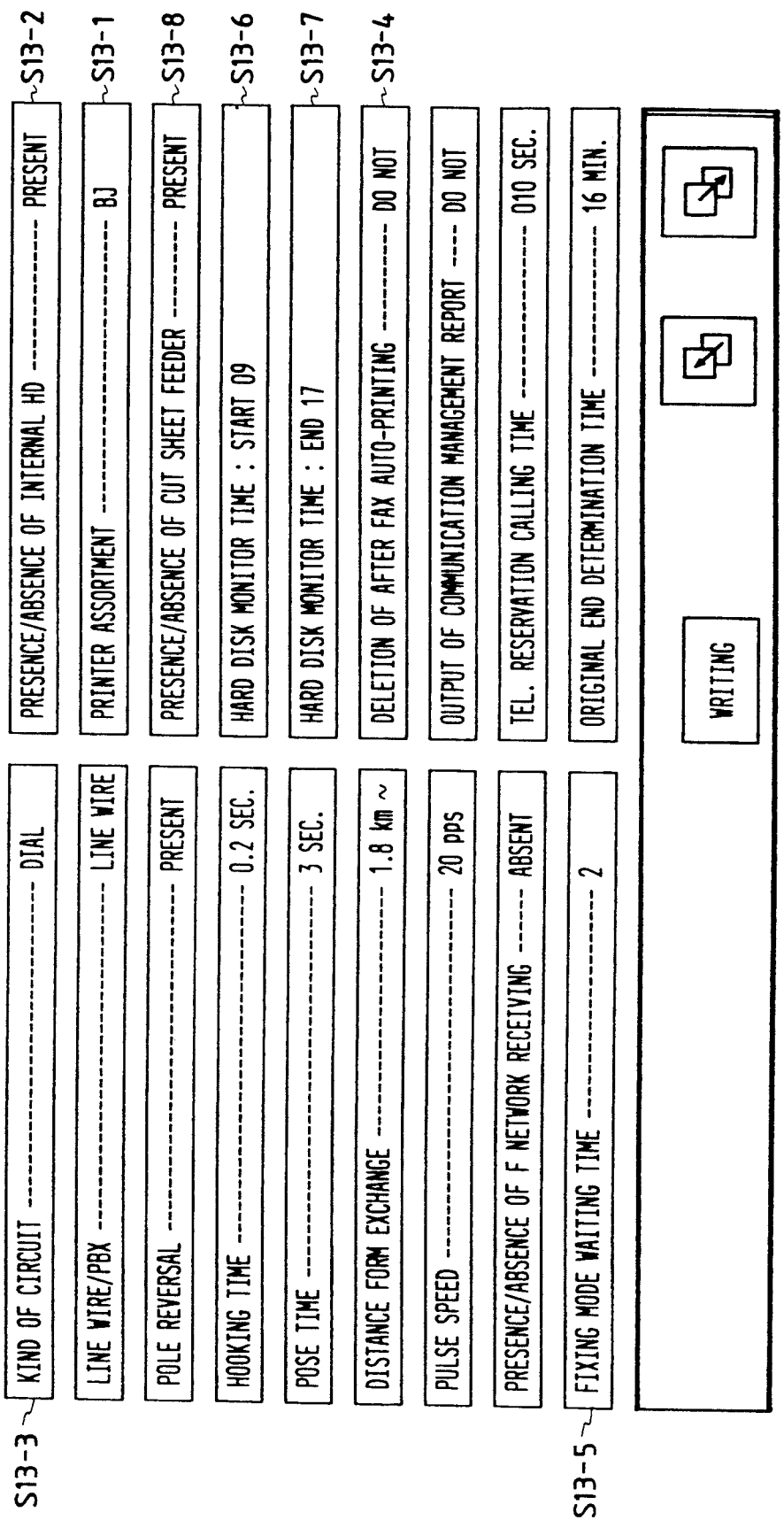
FIG. 40 shows a memory switch picture.

FIG. 40 shows a picture of the memory switch application. In this picture, hardware configurations and external circumstances are set, and corresponding data are stored in the EEPROM E38. In the circumstance set application described above, circumstances which are relatively frequently changed are set. However, in the memory switch application, circumstances which are not frequently changed, and items corresponding to conventional DIP switches are set. This application includes setting items "assortment of printer to be connected" (S13-1) necessary for controlling a print region, "presence/absence of internal HD (hard disk)" (S13-2), "kind of circuit" (S13-3), "whether or not automatically printed file is deleted after printing" (S13-4) in consideration of a case wherein a file cannot be normally printed in an auto-printing mode since an ink-jet printer which may not have an out-of-ink detection function or may have an insufficient function may not precisely detect an out-of-ink state, "fixing mode waiting time" (S13-5) in consideration of an ink dried state when an ink-jet printer is used, "setting of HD using time range" (S13-6, S13-7) necessary for control of the spindle motor for the hard disk and for control of the fans, "presence/absence of cut sheet feeder (CSF)" (S13-8) necessary for sheet feed control, and the like.

In addition to the above-mentioned applications, a spool printing application is available. This application does not appear on the list shown in FIG. 29 since it has no icon. When a print image file is created and is passed to this application by utilizing a soft event, this application queues the file, and executes print processing between events. When the printed file is not deleted in accordance with setting indicating whether or not a file is deleted after an auto-printing operation in the memory switch application described above, an end mark is written in this file.

The operations of the embodiment of the present invention will be described below with reference to the flow charts shown in FIGS. 41 to 53. Note that programs for executing the following flows are stored in the ROM E29, and the CPU E1 executes these programs to perform the following control.

Figure 41B:
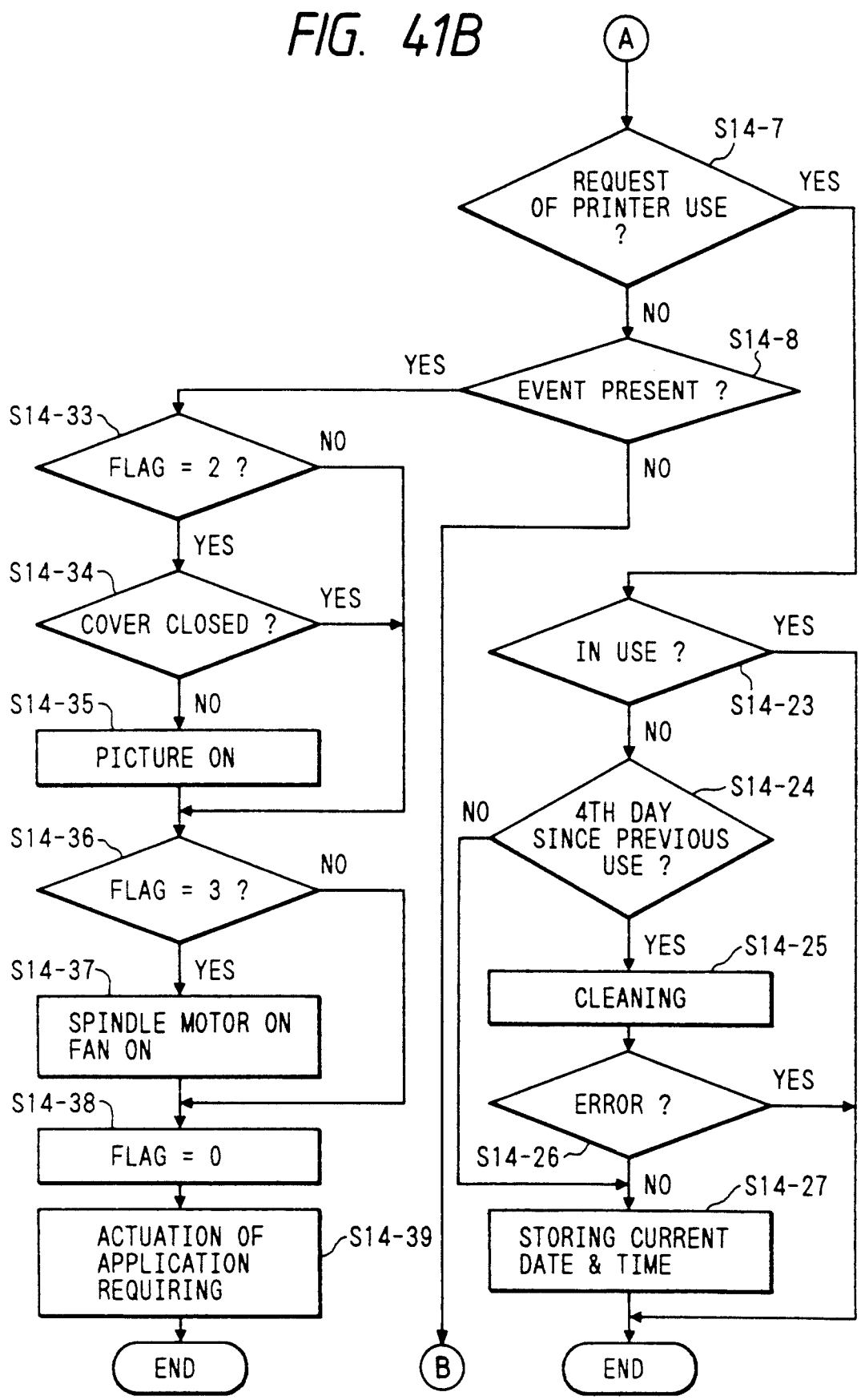
FIG. 41, consisting of FIGS. 41A and 41B, is a flow chart of a manager.
Figure 41C:
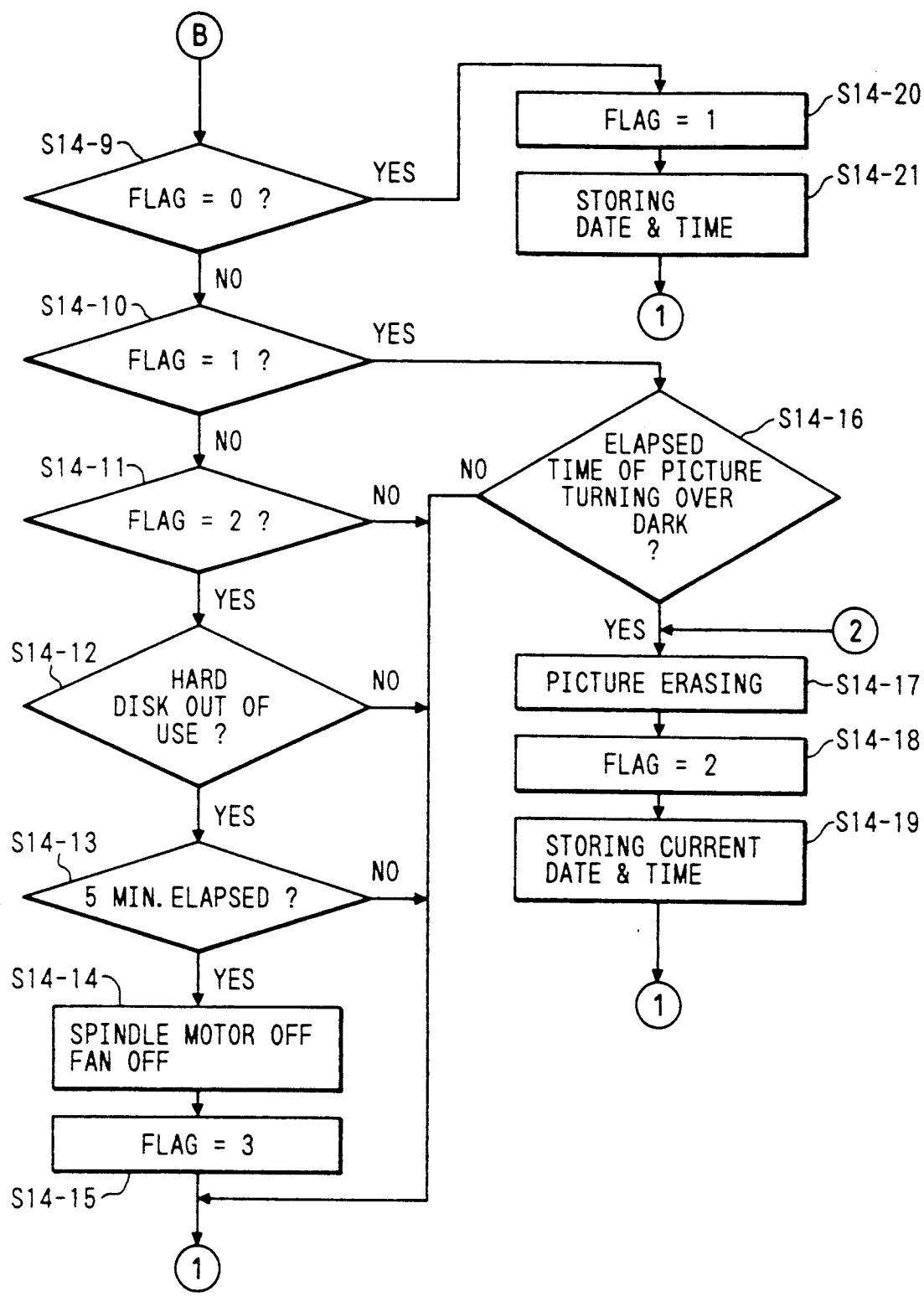

FIG. 41 shows processing of the manager. In step S14-1, current date and time are obtained. If it is then determined that the manager is actuated for the first time after power-ON, the flow advances to step S14-28, and the respective hardware units are initialized. In step S14-29, a cleaning command is issued to the printer E4. If the printer E4 which received the cleaning command is a bubble-jet printer, forcible ink discharging is performed by a suction force of the pump 53 shown in FIG. 24, thereby removing an ejection error factor. Note that the cleaning command may be issued only when the printer E4 is a bubble-jet printer. In step S14-30, a flag is set to be 0, and in step S14-31, the spindle motor and the fans are turned on. In step S14-32, the current date and time are stored, and the processing is ended. If it is determined in step S14-2 that the manager is actuated not after power ON, the flow advances to step S14-3 to check if the manager is actuated immediately after the display is opened or closed. If it is determined in step S14-3 that the manager is actuated immediately after the display is opened, the flow advances to step S14-22, and the display picture, and the spindle motor, and the fans are turned on. Thereafter, the flow returns to step S14-1. If it is determined in step S14-4 that the manager is actuated immediately after the display is closed, the flow jumps to picture erasing processing in step S14-17. If NO in step S14-4, the flow advances to step S14-5. If it is determined in step S14-5 that time for starting use of the hard disk set in FIG. 40 is reached, the flow advances to step S14-6, and the spindle motor and the fans are turned on. If a request of printer use is detected in step S14-7, the flow advances to step S14-23. If it is determined in step S14-23 that the printer is in use by another application, the processing is ended as an error. If NO in step S14-23, the flow advances to step S14-24 to check if four days or more have passed since the previous use. If YES in step S14-24, the flow advances to step S14-25, and the same cleaning processing as in step S14-29 is executed. If an error (e.g., the power switch of the printer is turned off) occurs (step S14-26), the processing is directly ended. If NO in step S14-26, the current date and time are stored in step S14-27. When an error occurs, date and time are not updated since the cleaning processing can be executed in the next loop.

If no request of printer use is detected in step S14-7, the flow enters event control. It is checked in step S14-8 if an event occurs. If NO in step S14-8, the flow advances to step S14-9. From this step, control of the manager when no event occurs is started. First, the flag status is checked. When the flag is 0, it indicates a state immediately after an event occurs; when it is 1, a state from when an event is ended until the picture is erased; when it is 2, a state wherein no event occurs and the picture is erased; and when it is 3, a state wherein the entire system under management of the manager is turned off.

If it is determined in step S14-9 that the flag is 0, the flow advances to step S14-20, and the flag is set to be 1. In step S14-21, the current date and time are stored, and the flow returns to step S14-1. If it is determined in step S14-10 that the flag is 1, the flow advances to step S14-6 to check if a picture dark time has passed. If YES in step S14-6, the flow advances to step S14-17, and the picture is erased. The flag is set to be 2 in step S14-18, the current date and time are stored in step S14-19, and the flow then returns to step S14-1. If NO in step S14-16, the flow directly returns to step S14-1.

If it is determined in step S14-11 that the flag is 2, the flow advances to step S14-12. If it is determined in step S14-12 that the current time falls within a hard disk out of use time range set in FIG. 40, the flow advances to step S14-13 to check if five minutes have passed while the flag is 2. If YES in step S14-13, the flow advances to step S14-14, the spindle motor and the fans are turned off, and in step S14-15, the flag is set to be 3. Thereafter, the flow returns to step S14-1. However, if NO in step S14-12, since the spindle motor and the fans are kept ON, the flow directly returns to step S14-1. If it is determined that the flag is 3 or if NO in step S14-13, the flow returns to step S14-1.

If it is determined in step S14-8 that an event occurs, the flow advances to step S14-33. If the flag is 2, the flow advances to step S14-34 to check if the display is closed. If NO in step S14-34, the picture is turned on in step S14-35. If YES in step S14-34, the operation is made while the picture is kept OFF. The flow advances to step S14-36, and if the flag is 3, the spindle motor and the fans are turned on in step S14-37. In step S14-38, the flag is set to be 0, and in step S14-39, control is passed to an application which requires an event which has occurred.

Figure 42:
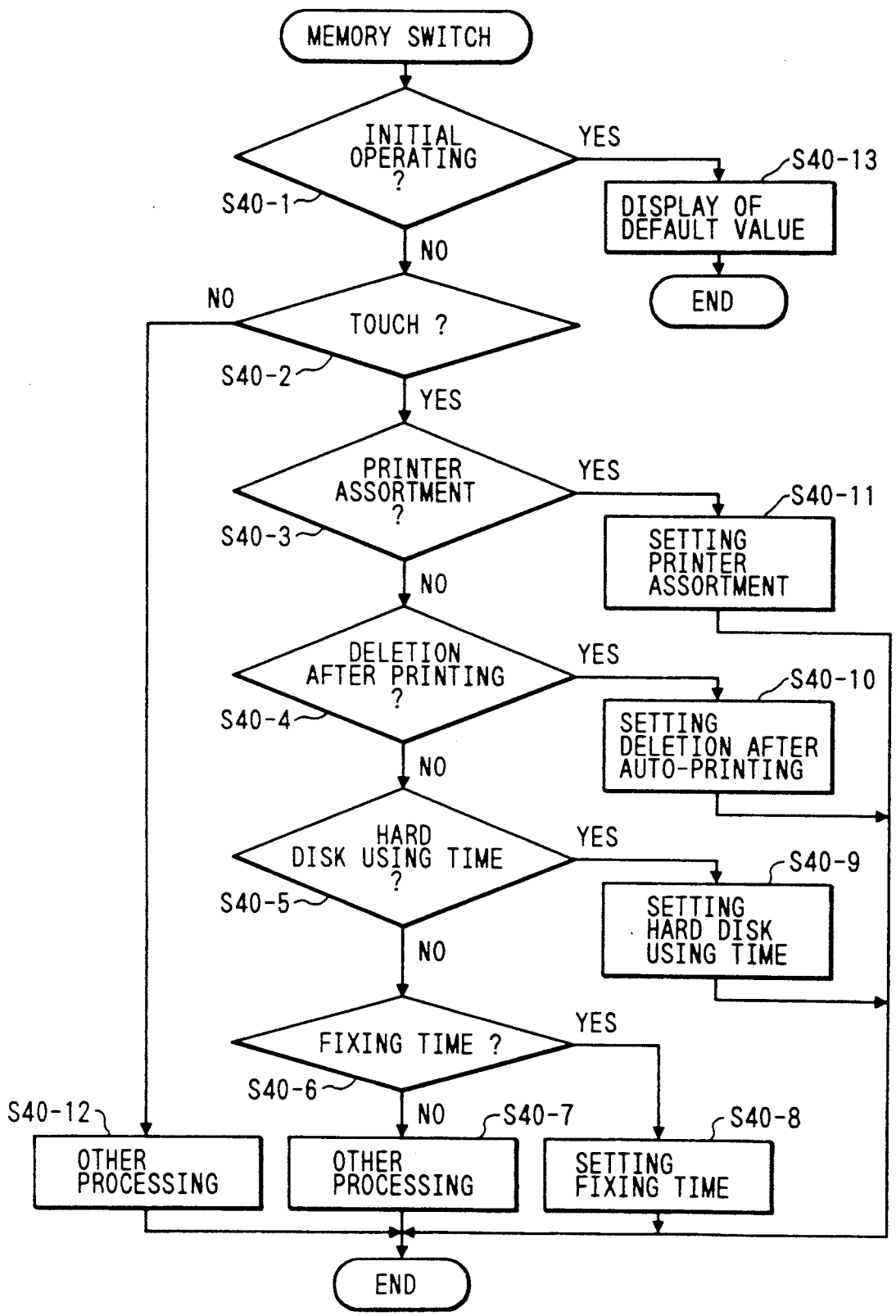
FIG. 42 is a flow chart of a memory switch.

The memory switch application shown in FIG. 40 will be described below with reference to the flow chart shown in FIG. 42.

In an initial operating state, the flow advances from step S40-1 to step S40-13, data in the EEPROM, i.e., default values are displayed as a list, and the flow returns to the manager. If a touch event occurs, the flow advances from step S40-2 to step S40-3. If setting of printer assortment is determined as a result of touch analysis, the flow advances to step S40-11, and setting processing is executed. If setting of a hard disk using time is determined, the flow advances from step S40-5 to step S40-9, and setting processing is performed. If setting of file deletion after auto-printing is determined, the flow advances from step S40-4 to step S40-10, and setting processing is executed. If setting of a fixing time is determined, the flow advances from step S40-6 to step S40-8, and setting processing is executed. For other events, the flow advances to step S40-7, and corresponding setting processing is executed. If this application is actuated by an event other than the touch event, the flow advances to step S40-12, and the corresponding processing is executed. Note that step S40-7 includes processing of setting the presence/absence of the cut sheet feeder (CSF) and the presence/absence of the internal HD.

A FAX reception operation will be described below. Assume that a user currently uses the wordprocessor application. In the wordprocessor application, events such as character inputs, touch inputs to the touch panel, and the like are awaited. If such an event occurs, processing according to the event is executed, and an event is awaited again.

Assume that a Ci signal is received from the public circuit. The manager passes control to the TEL/FAX application shown in FIG. 43 which waits for a Ci signal event. In step S15-1 in FIG. 43A, the TEL/FAX application recognizes the Ci signal, and checks a mode in step S15-14. If a TEL mode is determined in step S20-8 in FIG. 43B, since only a telephone function is available, the flow advances to step S20-9 to ring the ringer, and the processing is ended. If a FAX mode is determined, since only a FAX function is available, the flow advances to step S20-10, and the circuit is connected. In step S20-11, a FAX task is started, and the processing is then ended.

If an AUTO mode is determined, since the TEL and FAX modes can be automatically discriminated, the flow advances to step S15-15, and the circuit is connected. In steps S15-16 and S15-17, the TEL or FAX mode is automatically discriminated. If the FAX mode is determined, the flow advances to step S15-18, and FAX processing is started. In step S15-18, a FAX reception task is started, and the flow returns to the manager. If the TEL mode is determined, the flow advances to step S15-19 to ring the ringer. In step S15-20, a timer for measuring about 20 to 30 seconds is started, and the flow returns to the manager.

When the flow advances to step S15-2, if a user takes up the handset E25 during an interval of 20 to 30 seconds, control is passed to the TEL/FAX application which waits for the handset event from step S15-2. In step S15-21, the timer is interrupted, and in step S15-22, the ringer is stopped. The flow then advances to step S15-23, and the circuit is connected to the handset E25 to set a conversation enable state. The flow then returns to the manager. The user can talk in this state. If the user does not take up the handset E25 since he or she is absent, the manager starts the TEL/FAX application based on the timer (20 to 30 sec timer) in step S15-3. In step S15-24, the circuit is disconnected, and the flow then returns to the manager.

Figure 44:
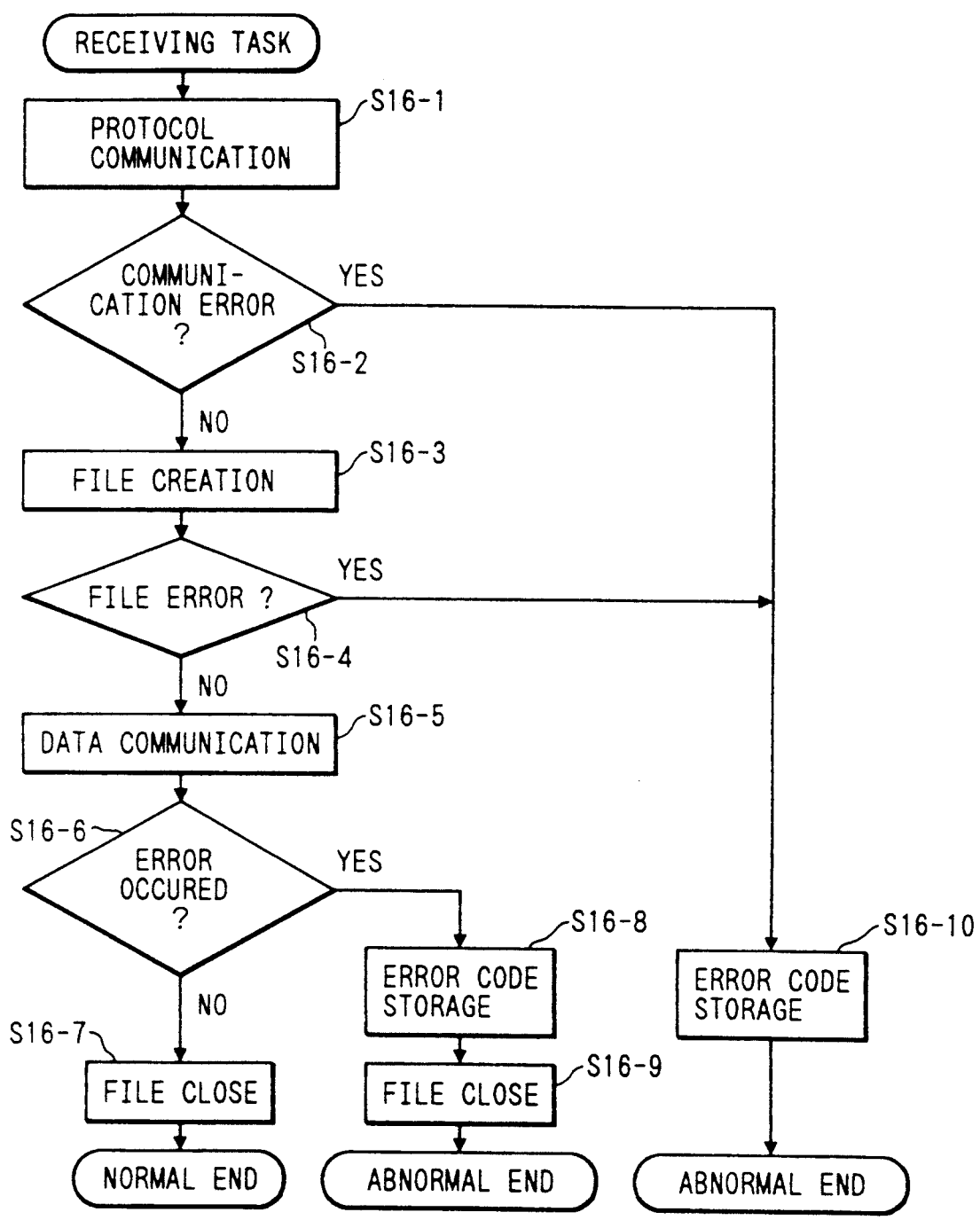
FIG. 44 is a flow chart of a FAX reception task.

Processing of the FAX reception task is started from step S16-1 in FIG. 44. In step S16-1, a protocol communication is performed. If the protocol communication can be normally completed, the flow advances to step S16-3, and the following processing is executed. If the protocol communication is abnormally completed, the flow advances to step S16-10 to generate an error code, and the task is then ended.

In step S16-3, a file is created in the hard disk to perform disk reception. If a file error occurs, the flow advances from step S16-4 to step S16-10, and the task is ended as an error. If a file can be normally created, the flow advances to step S16-5, and a data communication is started. Processing for receiving data in units of lines and writing it in the file is repeated. If a file error caused when a file becomes full or a communication error occurs during writing, the flow advances from step S16-6 to step S16-8 to generate an error code, and the file is closed in step S16-9. Thereafter, the task is ended as an error. That is, when the file capacity becomes full, the data communication is interrupted. If all the communication is normally completed, the flow advances to step S16-7 to close the file, and the task is ended.

When the end of the task is detected at a timing at which the control returns to the manager, a soft event for informing the end of the FAX task is started for the TEL/FAX application in step S15-1 in FIG. 43(A). The TEL/FAX application recognizes in step S15-4 that the FAX task is ended, disconnects the circuit in step S15-5, and then checks in step S15-6 if the task is ended as an error. If YES in step S15-6, the flow advances to step S15-11 to determine an error code (error assortment). For example, when an error which must be indicated to a user occurs, a sot event for instructing to display a system message is issued to the message board application in step S15-11. The flow then advances to step S15-25.

If NO in step S15-6, i.e., if the task is normally ended, the flow advances to step S15-7. In step S15-7, the file name of the created file is changed to one to be easily managed, and the file is moved. In step S15-8, the LED is flashed. It is checked in step S15-9 if the auto-printing mode is set to be an ON state. If YES in step S15-9, the flow advances to step S15-10, and a soft event for instructing to print the file received in the disk is issued to the spool printing application. If NO in step S15-9, the flow advances to step S15-25. In step S15-25, a communication result is stored in a communication report, and the processing is ended.

Figures 45, 45A:
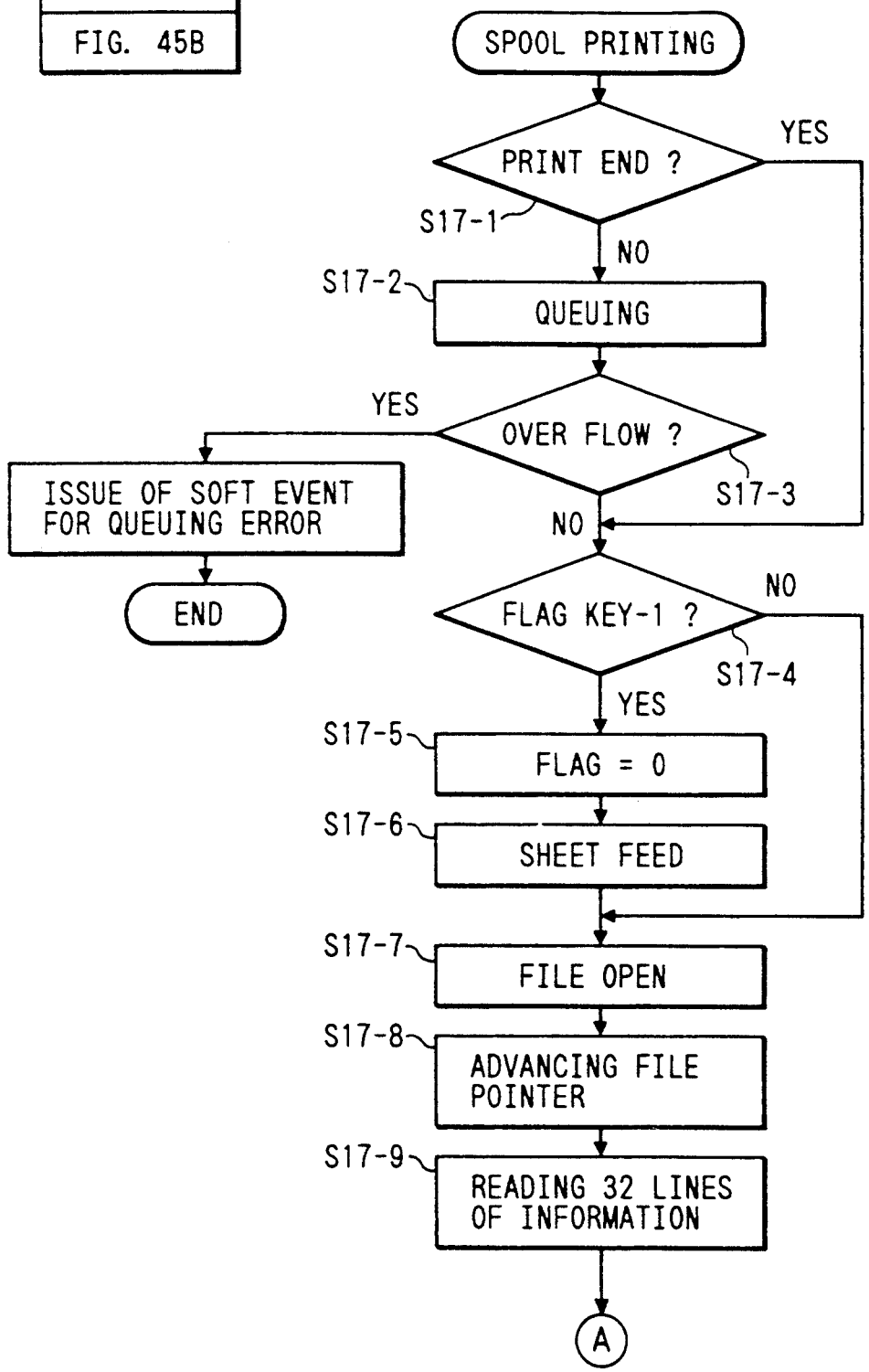
FIG. 45, consisting of FIG. 45A and 45B, is a flow chart of a spool print mode.
Figure 45B:
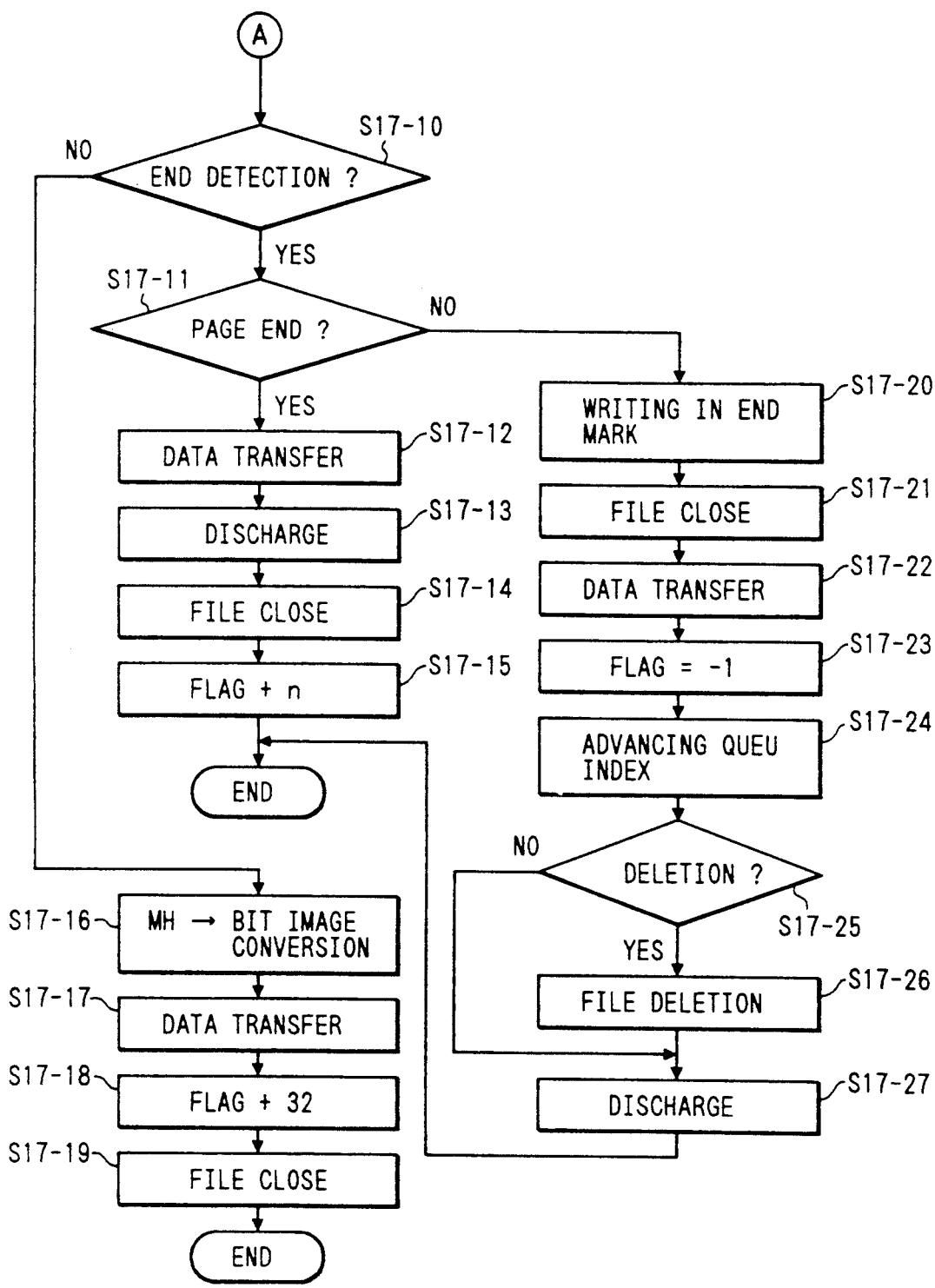

When the above-mentioned spool printing application is started by the manager in response to the soft event, the flow advances to step S17-1 in FIG. 45, and a file is queued in step S17-2. If it is determined in step S17-3 that a queue overflows, a soft event for indicating an error is issued to a request source application in step S17-28. The flow then returns to the manager.

If the file can be normally queued, the flow advances to step S17-4. If it is determined in step S17-4 that there is a currently processing (printing) file, the processing of the file is continued (the flow advances to step S17-7). If there is no processing file, the flow advances to step S17-5, and a print elapse flag is set to be 0. In step S17-6, a sheet feed command is sent to a printer control program. In step S17-7, a file to be processed is opened, and in step S17-8, a file pointer is advanced to a value of the print elapse flag. In step S17-9, data are read by the predetermined number of lines. In this case, the predetermined number of lines is 32. If the end of a file or page is not detected, the flow advances to step S17-16 via step S17-10. In step S17-16, since FAX data are expressed by MH codes, they are converted into bit images, and the bit images are stored in a buffer. Thereafter, the flow advances to step S17-17, and the bit images are sent to the printer control program. In step S17-18, a value "32" is added to the print elapse flag, and in step S17-19, the file is closed. The control is then returned to the manager. If an end event for 32 lines of the printer is detected, processing after queuing in step S17-4 is started. During reading of 32 lines in step S17-9, the end of one page or file is detected in step S17-10. If the end of one page is detected in step S17-11, the flow advances to step S17-12, and the remaining data in the printer are converted into bit images in the same manner as in step S17-16, thereby sending the bit images to the printer control program. In step S17-13, sheet discharge processing is executed. In step S17-14, the file is closed, and in step S17-15, the file elapse flag is advanced by n. The flow then returns to the manager.

If the end of the file is detected, the flow advances to step S17-20, and an end mark is written. In step S17-21, the file is closed. In step S17-22, the remaining data in the buffer are converted into bit images like in step S17-16, and the bit images are sent to the printer control program. In step S17-23, the print elapse flag is set to be "−1", and in step S17-24, a queue index is advanced. If it is determined in step S17-25 based on setting of file deletion after auto-printing in the memory switch application described above that the deletion mode is selected, the flow advances to step S17-26, and the corresponding file is deleted. If setting of file deletion after auto-printing is disabled, the file is not deleted. That is, automatic deletion of files is inhibited.

Non-deleted files are simultaneously deleted upon depression of the switch S9-2 in FIG. 36 after the print results are confirmed. In step S17-27, a discharge command is sent to the printer control program, and the flow then returns to the manager.

If step S17-16 described above is executed after step S17-9, only data transfer is performed in steps S17-12 and S17-22.

Figure 46B:
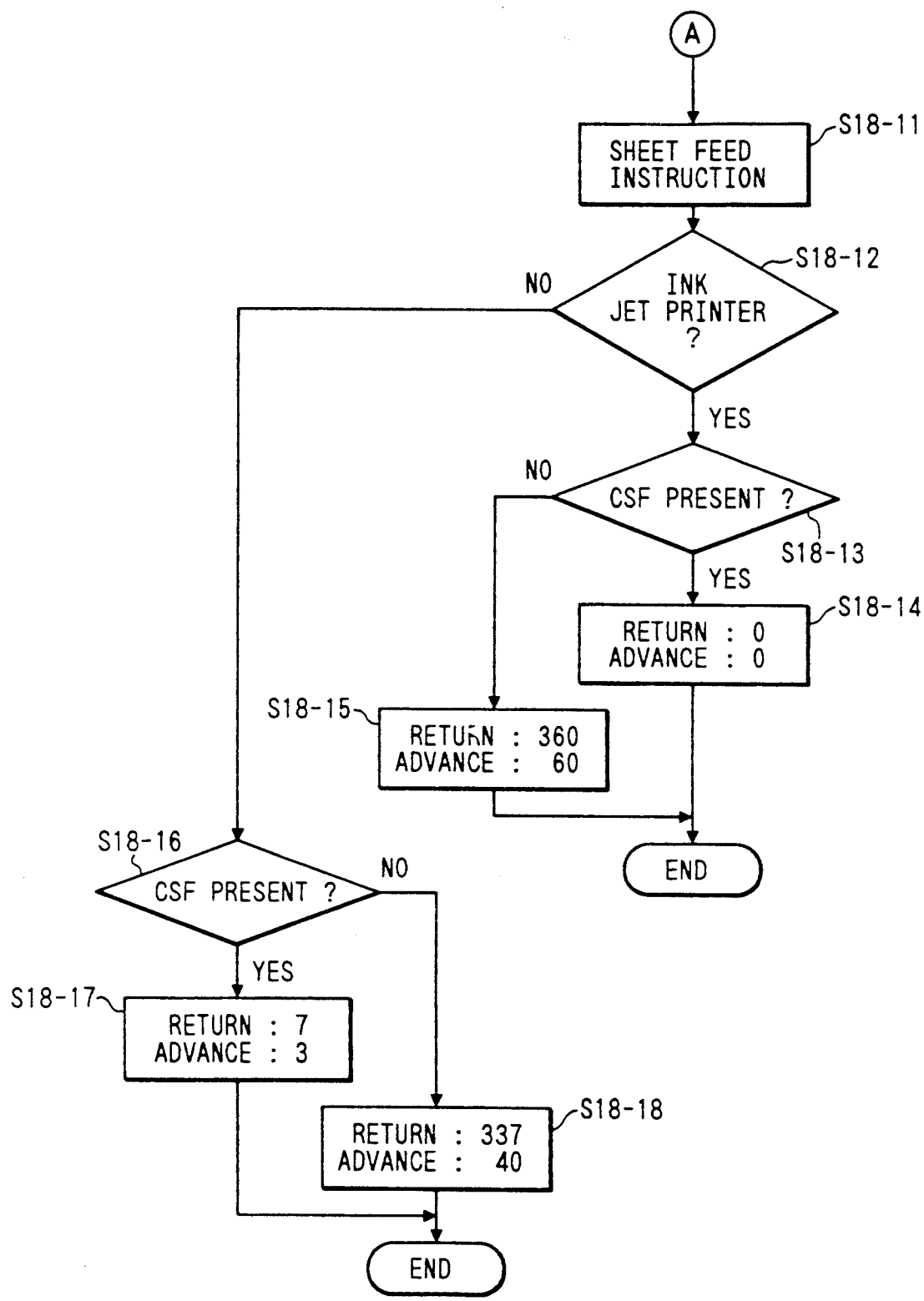
FIG. 46, consisting of FIGS. 46A and 46B, is a flow chart of a printer control program.
Figures 47A, 47B:
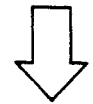
FIGS. 47A and 47B are views showing vertical/horizontal transformations.

Processing of the printer control program is started from FIG. 46. This program can be started by either a data transfer request from an application or a hardware interruption indicating the end of the printing operation of the printer. When this program is started in response to a data transfer request, the flow advances from step S18-1 to step S18-2 to check if a sheet feed command is detected. If NO in step S18-2, the flow advances to step S18-3. Received 32-line image data have a FAX resolution (about 200 dpi). In this system, if an ink-jet printer is connected in the above-mentioned memory switch application, since the resolution of the ink-jet printer of this embodiment is 360 dpi, resolution conversion must be performed. Furthermore, since the ink-jet printer of this embodiment is a serial printer, V/H transformation of bit images, as shown in FIGS. 47A and 47B, is also necessary. In this transformation, received image data is converted into a vertical 32-dot unit, as shown in FIG. 47B, since it is in units of lines, as shown in FIG. 47A. In step S18-3, V/H bit image transformation is executed. In step S18-4, two-dimensional transformation of 200 dpi to 360 dpi is executed. In step S18-5, a printer assortment is determined.

If it is determined in step S18-5 that a printer is not an ink-jet printer, since a print range is smaller by 5 mm at two edges, two edges of data are cut off by 5 mm, respectively, in step S18-6. If it is determined in step S18-7 that a thermal transfer printer is connected, a print density is set in step S18-8, and data are transferred to the printer in step S18-9. The printer control program temporarily returns the control to the manager while the printer is executing the printing operation. Upon completion of the printing operation, the printer control program is started again by a hardware interruption, and the flow advances to step S18-10. If an ink-jet printer is not connected, the flow advances to step S18-21; otherwise, the flow advances to step S18-19. In step S18-19, the presence/absence of the fixing mode set in the circumstance set application described above is checked. If the presence of the fixing mode is determined, the control loops during a setting time in step S18-20. Thereafter, the flow advances to step S18-21, and a printer end event is issued.

On the other hand, if a sheet feed command is detected, the flow advances to step S18-11, and the sheet feed command is issued to the printer. Since sheet feed processing executed by the printer main body differs depending on the printer assortment and the presence/absence of the cut sheet feeder (CSF), processing for registering the leading edge of a sheet is executed by feeding or returning a sheet after the sheet feed operation. In this case, this processing is ended in a feed direction to prevent a backlash. With this processing, the application can disregard the printer assortment and the presence/absence of the CSF. The above-mentioned judgment operations are executed in steps S18-12, S18-13, and S18-16. If the ink-jet printer/the presence of the CSF is determined, no operation is performed in step S18-14. If the ink-jet printer/the absence of the CSF is determined, a sheet is returned by "360" and is advanced by "60" in step S18-15. If the thermal transfer printer/the presence of the CSF is determined, a sheet is advanced by "3" in step S18-17. If the thermal transfer printer/the absence of the CSF is determined, a sheet is returned by "337" and is advanced by "40" in step S18-18.

If the document taking out switch S6-2 in FIG. 33 is depressed, the flow jumps from step S15-4 in FIG. 43(A) to step S20-1 in FIG. 43(B). If an event other than a touch event occurs, the flow advances from step S20-1 to step S20-6, and the corresponding processing is executed. The control then returns to the manager. In step S20-2, a touch position is analyzed, and if the document taking out switch is determined in step S20-3, the flow advances to step S20-4. In step S20-4, the LED which is flashed in step S15-8 is turned off. The flow then advances to step S20-5, and received document list processing is started. In a list display, as shown in FIG. 36, printed documents are displayed with a mark "*". If a touch position other than the document taking out switch is detected, the corresponding processing is executed in step S20-7.

No applications excluding the wordprocessor application perform a picture display since incoming of the Ci signal. That is, the wordprocessor picture is maintained. In addition, if an event such as a key input or a touch event on the touch panel is issued, the wordprocessor application is actuated. Since the wordprocessor application can execute processing corresponding to the event, a user can receive telephone and FAX data, and can print a received document while he or she is operating the wordprocessor.

A ringer ringing control operation of this embodiment will be described below. A user of this apparatus must set the following flags before an incoming call of a telephone set is actually detected.

Figure 48:
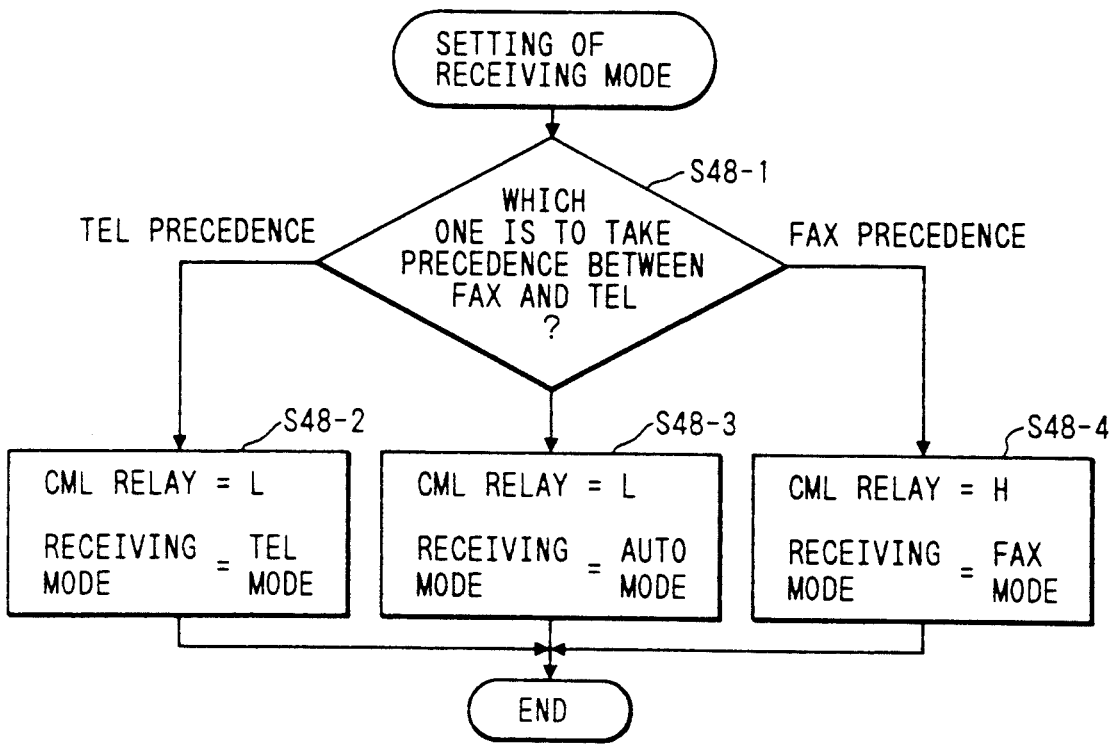
FIG. 48 is a flow chart showing an operation for setting a reception mode.

FIG. 48 is a flow chart for setting a receiving mode.

In order to switch the TEL and FAX modes, whether or not either function is to be preferentially executed is input. If the TEL mode is selected, it is preferentially executed, and an incoming call is not received until a user answers the handset or the branch telephone. Since the FAX mode is a FAX priority mode, if an incoming call is received, the FAX receiving mode is set. In an AUTO mode, in order to automatically switch the TEL and FAX modes, automatic discrimination is made based on a signal and the like once an incoming call is received.

If a mode input by a user is the TEL mode like in step S48-2, the CML relay is switched to an L side, and a receiving mode flag is set to be the TEL mode. When automatic discrimination is to be made, the CML relay is switched to an L side, and the receiving mode flag is set to be the AUTO mode like in step S48-3. If the FAX priority mode is selected, the CML relay is switched to an H side, and the receiving mode flag is set to be the FAX mode.

Figure 49:
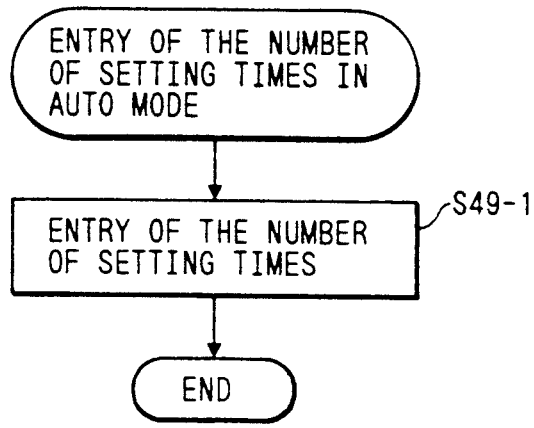
FIG. 49 is a flow chart showing an operation for inputting a set count in an AUTO mode.

The number of setting times in the AUTO mode is input according to the flow chart shown in FIG. 49. In this embodiment, the ringer is caused to ring by the number of setting times before automatic discrimination of the TEL and FAX modes is performed in the AUTO mode. This number of times is input in step S49-1.

Figure 50:
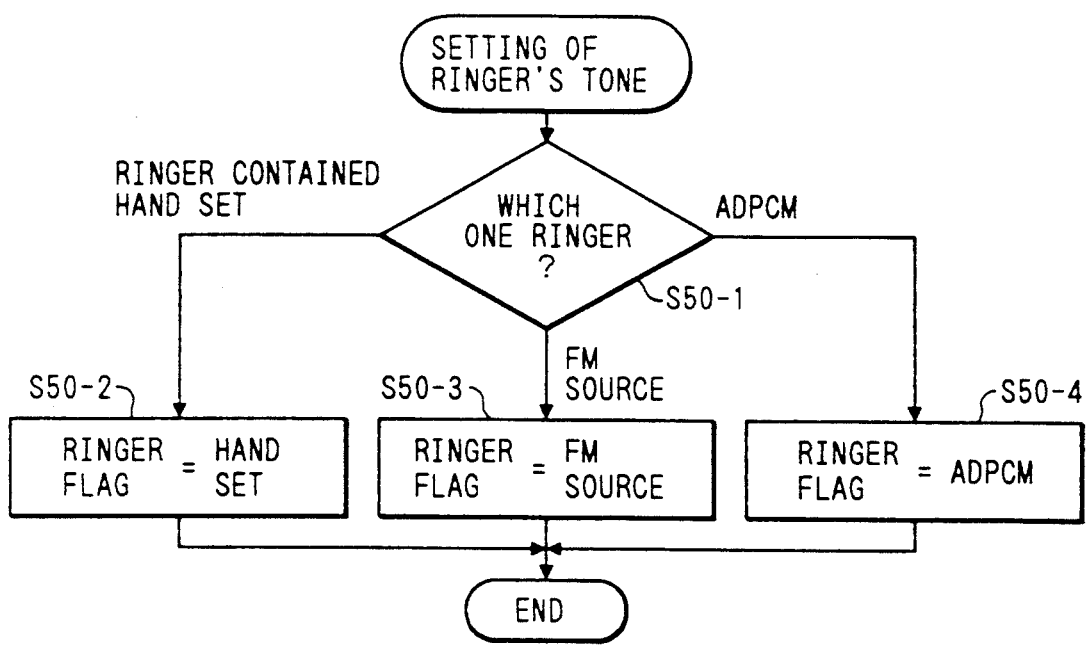
FIG. 50 is a flow chart showing an operation for setting a ringer tone.

Furthermore, a ringer tone is set according to the flow chart shown in FIG. 50. In step S50-1, a ringer to ring is determined. If a ringer contained in the handset is to ring, a ringer flag is set to be the handset in step S50-2. If an FM source is to be selected, the ringer flag is set to be the FM source like in step S50-3. If the ADPCM circuit is to be selected, the ringer flag is set to be the ADPCM circuit like in step S50-4.

Figure 51:
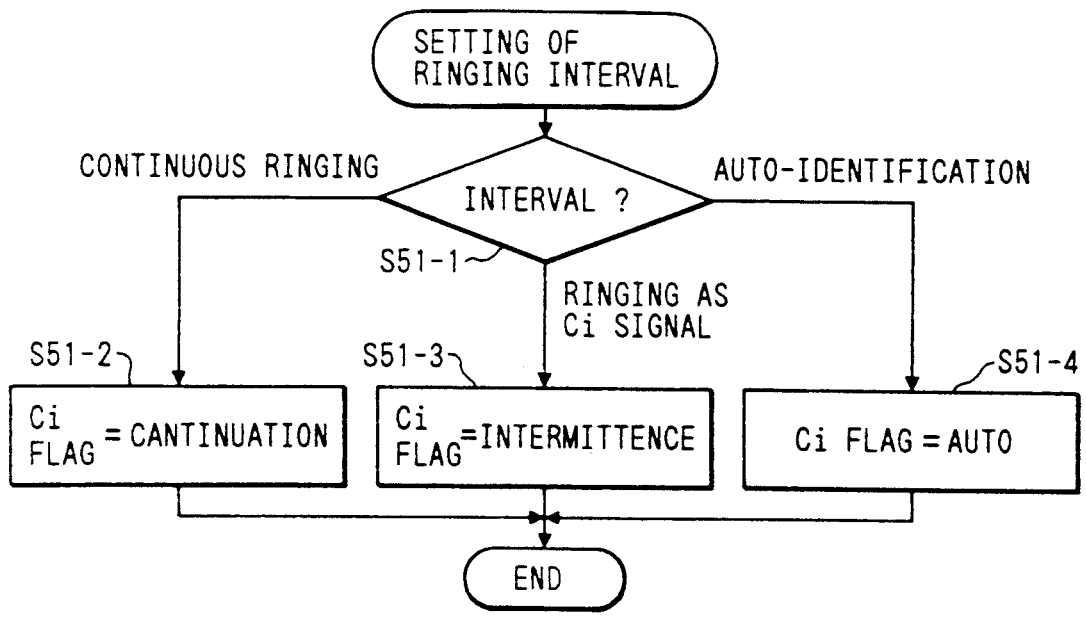
FIG. 51 is a flow chart showing an operation for setting a ringer ringing interval.

A ringer ringing interval is set according to the flow chart shown in FIG. 51. As shown in steps S51-2 to S51-4 in FIG. 51, a Ci flag is set. This flag is used to select whether a ringer is to be rung as a Ci signal (S51-3), or a ringer is to be continuously rung while the Ci signal continues (S51-2), or the above-mentioned two modes are automatically identified according to a ringer assortment (S51-4) when a ringing signal (Ci signal) from an exchanger is received.

Figure 52:
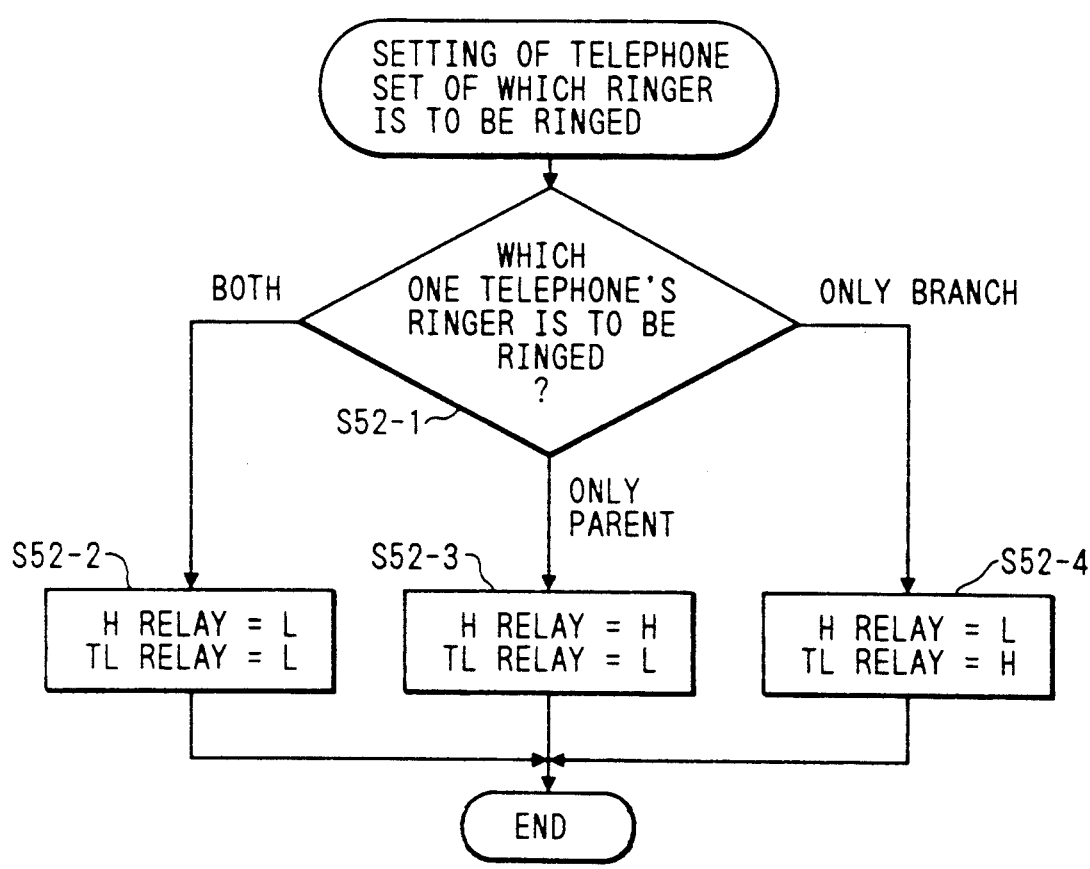
FIG. 52 is a flow chart showing an operation for setting a ringer ringing telephone set.

FIG. 52 is a flow chart for setting a ringer ringing telephone set. In the ringer ringing telephone setting processing, which telephone's ringer is to be rung is selected. As shown in step S52-2 in FIG. 52, when the ringers of both the main and branch telephones are to be rung, both the H and TL relays are switched to an L side. When the ringer of only the main telephone is to be rung, the H relay is switched to an H side, and the TL relay is switched to an L side like in step S52-3. When the ringer of only the branch telephone is to be rung, the H relay is switched to an L side, and the TL relay is switched to an H side like in step S52-4.

Figure 53B:
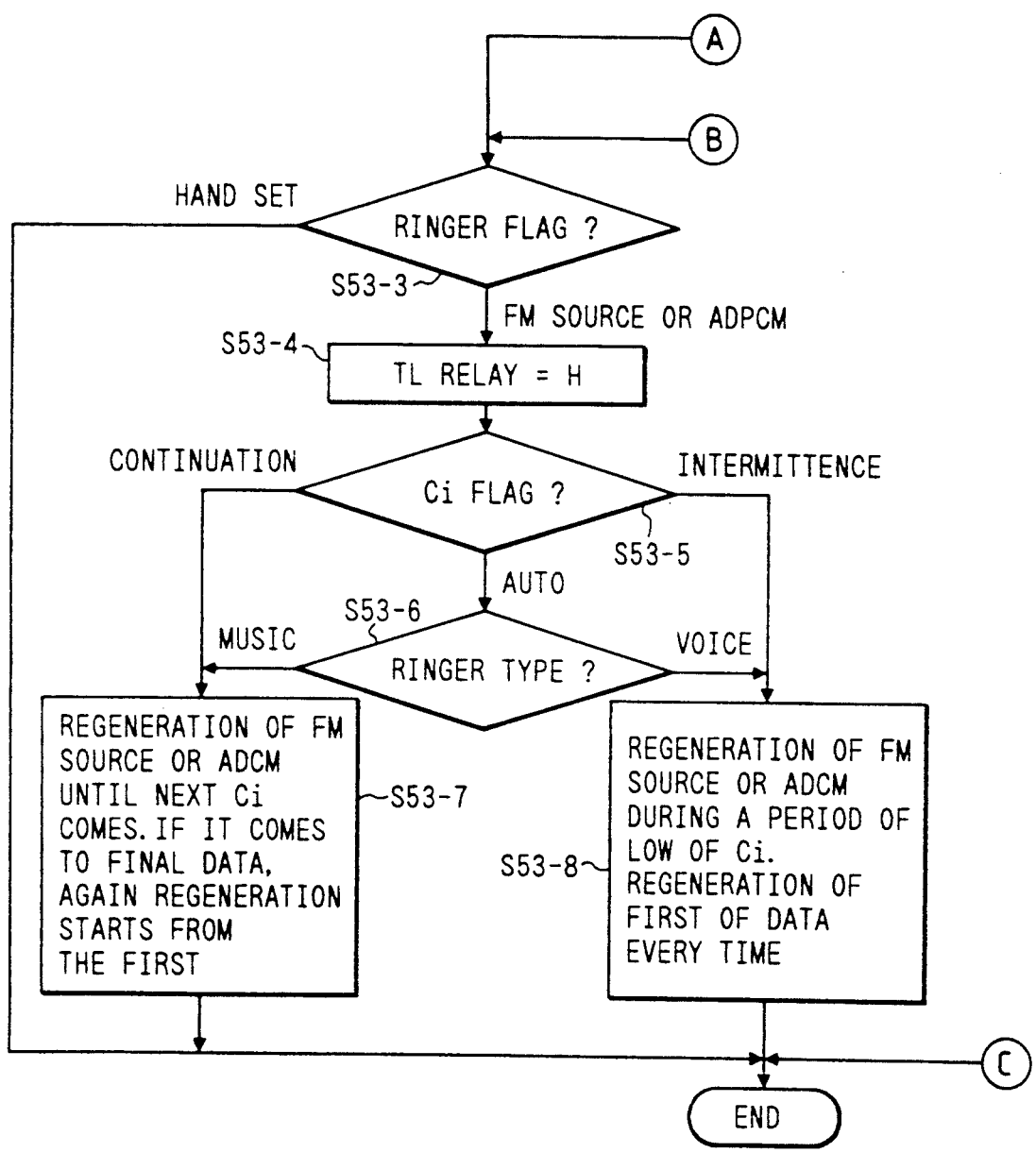
FIG. 53, consisting of FIGS. 53A and 53B, is a flow charts of ringer ringing control.

An operation executed when an incoming call is received under such conditions will be described below with reference to the flow chart of FIG. 53.

Ci event processing is actuated every time a Ci signal is input. More specifically, since a Ci signal is input for one second and then rests for two seconds, the Ci event processing is actuated once per three seconds.

If the receiving mode is the FAX mode, the flow advances from step S53-1 to step S53-15 to execute FAX receiving processing. If the receiving mode is the AUTO mode, it is checked in step S53-2 if the ringer is rung within the number of setting times. If YES in step S53-2, the ringer is rung like in the processing in the TEL mode. If NO in step S53-2, the TL relay is switched to an H side to connect the circuit in step S53-9. FAX/TEL auto-identification processing is executed in step S53-10. If the FAX mode is detected, the flow jumps to the FAX receiving processing in step S53-15. If the TEL mode is detected, a ringer tone is rung using the FM source in step S53-11. In this case, if a user takes up a handset, the TL relay is switched to an L side to allow conversation, as shown in step S53-13; otherwise, absence processing is executed in step S53-14.

If the receiving mode is the TEL mode, the ringer flag is checked in step S53-3. If the ringer flag indicates the handset, the ringer of the handset is rung. If the ringer flag indicates the FM source or the ADPCM circuit, the TL relay is switched to an H side in step S53-4, and a Ci flag is checked in step S53-5. If it is determined in step S53-5 that the Ci flag indicates a continuation mode, continuation processing is executed in step S53-7. If it is determined in step S53-5 that the Ci flag indicates an intermittence mode, intermittence processing is executed in step S53-8. If it is determined in step S53-5 that the Ci flag indicates an auto mode, the ringer type is checked in step S53-6. If it is determined in step S53-6 that the ringer type is "music", the continuation processing is executed in step S53-7. If it is determined in step S53-6 that the ringer type is "voice", the intermittence processing is executed in step S53-8. In step S53-7, the continuation processing is executed. The FM source or the ADPCM is continuously reproduced until the next Ci is input. When music or voice data ends, it is reproduced from the beginning again. When a Ci signal is continuously input, i.e., while a ringing signal of a telephone set is interrupted, one music or voice is kept reproduced.

In step S53-8, the intermittence processing is executed. The FM source or the ADPCM circuit is reproduced during a LOW duration of a Ci signal. Music or voice data is reproduced from the beginning in response to each Ci event. In this case, music or voice data is repeated from the beginning at a timing of a Ci signal.

The ringer control according to the present invention has been described above.

In the above description, a case has been exemplified wherein the ringer ringing control is executed using a TEL/FAX composite machine. However, the ringer ringing control of this embodiment can be executed as long as a telephone apparatus can reproduce music or voice data.

Another embodiment of the present invention will be described in detail below.

In this embodiment, printed files (files marked with "*") can be deleted simultaneously or independently. In addition, when a disk for memory reception is full, a mode for interrupting processing as a disk full error like in the above embodiment, and a mode for automatically deleting files marked with "*" to allow memory reception can be selected.

FIG. 54 corresponds to FIG. 36 in the above embodiment, and shows a picture of a list of received documents. An individual deletion switch S9-3 has a function of designating and deleting files marked with "*" one by one. On the other hand, an all deletion switch S9-4 has a function of simultaneously deleting files marked with "*", i.e., has the same function as the deletion switch S9-2 shown in FIG. 36.

Whether or not files marked with "*" are automatically deleted from older ones in memory reception when a disk is full can be selected in a memory switch application (to be described later). When "not automatically deleted" is selected, a FAX reception error occurs like in the above embodiment since "a disk capacity is short".

FIG. 55 corresponds to FIG. 40 of the above embodiment, and shows a picture of the memory switch application. Unlike in FIG. 40, when files are not automatically deleted after a printing operation, a setting item "whether files marked with "*" are automatically deleted from older ones or reception is interrupted as a reception error while a disk is full" (S13-9) is added.

Figure 56:
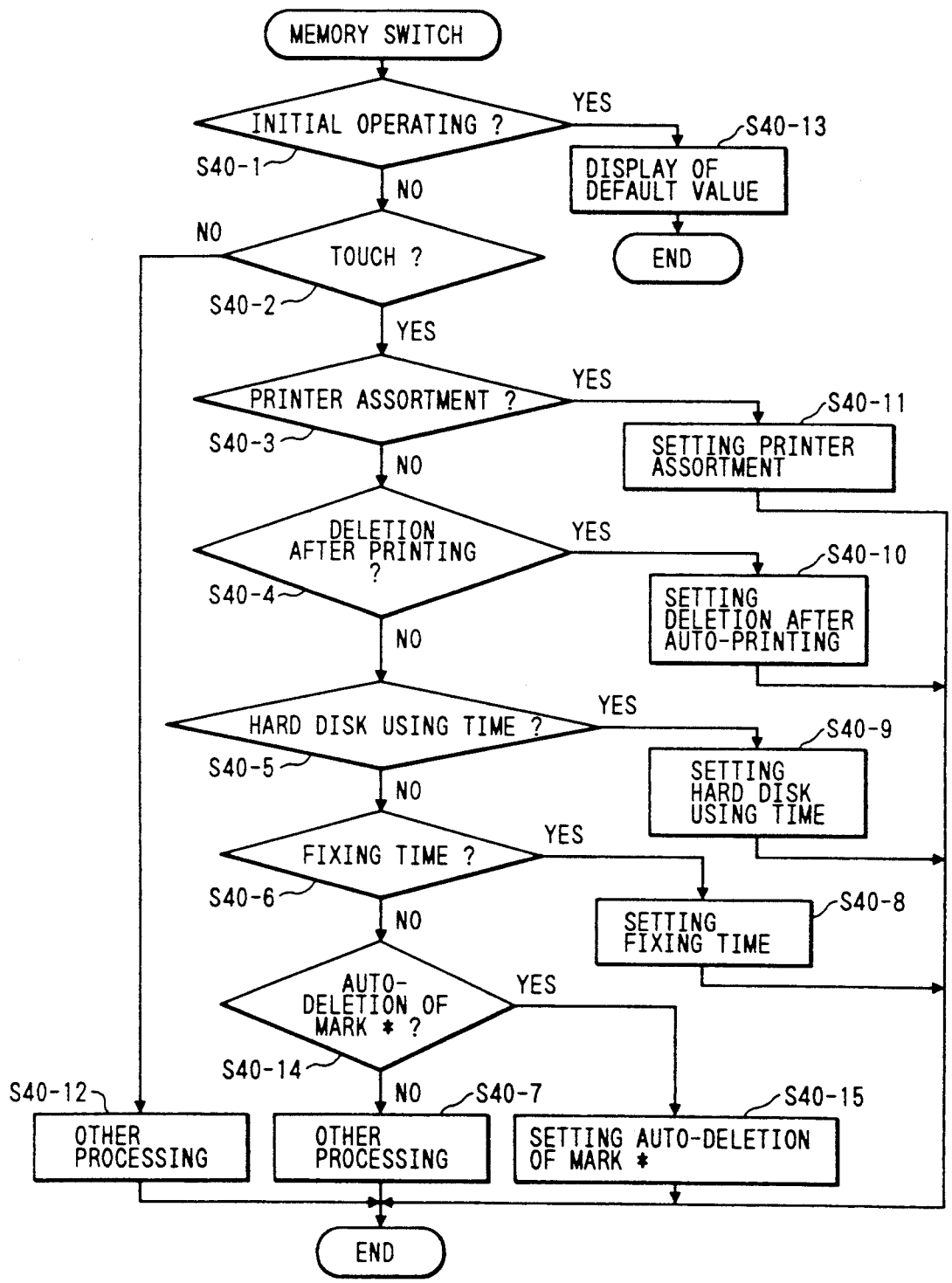
FIG. 56 is a flow chart of a memory switch.

The operation of the memory switch application shown in FIG. 55 will be described below with reference to the flow chart shown in FIG. 56. Note that FIG. 56 corresponds to FIG. 42 of the above embodiment.

In an initial operating state, the flow advances from step S40-1 to step S40-13, data in the EEPROM, i.e., default values are displayed as a list, and the flow returns to the manager. If a touch event occurs, the flow advances from step S40-2 to step S40-3. If setting of printer assortment is determined as a result of touch analysis, the flow advances to step S40-11, and setting processing is executed. If setting of file deletion after auto-printing is determined, the flow advances from step S40-4 to step S40-10, and setting processing is executed. If setting of a hard disk using time is determined, the flow advances from step S40-5 to step S40-9, and setting processing is performed. If setting of a fixing time is determined, the flow advances from step S40-6 to step S40-8, and setting processing is executed. If setting of auto-deletion of files marked with "*" is determined, the flow advances from step S40-14 to S40-15 to execute setting processing. For other events, the flow advances to step S40-7, and corresponding setting processing is executed. If this application is actuated by an event other than the touch event, the flow advances to step S40-12, and the corresponding processing is executed. Note that step S40-7 includes processing of setting the presence/absence of the cut sheet feeder (CSF) and the presence/absence of the internal HD.

Processing of a FAX receiving task of this embodiment will be described below with reference to FIGS. 57 and 58. Note that FIG. 57 corresponds to FIG. 44 of the above embodiment.

Figure 57:
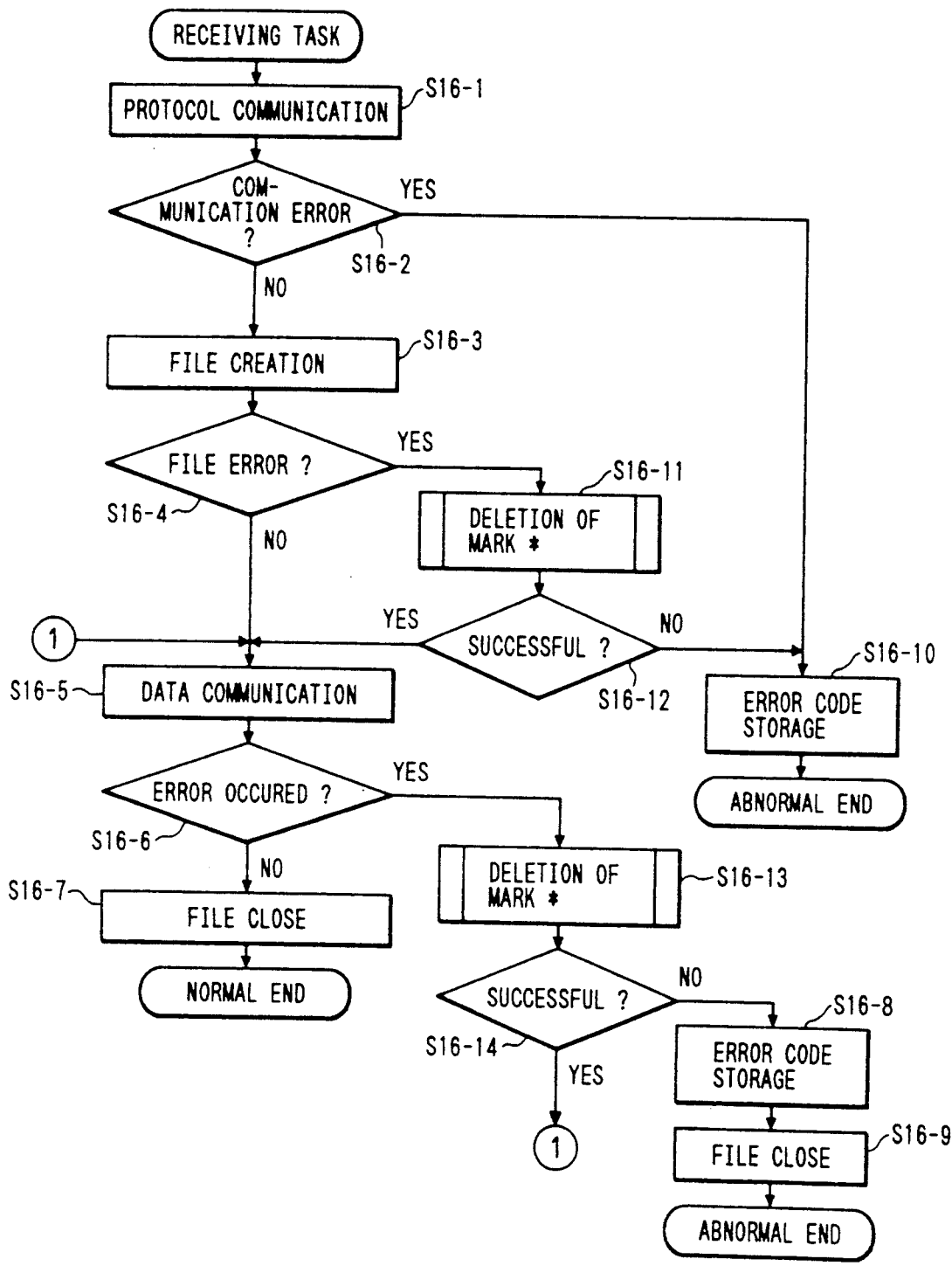
FIG. 57 is a flow chart of a FAX reception task.

Processing of the FAX reception task is started from step S16-1 in FIG. 57. In step S16-1, a protocol communication is performed. If the protocol communication can be normally completed, the flow advances to step S16-3, and the following processing is executed. If the protocol communication is abnormally completed, the flow advances to step S16-10 to generate an error code, and the task is then ended.

In step S16-3, a file is created in the hard disk to perform disk reception. If a file error occurs, the flow advances to step S16-11, and processing for deleting files marked with "*" when a disk is full is executed. When this processing is unsuccessful, the flow advances from step S16-12 to S16-10, and processing is ended as an error. If a file can be normally created, and if deletion of the files marked with "*" is successful in step S16-12, the flow advances to step S16-5 to start a data communication. Processing for receiving data in units of lines and writing it in the file is repeated.

If a file error or communication error occurs during writing, the flow advances from step S16-6 to step S16-13, and processing for deleting files marked with "*" when a disk is full is executed. If the processing is unsuccessful, the flow advances from step S16-14 to step S16-8 to generate an error code. In step S16-9, the file is closed, and the flow is ended as an error. If the deletion processing of the files marked with "*" is successful in step S16-14, the flow returns to step S16-5, and the data communication is continued. When all the communication is normally ended, the flow advances to step S16-7 to close the file, thus ending the task.

Figure 58:
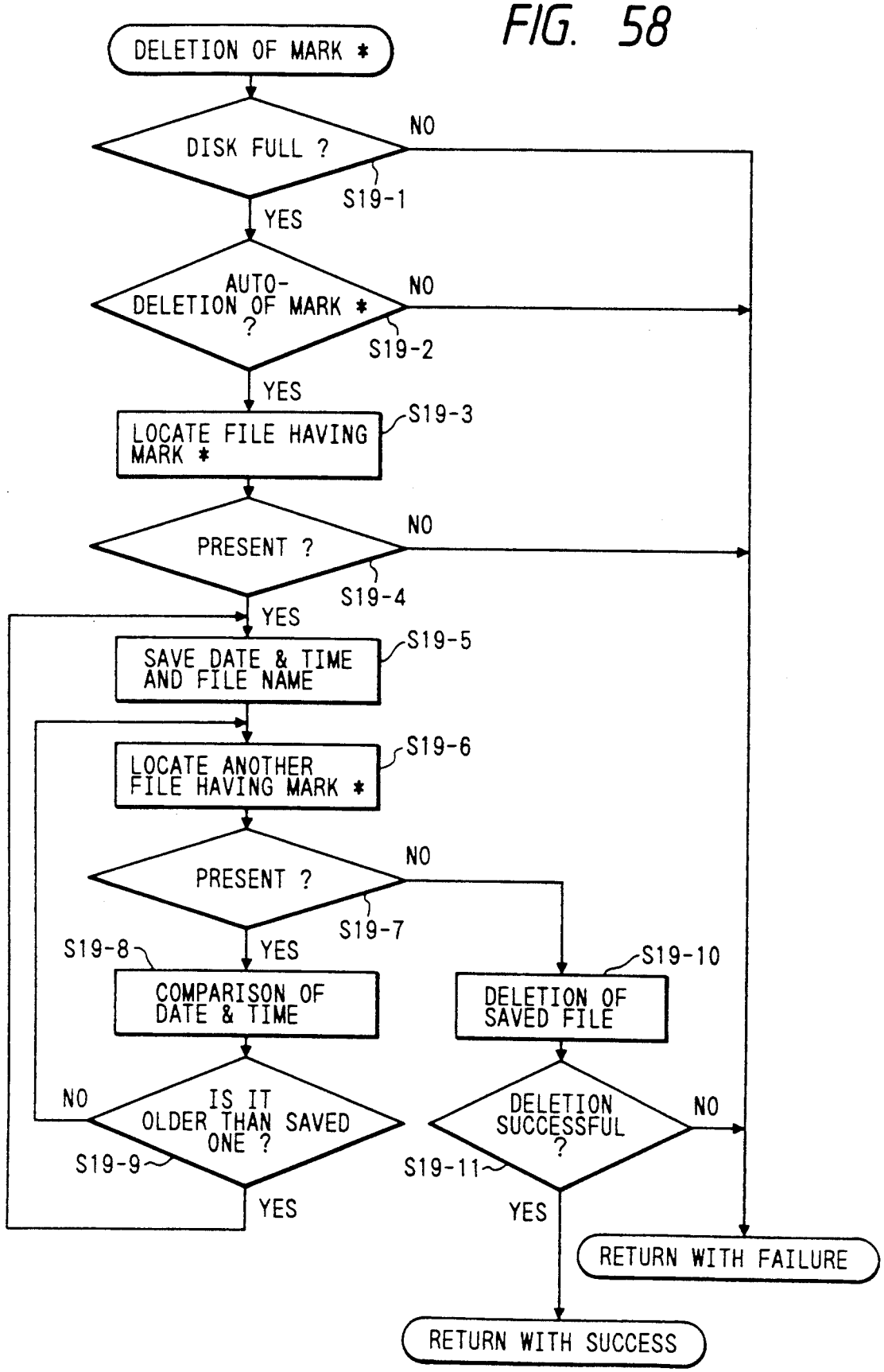
FIG. 58 is a flow chart of a file deletion mode.

The flow chart of the processing for deleting files marked with "*" when a disk is full is started from step S19-1 in FIG. 58. If any error occurs, the flow enters this processing. Only when a disk full error occurs and an auto-deletion mode of files marked with "*" is set in the EEPROM, this processing is executed.

In step S19-1, an assortment of an error which actuates this processing is checked. If a file error other than a disk full error is detected, the flow returns to the main routine as a failure. If a disk full error is detected, the flow advances to step S19-2, and "whether or not files marked with "*" are automatically deleted" set in the EEPROM is checked. If NO in step S19-2, the flow returns to the main routine as a failure. However, if YES in step S19-2, the flow advances to step S19-3 to search for a file marked with "*" from the disk. If no such file is found, the flow returns from step S19-4 to the main routine as a failure.

If such a file is found, the flow advances from step S19-4 to step S19-5, and a receiving date and time, and a file name of the file are saved. In step S19-6, another file marked with "*" is searched. If the file is found, the flow advances from step S19-7 to step S19-8 to compare the date and time of the saved file with those of the currently found file. If the saved file is older, no operation is performed, and the flow returns to step S19-6 to keep searching a file marked with "*".

If the currently found file is older, however, the flow returns to step S19-5, and a receiving date and time, and a file name of the file are saved. If no other files marked with "*" are found in step S19-7, the flow advances to step S19-10, and a file of the file name which is saved last is deleted. The file which is saved last is the oldest one among files marked with "*". If deletion is unsuccessful, the flow returns from step S19-11 to the main routine as a failure. Only when deletion is successful, the flow can return with success.

In this embodiment, the oldest one of the files marked with "*" is deleted. However, a file to be deleted may be determined based on an originator or a file capacity.

According to this embodiment, an auto-deletion mode and a manual deletion mode can be selected, thus improving a convenience for a user.

In the above embodiment, the printer has a separate structure which is connected to the main body via a cable. However, the printer may be arranged integrally with the main body.

If color image data is used as transmission data, and a color printer is used as a printer, a color image can be transmitted and recorded.

As described above, according to the present invention, since received recording data can be preserved until a recording result is checked, even when data cannot be normally recorded due to an out-of-ink state, it can be recorded again.

If recording data which is recorded is marked, the marked recording data can be simultaneously deleted from a storage means when a list of received data is displayed.

We claim:

1. An image communication apparatus for receiving and recording transmitted recording data, the apparatus comprising:

reception means for receiving the transmitted recording data;

storage means for storing the recording data received by said reception means in a nonvolatile manner such that said recording data can remain stored in said storage means after being read therefrom;

recording means for recording an image in accordance with the recording data without regard to to a possible occurrence of an irregularity in said recording means;

reading means for automatically reading out the recording data stored in said storage means and for outputting the recording data to said recording means without regard to the possible occurrence of an irregularity in said recording means; and deletion means for deleting the recording data stored in said storage means by a manual operation after the recording data is recorded by said recording means.

2. An apparatus according to claim 1, wherein said recording means comprises an ink-jet printer for ejecting an ink from a plurality of ejection ports.

3. An apparatus according to claim 2, wherein said ink-jet printer comprises heat energy generation means, arranged in correspondence with the ejection ports, for causing a change in state of the ink by heat, and ejecting the ink based on the change in state from the ejection ports, thereby forming flying ink droplets.

4. An apparatus according to claim 2, wherein said ink-jet printer does not detect a remaining amount of ink.

5. An apparatus according to claim 1, wherein said storage means comprises a nonvolatile semiconductor memory.

6. An apparatus according to claim 1, wherein said storage means comprises a disk memory.

7. An apparatus according to claim 1, further comprising reception control means for interrupting reception of the recording data by said reception means when said storage means becomes full of received recording data.

8. An apparatus according to claim 1, further comprising display means for displaying the recording data stored in said storage means by a manual operation.

9. An apparatus according to claim 1, wherein said reading means has an automatic recording mode in which the recording data stored in said storage means is automatically read out, and a manual recording mode in which the recording data is read out on the basis of a manual operation.

10. An apparatus according to claim 1, wherein said deletion means has an all deletion mode for simultaneously deleting files by a manual operation, and an individual deletion mode for individually deleting the files.

11. An image communication apparatus for receiving and recording transmitted recording data, the apparatus comprising:

reception means for receiving the transmitted recording data;

storage means for storing the recording data received by said reception means in a nonvolatile manner such that said recording data can remain stored in said storage means after being read therefrom;

recording means for recording an image in accordance with the recording data without regard to a possible occurrence of to an irregularity in said recording means;

reading means for reading out the recording data stored in said storage means, said reading means having an automatic recording mode in which the recording data stored in said storage means is automatically rad out to said recording means without regard to the possible occurrence of an irregularity in said recording means, and a manual recording mode in which the recording data is read out to said recording means on the basis of a manual operation; and deletion means for deleting recording data stored in said storage means when said reading means is in the automatic recording mode, said deletion means having a manual deletion mode in which the recording data is deleted by a manual operation after the recording data is recorded by said recording means, and an automatic deletion mode in which the recording data is automatically deleted after the recording data is recorded by said recording means.

12. An apparatus according to claim 11, wherein said recording means comprises an ink-jet printer for injecting an ink from a plurality of ejection ports.

13. An apparatus according to claim 12, wherein said ink-jet printer comprises heat energy generation means, arranged in correspondence with the ejection ports, for causing a change in state of the ink by heat, and ejecting the ink based on the change in state from the ejection ports, thereby forming flying ink droplets.

14. An apparatus according to claim 12, wherein said ink-jet printer does not detect a remaining amount of ink.

15. An apparatus according to claim 11, wherein said storage means comprises a nonvolatile semiconductor memory.

16. An apparatus according to claim 11, wherein said storage means comprises a disk memory.

17. An apparatus according to claim 11, further comprising reception control means for interrupting reception of the recording data by said reception means when said deletion means is set in the manual deletion mode and said storage means becomes full of received recording data.

18. An apparatus according to claim 11, wherein in the automatic deletion mode, when said storage means becomes full of received recording data, said deletion means automatically deletes the recording data which has already been recorded by said recording means.

19. An apparatus according to claim 18, wherein said deletion means in the automatic deletion mode automatically deletes the oldest recording data.

20. An apparatus according to claim 11, further comprising display means for displaying the recording data stored in said storage means by a manual operation.

21. An apparatus according to claim 11, wherein said deletion means in the manual deletion mode has an all deletion mode for simultaneously deleting files by a manual operation, and an individual deletion mode for individually deleting the files.

22. An image communication apparatus that can connect with an ink-jet printer, which does not detect an amount of ink remaining, for recording by ejection of ink from a plurality of ejection ports, can receive transmitted recording data, can temporarily store the recording data in a nonvolatile storage means such that the recording data can remain in said storage means after being read therefrom, and then can cause the connected printer automatically to record an image in accordance with recording data read out from said storage means, the apparatus further comprising:

deletion means for deleting recording data stored in said storage means after an image has been automatically recorded in accordance with the recording data, said deletion means having a manual deletion mode in which the recording data is deleted by a manual operation after the recording data is recorded by said recording means, and an automatic deletion mode in which the recording data is automatically deleted after the recording data is recorded by said recording means without regard to an amount of ink remaining; and selection means for selecting the manual deletion mode or the automatic deletion mode when the connected printer is an ink-jet printer.

23. An apparatus according to claim 22, wherein said ink-jet printer comprises heat energy generation means, arranged in correspondence wit the ejection ports, for causing a change in state of the ink by heat, and for ejecting the ink based on the change in state from the ejection ports, thereby forming flying ink droplets.

24. An apparatus according to claim 22, wherein said storage means comprises a nonvolatile semiconductor memory.

25. An apparatus according to claim 22, wherein said storage means comprises a disk memory.

26. An apparatus according to claim 22, further comprising display means for displaying the recording data stored in said storage means by a manual operation.

27. An apparatus according to claim 22, wherein said recording means has an automatic recording mode in which the recording data stored in said storage means is automatically recorded, and a manual recording mode in which the recording data is recorded on the basis of a manual operation.

28. An image communication method for receiving and recording transmitted recording data using an apparatus that does not detect recording system irregularities that can affect proper recording, the method comprising the steps of:

receiving the transmitted recording data;

storing the received recording data in nonvolatile storage means such that said recording data can remain stored after being read therefrom;

reading out the recording data stored in said storage means;

automatically recording the recording data read out from aid storage means without regard to a possible occurrence of an undetected recording irregularity; and deleting the recording data stored in said storage means by a manual operation after confirming that the recording data is properly recorded.

29. An image communication method according to claim 28, wherein said recording apparatus comprises an ink-jet printer for ejecting an ink from a plurality of ejection ports.

30. An image communication method according to claim 29, wherein said ink-jet printer does not detect a remaining amount of ink.

* * * * *

UNITED STATES PATENT AND TRADEMARK OFFICE
CERTIFICATE OF CORRECTION

PATENT NO. : 5,315,397
DATED : May 24, 1994
INVENTOR(S) : NAOSHI INOUE ET AL.

Page 1 of 2

It is certified that error appears in the above-identified patent and that said Letters Patent is hereby corrected as shown below:

ON TITLE PAGE

AT [54] TITLE
The Title should read
--APPARATUS AND METHOD FOR RECEIVING AND RECORDING TRANSMITTED RECORDING DATA--.

IN THE DRAWINGS

Sheet 25 of 57, in
FIG. 31, "PIGIT" should read --DIGIT--.

Sheet 49 of 57, in
FIG. 51, "CANTINUATION" should read --CONTINUATION--.

COLUMN 1

Line 3, "TRANSMITTED" should read
--RECORDING TRANSMITTED--.

COLUMN 13

Line 16, "progressing" should read --processing--.
Line 46, "ejection" should read --(ejection--.

COLUMN 21

Line 54, "E133 id" should read --E122 is--.

COLUMN 28

Line 30, "sot" should read --soft--.

UNITED STATES PATENT AND TRADEMARK OFFICE
CERTIFICATE OF CORRECTION

PATENT NO. : 5,315,397
DATED : May 24, 1994
INVENTOR(S) : NAOSHI INOUE ET AL.

It is certified that error appears in the above-identified patent and that said Letters Patent is hereby corrected as shown below:

COLUMN 35

Line 12, "to to" should read --to--.
    Line 30, "and" should read --and for--.

COLUMN 36

Line 3, "to" should be deleted.
    Line 9, "rad" should read --read--.
    Line 26, "inject-" should read --eject- --.
    Line 31, "and" should read --and for--.

COLUMN 37

Line 25, "wit" should read --with--.

COLUMN 38

Line 22, "aid" should read --said--.

Signed and Sealed this

Thirty-first Day of January, 1995

Attest:

BRUCE LEHMAN

Attesting Officer     Commissioner of Patents and Trademarks